(12) United States Patent
Chizeck et al.

(10) Patent No.: US 10,394,327 B2
(45) Date of Patent: Aug. 27, 2019

(54) INTEGRATION OF AUXILIARY SENSORS WITH POINT CLOUD-BASED HAPTIC RENDERING AND VIRTUAL FIXTURES

(71) Applicant: UNIVERSITY OF WASHINGTON, Seattle, WA (US)

(72) Inventors: Howard Jay Chizeck, Seattle, WA (US); Kevin Huang, Seattle, WA (US); Fredrik Ryden, Seattle, WA (US); Andrew Stewart, Seattle, WA (US)

(73) Assignee: University of Washington, Seattle, WA (US)

( * ) Notice: Subject to any disclaimer, the term of this patent is extended or adjusted under 35 U.S.C. 154(b) by 14 days.

(21) Appl. No.: 15/510,190

(22) PCT Filed: Sep. 11, 2015

(86) PCT No.: PCT/US2015/049781
§ 371 (c)(1),
(2) Date: Mar. 9, 2017

(87) PCT Pub. No.: WO2016/040862
PCT Pub. Date: Mar. 17, 2016

(65) Prior Publication Data
US 2018/0232052 A1    Aug. 16, 2018

Related U.S. Application Data

(60) Provisional application No. 62/049,484, filed on Sep. 12, 2014.

(51) Int. Cl.
*G06F 3/01*    (2006.01)
*G06T 17/05*    (2011.01)
(Continued)

(52) U.S. Cl.
CPC ............ *G06F 3/016* (2013.01); *B23K 9/0953* (2013.01); *G06T 7/55* (2017.01); *G06T 7/97* (2017.01);
(Continued)

(58) Field of Classification Search
CPC ....................................................... G06F 3/016
(Continued)

(56) References Cited

U.S. PATENT DOCUMENTS

| 4,674,048 A | * | 6/1987 | Okumura | ............... B25J 9/1676 |
| | | | | 318/568.12 |
| 4,986,280 A | * | 1/1991 | Marcus | ................... A61B 5/103 |
| | | | | 33/512 |

(Continued)

FOREIGN PATENT DOCUMENTS

| WO | 1995/020788 A1 | 8/1995 |
| WO | 1995020788 A1 | 8/1995 |
| WO | 2012091807 A2 | 7/2012 |

OTHER PUBLICATIONS

Abbott et al., "Haptic virtual fixtures for robot-assisted manipulation," Robotics Research, vol. 28, pp. 49-64, 2007.
(Continued)

*Primary Examiner* — Javid A Amini
(74) *Attorney, Agent, or Firm* — McDonnell Boehnen Hulbert & Berghoff LLP

(57) ABSTRACT

Apparatus and methods for generating virtual environment displays based on a group of sensors are provided. A computing device can receive first data about an environment from a first group of one or more sensors. The computing device can model the environment as a virtual environment based on the first data. The computing device can determine whether to obtain additional data to model the environment. After determining to obtain additional data to
(Continued)

model the environment, the computing device can: receive second data about the environment, and model the environment as the virtual environment based on at least the second data. The computing device can generate a display of the virtual environment.

22 Claims, 25 Drawing Sheets

(51) Int. Cl.
    *G06T 7/55*         (2017.01)
    *G06T 7/00*         (2017.01)
    *B23K 9/095*       (2006.01)
    *G06T 17/00*      (2006.01)

(52) U.S. Cl.
    CPC .............. *G06T 17/00* (2013.01); *G06T 17/05* (2013.01); *G05B 2219/40* (2013.01)

(58) Field of Classification Search
    USPC ........................................................ 345/619
    See application file for complete search history.

(56) References Cited

U.S. PATENT DOCUMENTS

| | | | |
|---|---|---|---|
| 6,597,347 B1 | 7/2003 | Yasutake | |
| 2006/0129277 A1* | 6/2006 | Wu | G06F 3/015 700/245 |
| 2008/0218514 A1 | 9/2008 | Tarr et al. | |
| 2011/0298579 A1 | 12/2011 | Hardegger et al. | |
| 2012/0194517 A1 | 8/2012 | Shahram et al. | |
| 2013/0063550 A1* | 3/2013 | Ritchey | G16H 40/63 348/36 |
| 2013/0158711 A1 | 6/2013 | Smith et al. | |
| 2014/0168073 A1* | 6/2014 | Chizeck | G06F 3/016 345/156 |
| 2014/0176591 A1* | 6/2014 | Klein | G09G 3/003 345/589 |

OTHER PUBLICATIONS

Abbott, et al., "Virtual fixture architectures for telemanipulation," Proceedings of the 2003 IEEE International Conference on Robotics and Automation (ICRA '03), pp. 2798-2805, 2003.
Basdogan, et al., "Force interactions in laparoscopic simulations: haptic rendering of soft tissues," Medicine Meets Virtual Reality, vol. 50, pp. 385-391, 1998.
Basdogan, et al., "VR-based simulators for training in minimally invasive surgery," IEEE Computer Graphics and Applications, vol. 27, No. 2, pp. 54-66, 2007.
Bettini, et al., "Vision-assisted control for manipulation using virtual fixtures," IEEE Transactions on Robotics, vol. 20, No. 6, pp. 953-966, 2004.
Bonaci, "[Abstract] Telerobotic Surgery Meets Information Security," Proceedings of the 21st USENIX Security Symposium, 1 pg, 2012.
Brooks, Jr., et al., "Project GROPEHaptic displays for scientific visualization," ACM SIGGRAPH Computer Graphics, vol. 24, No. 4, pp. 177-185, 1990.
Butler, et al., "Shake'n'sense: reducing interference for overlapping structured light depth cameras," Proceedings of the 2012 ACM SIGCHI Conference on Human Factors in Computing Systems (CHI '12), pp. 1933-1936, 2012.
Carlevaris-Bianco, et al., "Multi-view registration for feature-poor underwater imagery," Proceedings of the 2011 IEEE International Conference on Robotics and Automation (ICRA), pp. 423-430, 2011.
Chan, et al., "Constraint-based six degree-of-freedom haptic rendering of volume-embedded isosurfaces," Proceedings of the 2011 IEEE World Haptics Conference, pp. 89-94, 2011.
Chizeck, "[Abstract] Algorithms for Haptic Rendering and Virtual Fixtures for Robotic Surgery," Proceedings of the RSS 2012 Workshop on Algorithmic Frontiers in Medical Robotics: Manipulation in Uncertain, Deformable, Heterogeneous Environments, 1 pg, 2012.
Colgate, et al., "Factors affecting the Z-Width of a haptic display," Proceedings of the 1994 IEEE International Conference on Robotics and Automation, pp. 3205-3210, 1994.
Edmond Jr., et al., "ENT endoscopic surgical training simulator," Medicine Meets Virtual Reality, vol. 39, pp. 518-528, 1997.
Gibo, et al., "Design considerations and human-machine performance of moving virtual fixtures," Proceedings of the 2009 IEEE International Conference on Robotics and Automation (ICRA '09), pp. 671-676, 2009.
Gibson, et al., "Simulating arthroscopic knee surgery using volumetric object representations, real-time volume rendering and haptic feedback," in CVRMed-MRCAS'97, Lecture Notes in Computer Science, Springer, vol. 1205, pp. 367-378, 1997.
Gorges, et al., "Haptic object recognition using statistical point cloud features," Proceedings of the 2011 15th International Conference on Advanced Robotics (ICAR), pp. 15-20, 2011.
Hannaford, "A design framework for teleoperators with kinesthetic feedback," IEEE Transactions on Robotics and Automation, vol. 5, No. 4, pp. 426-434, 1989.
Ho, et al., "An experiment on the influence of haptic communication on the sense of being together," Workshop on Presence in Shared Virtual Environments, BT Labs, Ipswich, UK, available online at: http://www0.cs.ucl.ac.uk/staff/m.slater/BTWorkshop/touchexp.html, 1998.
Hover, et al., "Advanced perception, navigation and planning for autonomous in-water ship hull inspection," The International Journal of Robotics Research, vol. 31, No. 12, vol. 1445-1464, 2012.
Hsiao, et al., "Contact-reactive grasping of objects with partial shape information," Proceedings of the 2010 IEEE/RSJ International Conference on Intelligent Robots and Systems (IROS), pp. 1228-1235, 2010.
Insko, "Passive haptics significantly enhances virtual environments," Ph.D. Dissertation, University of North Carolina at Chapel Hill, 110 pages, 2001.
Jiang, et al., "A unified framework for grasping and shape acquisition via pretouch sensing," Proceedings of the 2013 IEEE International Conference on Robotics and Automation (ICRA), pp. 999-1005, 2013.
Jiang, et al., "Seashell effect pretouch sensing for robotic grasping," Proceedings of the 2012 IEEE International Conference on Robotics and Automation (ICRA), pp. 2851-2858, 2012.
Kim, et al., "Real-time visual SLAM for autonomous underwater hull inspection using visual saliency," IEEE Transactions on Robotics, vol. 29, No. 3, pp. 719-733, 2013.
Kim, et al., "Transatlantic touch: a study of haptic collaboration over long distance," Presence: Teleoperators & Virtual Environments, vol. 13, No. 3, pp. 328-337, 2004.
Kosari et al. (epub Nov. 2014) "Forbidden region virtual fixtures from streaming point clouds," Advanced Robotics, vol. 28, No. 22, pp. 1507-1518, 2014.
Kosari, et al., "Control and Tension Estimation of a Cable Driven Mechanism under Different Tensions," Proceedings of the 2013 ASME International Design Engineering Technical Conferences and Computers and Information in Engineering Conference, Paper No. DETC2013-13548, vol. 6A, 9 pages, 2013.
Kosari, et al., "Haptic Virtual Fixtures for Robotic Surgery," Ph.D. Dissertation, University of Washington, 109 pp, 2013.
Kosari, et al., "Robotic Compression of Soft Tissue," Proceedings of the 2012 IEEE International Conference on Robotics and Automation (ICRA), pp. 4654-4659, 2012.
Kwok, et al., "Dynamic active constraints for hyper-redundant flexible robots," in Medical Image Computing and Computer-Assisted Intervention—MICCAI 2009, Lecture Notes in Computer Science, Springer, vol. 5761, pp. 410-417, 2009.
Lee, et al., "Hapatic Rendering of Point Surfaces," IEEE—Second Joint EuroHaptics Conference and Symposium on Haptic Interfaces for Virtual Environment and Teleoperator Systems, 2007.

(56) References Cited

OTHER PUBLICATIONS

Leeper, et al., "Methods for Collision-Free arm teleoperation in clutter using constraints from 3D sensor data," 13th IEEE-RAS International conference on Humanoid Robots, Atlanta GA, Oct. 2013.
Maimone, et al., "Reducing interference between multiple structured light depth sensors using motion," IEEE Virtual Reality Short Papers and Posters (VRW), pp. 51-54, 2012.
Marani, et al., "Underwater autonomous manipulation for intervention missions AUVs," Ocean Engineering, vol. 36, pp. 15-23, 2009.
Marani, et al., "Underwater target localization," IEEE Robotics & Automation Magazine, vol. 17, No. 1, pp. 64-70, 2010.
Mark, et al., "Adding force feedback to graphics systems: Issues and solutions," Proceedings of the 23rd Annual Conference on Computer Graphics and Interactive Techniques (SIGGRAPH'96), pp. 447-452, 1996.
Massie, et al., "The PHANTOM haptic interface: A device for probing virtual objects," Proceedings of the ASME Winter Annual Meeting, Symposium on Haptic Interfaces for Virtual Environment and Teleoperator Systems, vol. 55, No. 1, pp. 295-300, 1994.
Mayton, et al., "An Electric Field Pretouch system for grasping and co-manipulation," Proceedings of the 2010 IEEE International Conference on Robotics and Automation (ICRA), pp. 831-838, 2010.
McMahan, et al., "Tool contact acceleration feedback for telerobotic surgery," IEEE Transactions on Haptics, vol. 4, No. 3, pp. 210-220, 2011.
McNeely, et al., "Six degree-of-freedom haptic rendering using voxel sampling," Proceedings of the 26th Annual Conference on Computer Graphics and Interactive Techniques (SIGGRAPH '99), pp. 401-408, 1999.
Minsky, et al., "Feeling and seeing: issues in force display," ACM SIGGRAPH Computer Graphics, vol. 24, No. 2, pp. 235-241, 1990.
Morris, et al., "Visuohaptic simulation of bone surgery for training and evaluation," IEEE Computer Graphics and Applications, vol. 26, No. 6, pp. 48-57, 2006.
Newcombe, et al., "Kinectfusion: Real-time dense surface mapping and tracking," Proceedings of the 2011 10th IEEE International Symposium on Mixed and Augmented Reality (ISMAR '11), pp. 127-136, 2011.
Ortega, et al., "A six degree-of-freedom god object method for haptic display of rigid bodies with surface properties," IEEE Transactions on Visualization and Computer Graphics, vol. 13, No. 3, pp. 458-469, 2007.
Ouh-Young, et al., "Using a manipulator for force display in molecular docking," Proceedings of the 1988 IEEE International Conference on Robotics and Automation, pp. 1824-1829, 1998.
Payandeh, et al., "On application of virtual fixtures as an aid for telemanipulation and training," Proceedings of the 10th IEEE Symposium on Haptic Interfaces for Virtual Environment and Teleoperator Systems (HAPTICS 2002), pp. 18-23, 2002.
PCT/US2015/049781, International Search Report and Written Opinion (dated Dec. 11, 2015), 14 pages, 2015.
Petrovskaya, et al., "Global localization of objects via touch," IEEE Transactions on Robotics, vol. 27, No. 3, pp. 569-585, 2011.
Prats, et al., "An open source tool for simulation and supervision of underwater intervention missions," Proceedings of the 2012 IEEE/RSJ International Conference on Intelligent Robots and Systems (IROS), pp. 2577-2582, 2012.
Prats, et al., "Combining template tracking and laser peak detection for 3D reconstruction and grasping in underwater environments," Proceedings of the 2012 IEEE/RSJ International Conference on Intelligent Robots and Systems (IROS), pp. 106-112, 2012.
The International Search Report (ISR) with Written Opinion for PCT/US2015/049781 dated Dec. 11, 2015, pp. 1-14.
Supplemental European Search Report for EP15839693, dated Mar. 12, 2018.

Ramadurai, et al., "Application of Unscented Kalman Filter to a Cable Driven Surgical Robot: A Simulation Study," IEEE International Conference on Robotics and Automation, pp. 1495-1500, 2012.
Ren et al. (Aug. 2008) "Dynamic 3-D virtual fixtures for minimally invasive beating heart procedures," IEEE Transactions on Medical Imaging, 27(8):1061-1070.
Ribas et al. (Oct.-Nov. 2007) "Underwater SLAM in a marina environment," Proceedings of the 2007 IEEE/RSJ International Conference on Intelligent Robots and Systems (IROS 2007), pp. 1455-1460.
Rigaud, et al., "UNION: Underwater Intelligent Operation and Navigation," IEEE Robotics & Automation Magazine, vol. 5, No. 1, pp. 25-35, 1998.
Rosenberg, "Virtual fixtures: Perceptual tools for telerobotic manipulation," Proceedings of the 1993 IEEE Virtual Reality Annual International Symposium, pp. 76-82, 1993.
Ruspini, et al., "The haptic display of complex graphical environments," Proceedings of the 24th Annual Conference on Computer Graphics and Interactive Techniques (SIGGRAPH '97). pp. 345-352, 1997.
Ryden, et al., "A Proxy Method for Real-Time 3-DOF Haptic Rendering of Streaming Point Cloud Data," IEEE Transactions on Haptics, vol. 6, No. 3, pp. 257-267, 2013.
Ryden, et al., "A Computer Vision Approach to Virtual Fixtures in Surgical Robotics," Proceedings of the 2012 RSS Workshop on Algorithmic Frontiers in Medical Robotics: Manipulation in Uncertain, Deformable, Heterogeneous Environments, pp. 1-2, 2012.
Ryden, et al., "A Method for Constraint-Based Six Degree-of-Freedom Haptic Interaction with Streaming Point Clouds," Proceedings of the 2013 IEEE International Conference on Robotics and Automation (ICRA), pp. 2353-2359, 2013.
Ryden, et al., "Advanced Telerobotic Underwater Manipulation Using Virtual Fixtures and Haptic Rendering," MTS/IEEE Conference—OCEANS2013, pp. 1-8, 2013.
Ryden, et al., "Forbidden-region virtual fixtures from streaming point clouds: Remotely touching and protecting a beating heart," Proceedings of the 2012 IEEE/RSJ International Conference on Intelligent Robots and Systems (IROS), pp. 3308-3313, 2012.
Ryden, et al., "Proxy Methods for Fast Haptic Rendering from Time-Varying Point Clouds," Proceedings of the 2011 IEEE/RSJ International Conference on Intelligent Robots and Systems (IROS), pp. 2614-2619, 2011.
Rydén, et al., "Real-Time Haptic Interaction with Remote Environments using Non-contact Sensors," Ph.D Dissertation, University of Washington, 123 pp., 2013.
Ryden, et al., "Using Kinect and a Haptic Interface for Implementation of Real-time Virtual Fixtures," Proceedings of the 2nd Workshop on RGB-D: Advanced Reasoning with Depth Cameras, pp. 1-5, 2011.
Salisbury, et al., "Haptic rendering: Programming touch interaction with virtual objects," Proceedings of the 1995 Symposium on Interactive 3D Graphics (I3D '95), pp. 123-130, 1995.
Senin, et al., "Point set augmentation through fitting for enhanced ICP registration of point clouds in multisensor coordinate metrology," Robotics and Computer-Integrated Manufacturing, vol. 29, pp. 39-52, 2013.
Sutherland, "The Ultimate Display," in Multimedia: From Wagner to Virtual Reality, pp. 232-236, 1965.
Teo, et al., "Obstacle detection, avoidance and anti-collision for MEREDITH AUV," Proceedings of the MTS/IEEE Biloxi—Marine Technology for our Future: Global and Local Challenges (Oceans 2009), pp. 1-10, 2009.
White, et al., "The Malta cistern mapping project: Underwater robot mapping and localization within ancient tunnel systems," Journal of Field Robotics, vol. 27, No. 4, pp. 399-411, 2010.
Williams, et al., "Autonomous underwater simultaneous localisation and map building," Proceedings of the 2000 IEEE International Conference on Robotics and Automation (ICRA '00), vol. 2, pp. 1793-1798, 2000.

(56) References Cited

OTHER PUBLICATIONS

Yu, et al., "Real-time 3D sonar image recognition for underwater vehicles," 2007 Symposium on Underwater Technology and Workshop on Scientific Use of Submarine Cables and Related Technologies, pp. 142-146, 2007.

Zilles, et al., "A constraint-based god-object method for haptic display," Proceedings of the 1995 IEEE/RSJ International Conference on Intelligent Robots and Systems, pp. 146-151, 1995.

* cited by examiner

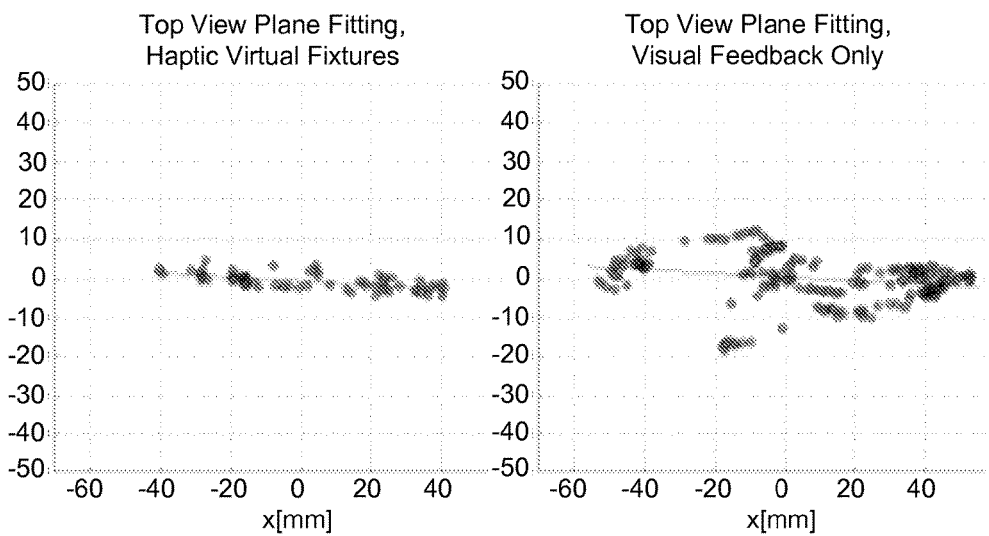
FIG. 6E  FIG. 6F
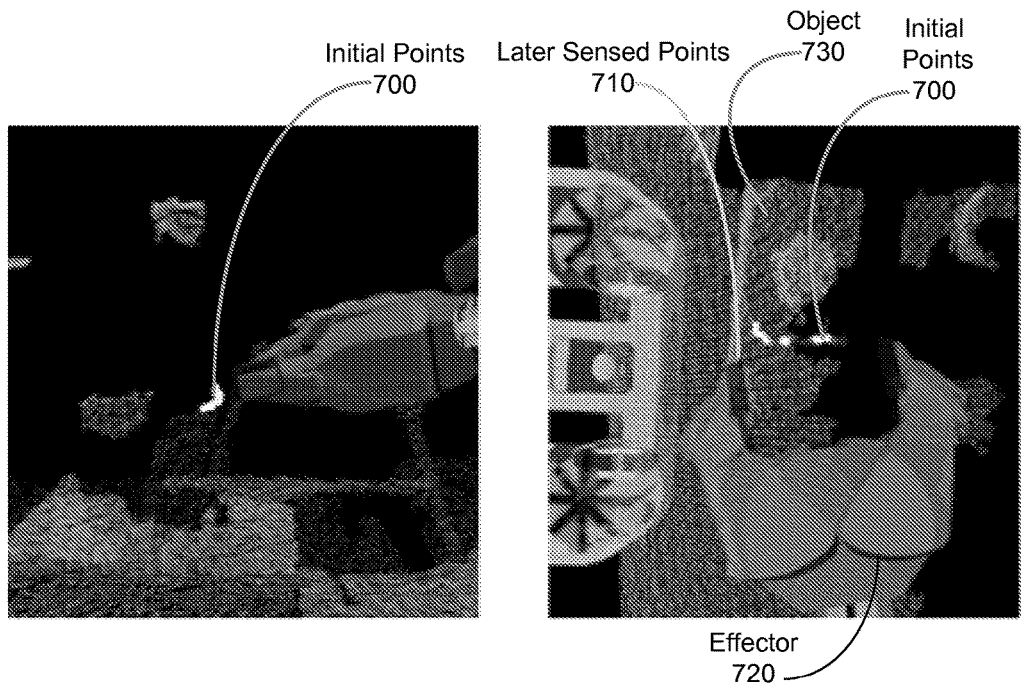
FIG. 7A  FIG. 7B

INTEGRATION OF AUXILIARY SENSORS WITH POINT CLOUD-BASED HAPTIC RENDERING AND VIRTUAL FIXTURES

CROSS-REFERENCE TO RELATED APPLICATIONS

This application is a U.S. national phase of International Application No. PCT/US2015/049781, filed on Sep. 11, 2015, which claims priority to U.S. Provisional Application No. 62/049,484, filed Sep. 12, 2014, all of which are incorporated by reference herein in their entirety.

STATEMENT OF GOVERNMENT RIGHTS

This invention was made with government support under DGE-1256082, awarded by the National Science Foundation. The government has certain rights in the invention.

BACKGROUND OF THE INVENTION

Unless otherwise indicated herein, the materials described in this section are not prior art to the claims in this application and are not admitted to be prior art by inclusion in this section.

Many environments can be explored by robots, such as undersea, outer space, and hazardous environments. In some of these environments, a robotic device can be controlled by a human operator receiving video and/or audio information from the robotic device. Human control of the robotic device combines the experience and awareness of a human being with the precision, repeatability and accuracy of machines by providing primary control of robotic motion.

A challenge can arise when trying to provide a virtual environment to the human operator that is realistic, immersive representation of a remote environment where a robot is operating, so that the human operator can effectively and easily control a robot via interactions with the virtual environment. The human operator should receive as much information about the remote environment as possible in an intuitive manner so the operator's focus is not distracted from the remote task at hand. Feedback qualities are critical to the effectiveness of a remote operation user interface used to facilitate these interactions with the virtual environment. Then, the human operator can make proper decisions to efficiently complete the task with minimal physical and mental effort.

A combination of feedback quantities beyond simple monocular vision can assist the operator by overlaying sensory information over data captured from the remote scene using virtual haptic fixtures. For example, virtual haptic fixtures and three-dimensional (3D) mapping techniques used to provide the virtual environment can enhance task efficiency and awareness. In particular, one or more haptic guidance fixtures can be provided using haptic rendering techniques that translate forces in a virtual environment to a physical device that can provide touch-based, a.k.a. haptic, feedback to a user of the haptic rendering device. The haptic rendering device can be controlled using a "Haptic Interaction Point" (HIP) in the virtual environment, which performs a similar function for the haptic rendering device as a mouse pointer does for a computer mouse. Ideally, the HIP should not be able to penetrate virtual environment objects.

Along with providing haptic feedback about the virtual environment, objects in the virtual environment are often represented as a collection of polygons, such as triangles, that can be operated upon using a haptic rendering device. In some cases, 3D mapping can be used to enhance visual feedback provided to the human operator about the remote environment.

In recent years, inexpensive Red-Green-Blue-Depth (RGB-D) cameras can provide non-contact means of collecting geometrical and boundary information of an observed (remote) environment in real time and providing the collected information as point cloud data to a remote computing device providing the virtual environment. The point cloud data to can be useful for providing haptic interaction with the virtual environment, calculating grasper configurations, and for other tasks. Several technologies, such as time-of-flight and structured light, have been used in different commercially available depth cameras For example, an RGB-D camera can gather color and geometric data from the remote environment. This color and geometric data can be used to generate a virtual environment where the human operator is presented with a monocular color video stream and a 3D-mapping voxel representation of the remote scene. In some cases, the human operator can interact with and/or place virtual haptic fixture(s) to complete a remote manipulation task, such as grasping and/or turning an object in the remote environment.

Techniques for six degree-of-freedom haptic rendering in virtual environments consisting of polygons and/or voxels (volume pixels) have been specified. These efforts are typically divided into direct rendering and virtual coupling methods where the latter can further be subdivided into penalty-, impulse- and constraint-based methods. The simplest 6-DOF haptic rendering method is the direct method, where the virtual tool perfectly matches the configuration of the haptic rendering device. The force sent to user is directly based on the amount of penetration in the virtual environment. Unfortunately the direct method suffers from problems with "pop through". Pop through is an artifact that arises when the rendering algorithm erroneously penetrates a thin surface.

In virtual coupling methods, a virtual coupling, or connection, between the haptic rendering device and the virtual tool is utilized. In this method, the force on the haptic rendering device is simply calculated as a spring between the virtual tool, referred to also as "god-object", "proxy" or "IHIP", and the configuration of the haptic rendering device. 6-DOF rendering methods using virtual couplings rely on rigid body simulations, since the virtual tool has to be simulated as a 6-DOF object, as compared to 3-DOF rendering where the rotational component can be ignored. In penalty-based methods, the configuration (position and rotation) of the virtual tool is calculated using penalty forces based on the tool's penetration depth into objects, similar to how penalty-costs are used in traditional optimization. These penalty forces are then integrated to produce the motion of the virtual tool. This method results in a virtual tool that actually penetrates objects in the environment. Fortunately this penetration is typically very small.

For impulse-based dynamics methods, a virtual object is moved by a series of impulses upon contact/collision (rather than forces based on penetration depth). In constraint-based methods, the virtual tool moves into contact with the environment but (ideally) never violates constraints imposed by the environment.

SUMMARY

In one aspect, a method is provided. A computing device receives first data about an environment from a first group of one or more sensors. The computing device models the environment as a virtual environment based on the first data. The computing device determines whether to obtain additional data to model the environment. After determining to obtain additional data to model the environment, the computing device receives second data about the environment and model the environment as the virtual environment based on at least the second data. The computing device generates a display of the virtual environment.

In yet another aspect, a computing device is provided. The computing device includes a processor and data storage. The data storage stores instructions that, upon execution by the processor, cause the computing device to perform functions. The functions include: receiving first data about an environment from a first group of one or more sensors; modeling the environment as a virtual environment based on the first data; determining whether to obtain additional data to model the environment; after determining to obtain additional data to model the environment: receiving second data about the environment, and modeling the environment as the virtual environment based on at least the second data; and generating a display of the virtual environment.

In another aspect, an article of manufacture is provided. The article of manufacture includes a tangible computer-readable storage medium. The tangible computer-readable storage medium stores instructions that, upon execution by a processor of the article of manufacture, cause the article of manufacture to perform functions. The functions include: receiving first data about an environment from a first group of one or more sensors; modeling the environment as a virtual environment based on the first data; determining whether to obtain additional data to model the environment; after determining to obtain additional data to model the environment: receiving second data about the environment, and modeling the environment as the virtual environment based on at least the second data; and generating a display of the virtual environment.

BRIEF DESCRIPTION OF THE DRAWINGS

Various examples of particular embodiments are described herein with reference to the following drawings, wherein like numerals denote like entities, in which:

FIGS. 6A-6F shows plane fitting results from surface exploration trials with points sensed with both visual and haptic feedback and those with visual feedback only, in accordance with an example embodiment;

FIGS. 7A and 7B are images from an experiment sensing a transparent bottle surface for human-operated grasping by a robotic device, in accordance with an example embodiment;

DETAILED DESCRIPTION

Figure 1:
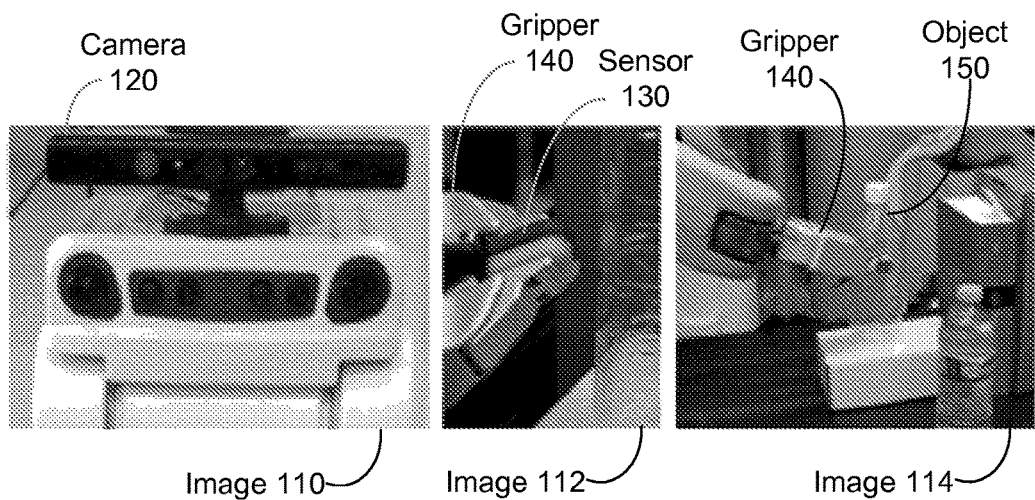
FIG. 1 shows a robotic system, in accordance with an example embodiment.

In remote or mobile robotics, oftentimes autonomy is insufficient for the completion of a challenging robotic task. Human guidance can benefit tasks such as grasping transparent objects, manipulating objects in cluttered environments, and maneuvering in the absence of complete geometric information. In such cases, a human operator can close the robot control loop by augmenting the task with human intelligence and perhaps additional sensor information. In cases involving high-value and/or delicate physical structures (for example, bomb defusing or surgery), it can be important that the operator is able to perceive as much information about the remote environment as possible. Moreover, it may be pivotal that the robot avoid un-intended contact with the object.

In scenarios where a human operator remotely guides operation of a robot, sensors on the robot can provide information about an environment around the robot. For example, a sensor can detect, measure, and/or obtain information about one or more properties of the environment. Example properties of the environment include, but are not limited to: electromagnetic radiation (including light) in the environment, sound, temperature/heat, radiation, weather-related/atmospheric properties (e.g., wind speed, humidity, barometric pressure), chemical and/or biological properties (e.g., presence, absence, and/or concentration of one or more particular chemical and/or biological elements, compounds, entities, and/or processes), proximity to and/or location of one or more objects in the environment, and electrical properties. This information can include one or more streams of visual and perhaps depth data related to objects in the environment.

In some embodiments, the information can be organized into a point cloud, or group of data points related to the environment. The point cloud data can be obtained in real-time and provide boundary information about a physical scene. However, in some scenarios, a real-time representation of the environment can include sparse scenes littered with "holes" occurring from occlusions, optical properties (e.g., properties of transparent objects), glancing incidence angles and other factors. This is undesirable for applications in which accurate and dense 3D information retrieval directly affects a task at hand, such as grasping.

To address holes in the point cloud data, pre-touch depth information gathered from the robot tool-tip can be used to populate sparse areas of interest. Pre-touch sensing can refer to the use of one or more non-contact proximity sensors, such as seashell sensors and infra-red sensors. The non-contact proximity sensors can be integrated into a robot manipulator or other component to obtain data about objects near (proximate to) the robot without contact. Because pre-touch sensing is a non-contact mechanism, the robot can obtain data without displacing the object. Then, the point cloud can be augmented with the additional data, perhaps leading to a point cloud with fewer or no holes, and the augmented point cloud can be used for haptic rendering for robot guidance; e.g., for the operator to control the robot to perform a grasping (or other) task.

Some tasks can have better outcomes if point-cloud related information is gathered without physical contact with the object. For example, a non-contact proximity sensor fixed to the robot end effector is used to sense physical geometries nearby the robot. Thus, the point cloud representation of an unknown environment, which may be sparse or poorly visible, can be enhanced through telerobotic exploration/sensing in real-time. Furthermore, realtime haptic rendering algorithms and virtual haptic fixtures used in combination with the augmented streaming point clouds can assist the operator in performing the task in general and specifically for collision avoidance during the task.

As additional geometric data from the pre-touch channel are incorporated into the point cloud representation of the object to be grasped, haptic rendering methods for streaming point clouds as well as forbidden-region virtual haptic fixtures are used to enforce a minimum distance between the robot end effector and sensed object surfaces.

The techniques described herein use 3DOF haptic feedback and one dimensional pre-touch sensing to assist a human operator of a robotic device in exploring unknown, static environments in a telerobotic grasping task. It has particular application in obtaining geometries of a transparent object while preventing undesired collisions. The streaming point cloud data is augmented with pre-touch proximity sensor information, which is used for both haptic rendering and refining the shape of the object without physical contact. Theoretical analyses were performed to design the virtual haptic fixtures suitable for pre-touch sensing; experiments with an opaque cardboard box were conducted to verify the effectiveness of this approach, while successful teleoperated grasp of a transparent object was achieved. By fusing haptic feedback and pre-touch sensing, the augmented point cloud and virtual haptic fixtures provide the human operator with critical geometrical information of a grasp target while simultaneously preventing the robot end effector from colliding with the grasp target.

These techniques provide the ability to select data from a number of sensors to obtain data for virtual environments, such as point data for point clouds. The different sensors can have different ranges, obtain data using different techniques, measure different conditions in the environment, have differing abilities to operate within the environment (e.g., some sensors can work better at night, some sensors can work better in foggy or sunny weather, some sensors can work better in crowded environments), and have other differing properties. Examples of these different sensors include the sensors mentioned as sensor 976b below.

These sensors can measure different properties, and so provide different types of data, for accurately modeling a real-world environment. For example, in a task involving task exploration and detection of ordnance: data from an RGB-D camera can be used to provide imagery and depth information about the real-world environment, radiation, chemical, and biological sensors can be used to provide data usable for detecting/locating the weapons, and infra-red sensors can provide data that, when visualized, can aid a human operator in directing a robotic device toward a relatively-warm or relatively-cool objects. Data from the sensors can be merged for modeling the environment as a virtual environment. The virtual environment and/or virtual haptic fixture(s) can provide visual, haptic, and perhaps auditory feedback to a human operator, enabling the human operator to provide commands to a robot so that the human operator/robotic team can carry out tasks in the environment.

Using multiple sensors also allow for better data in cases where sensors encounter faults and/or fail, as well as filling gap(s) in data obtained from one sensor (or set of sensors). Multiple sensors can have different and perhaps overlapping ranges that enable sensing of data at various distances and so enable merging the data from the different sensors into a comprehensive virtual environment that accurately models a real-world environment; e.g., in an underwater environment, a SONAR range finder can be used to detect objects at relatively long ranges, a camera can be used to detect objects at relatively short to medium ranges, and proximity sensors can be used to detect objects at relatively close ranges. Then, one type of sensor may be able to obtain environmental data where another type of sensor is occluded or otherwise unable to obtain environmental data, and so increase the likelihood for getting sufficient data, leading to likely better task performance. In some cases, redundant sensors can be used to ensure that a single point of failure does not leave a robot without use of a particular type of sensor, such as using redundant RGB-D cameras to ensure that a single failing camera does not leave the robot unable to obtain visual and depth data.

Sensor-Aided Teleoperated Grasping of Transparent Objects

FIG. 1 shows a robotic system, in accordance with an example embodiment. The robotic system can include a bilateral teleoperation arrangement, in which the remote/slave robot includes a Willow Garage PR2 robot with a head-mounted RGB-D camera, such as a Microsoft Kinect camera shown as camera 120 in image 110 of FIG. 1. Image 112 of FIG. 1 shows a seashell effect pre-touch sensor 130 is integrated into PR2 gripper 140 to sense geometries undetected by the RGB-D camera. A seashell sensor, such as sensor 130, can detect a frequency response change in an acoustic resonator. In some embodiments, the seashell effect sensor can have a reliable sensing range; e.g., a range within 1-5 mm.

A human operator can use a master console to control the robot, where the master console can include a computing device in communication with the robot, an associated display, and one or more haptic devices, such as Geomagic® Touch™ haptic device(s). This master console can send position and orientation commands to control one or more of the robot's actuators (e.g., arms) and receive and display haptic force feedback commands, such as 3 degrees of freedom (3DOF) commands and 6 degrees of freedom (6DOF) haptic commands. As an example task that can be carried out using the master console, image 114 of FIG. 1 shows gripper 140 grasping transparent object 150. Using the master console, the operator can explore unknown, potentially sensitive object(s) that may be partially occluded in the point cloud data gathered from the RGB-D camera.

The herein-described techniques involve integration of pre-touch sensing data and haptic feedback for teleoperation (remote operation) of robotic devices. To evaluate this approach, operator performance in exploring the surface of an unknown static (not moving) grasp object can be compared under the following two different user scenarios:

User Scenario 1: Point cloud and RGB information augmented with non-contact proximity sensor (e.g., seashell sensor, infrared sensor) information.

User Scenario 2: Point cloud and RGB information augmented with non-contact proximity sensor information and haptic feedback during exploration.

User Scenario 1 represents a baseline case in which the operator may explore occluded or undetected regions of the grasp object with a non-contact proximity sensor, thus augmenting visual feedback received by the operator. To protect the delicate grasp target or to prevent undesired motion during exploration, User Scenario 2 includes virtual haptic fixtures to prevent unintentional contact.

Grasping Transparent Objects

Transparent materials and objects can present a particular problem for robotic grasping. Namely, for a robot, identifying and recognizing transparent objects using computer vision techniques can be difficult. Computer vision techniques can fail to precisely identify configurations of and/or segment transparent objects due to sometimes-changing visibilities of transparent objects based on background and lighting conditions, possibly indistinct edges, lack of distinguishable textures to isolate transparent objects, and perhaps other issues. Commercially available RGB-D cameras can obtain geometrical point cloud data of an observed scene. However, an issue remains with reconstructing unseen transparent objects without prior knowledge, as these sensors cannot reliably measure depth of such objects.

Automatic reconstruction of transparent objects based only on depth camera information is not amenable to robotic manipulation in unknown, sensitive environments. Therefore, the herein-described techniques can involve use of additional sensors than RGB-D cameras. In conjunction, the herein-described techniques can use pose estimation of a teleoperated robotic arm to register additional sensor information, effectively augmenting point cloud information with data collected in sparse regions of the point cloud.

Augmenting Point Clouds

Real-time streaming point cloud information from current RGB-D cameras can provide incomplete data, particularly with respect to transparent objects, leading to incomplete or poorly visible geometries of an observed environment. Several approaches have been taken to produce denser point clouds from these sensors and to increase coverage of point cloud data. In some cases, a global implicit surface representation of an indoor scene can be constructed and built up in real-time from multiple scans using the same Kinect sensor. While implicit surface representations can provide a dense reconstruction of a room-sized surface, localization of scans can be problematic at different scales. Moreover, generation of implicit surface representations can involve the movement of a single RGB-D camera around a target surface, a stipulation that may not be feasible in telerobotics and/or in constrained environments. Further, implicit surface representation methods may not address transparent objects.

In other cases, multiple RGB-D cameras, such as Kinect cameras, can be used to observe a scene from several angles, followed by registration and stitching of the multiple sources to reconstruct the scene. An example scene can be based on observation of an instrumented room. One problem in using identical cameras using similar structured light pattern sensing methods is eliminating inter-camera interference. Such interference can be ameliorated by motion; for examples, each camera can have separate high frequency motion patterns or offset-weight vibration motors can be used for the cameras. In some scenarios, different point sets with varying sensor characteristics, such as different RGB-D technologies, can be registered with each other using enhanced iterative closest point algorithms and provided measurement data. Use of such different point sets can integrate homogenous scans of the same static scene from different types of sensors, strategically placing and registering two or more separate RGB-D cameras may be troublesome, because of space requirements and/or by the nature of the task at hand. Furthermore, in the case of telerobotics, a region of particular interest frequently is located within the direct vicinity of the robot end effector, and so the end effector can occlude a region of interest from RGB-D cameras. This is of particular concern during grasping tasks, where the robot end effector is proximate to the surfaces/regions of interest.

End effector mounted sensors can be amenable to grasping tasks than RGB-D cameras acting as wide-range sensors. Sensors fixed to tool-tips/end-effectors can solve at least two problems. First, a sensor on an end effector likely will not occlude measurements of objects near the end effector. Secondly, the issue of registration with respect to the robot base frame is left to sensor precision and accuracy, assuming robot kinematics are well known and pose estimation is reliable. Additionally, some available real-time depth sensors can sense transparent surfaces.

To explore regions of the point cloud, the end effector sensor can be a tactile sensor or a non-contact sensor. A tactile sensor can require several probes or palpations of an object to build a point cloud representation of the object. Tactile sensors can provide sensor measurements whose accuracy and precision are left mainly to kinematics; however, tactile sensing requires contact with the object. Thus, tactile sensing could potentially displace the object of interest. And as more data are acquired, the obtained point cloud becomes more and more distorted as objects and geometries move. Moreover, in a delicate or sensitive scenario, such as a bomb-disposal or surgical scenario, object contact can be harmful or even disastrous.

To address these issues, a robot, such as the above-mentioned PR2 robot, can be equipped with one or more head-mounted RGB-D cameras, such as Kinect cameras, to capture RGB-D information as well as with one or more seashell effect pre-touch sensors placed on end effector(s) for local sensing. Pre-touch sensor information and point cloud registration can be done using the PR2's kinematics, since both sensors are mounted to known robot frames of reference; e.g., mounted to the head of the robot for the RGB-D camera and to end effector(s) of the robot arm(s) for the seashell sensor(s).

A seashell sensor can have several useful pre-touch sensor traits. Fr example, the seashell sensor can provide reliable geometric data within the last centimeter prior to object contact, can sense transparent objects, and can be mounted on end effector(s) to collection of reliable depth information near the end effector(s), among other advantages. Using the seashell sensor as non-contact pre-touch sensor, depth and geometric information within the vicinity of the robot end effector can be easily collected during and prior to grasping with the end effector. As the robot end effector explores, the point cloud representation becomes denser in the explored regions near the grasp target before contact.

Haptic Rendering for Collision Avoidance Using Virtual Haptic Fixtures

In grasping tasks, unknown or poorly perceived objects are problematic, especially in unknown and potentially delicate environments. For automated or semi-automated robots, heuristic grasp planning algorithms can handle the uncertainties related to objects, but may not prevent collisions. An example iterative grasp planning and exploration framework with a pre-touch sensor can reduce object shape uncertainty before grasping. However, the framework only applies for autonomous grasping tasks, not human-in-the-loop operation grasping. A technique for constraint-aware operation has been proposed whereby motion planning adheres to joint limit and collision constraints. In the constraint-aware technique, the user/operator can provide an ending goal and the technique can generate a motion path under the given constraints. The collision constraints, however, may be captured from an RGB-D camera, which can be prone to holes and may miss transparent features. Local features, particularly at the grasping site, may be unaccounted for if only wide-range cameras are used.

In the techniques described herein, the operator can be given direct control of the robot end-effector location and orientation during robot operation. More specifically, the technique can include proxy tracking for controlling motion of the PR2 grasper, in which a user's position and orientation inputs to a haptic device controlling the robot correspond to scaled position and orientation of a haptic interaction point (HIP) within a virtual point cloud representation of the environment. Virtual coupling methods for proxy/HIP movement algorithms and kinesthetic: force feedback in streaming point clouds are employed in this technique, with forbidden region virtual haptic fixtures used around points generated from data obtained by sensors such as pre-touch sensors and/or RGB-D cameras. The proxy can be restricted from entering within a certain distance of each point using the forbidden region virtual haptic fixtures. Thus, the proxy can represent a point location representative of the user's commands while maintaining a safe distance from sensed surfaces. As a robot grasper or other end effector tracks the proxy, collisions are avoided.

An integral part of a remote robotic operation system is maintaining a predefined trajectory, so to avoid collisions with objects in the environment, to coordinate with any other entities (objects, robotic devices, vessels, humans, etc.) in the environment, to efficiently carry out tasks, and perhaps other reasons. Haptic feedback provided using virtual haptic fixtures can be used to maintain the predefined trajectory.

A virtual haptic fixture can provide haptic feedback that guides a human operator toward a desirable point or direction or guide the human operator away from an undesirable point or direction. Example virtual haptic fixtures include guidance fixtures, forbidden region fixtures and combination fixtures. Guidance fixtures can be used to instruct a human operator (or other entity) to direct part or all of a robotic device toward a desired location or region of the virtual environment. Forbidden region fixtures can be used to instruct the operator (or other entity) to direct part or the entire robotic device to avoid collision with one or more objects of the virtual environment. Combination fixtures can be used to instruct the operator (or other entity) to direct part or the entire robotic device based on where the (part of the) robotic device is with respect to the environment and/or with respect to one or more objects.

Collision prevention can be particularly difficult with sparse point clouds. To help fill in sparse point clouds, a tool-tip/end effector mounted depth sensor, such as a non-contact proximity sensor, can be used to sense geometries of sparsely populated regions of a point cloud. While some non-contact proximity can provide one dimensional depth readings, a haptic rendering algorithm can rely on a minimum density and number of points within the vicinity of any point along a surface.

One or more forbidden region virtual haptic fixtures can be placed around sensed points, and specific geometries of the fixture(s) can be accounted for while exploring a region with a sparse amount of sensed points. For some non-contact proximity sensors, depth readings from the non-contact proximity sensor can be one or more one-dimensional real values. In some implementations, a non-contact proximity sensor can provide reliable depth readings within a range of distances; e.g., a range between 1 mm and 5 mm for seashell sensors.

Table 1 below shows definitions for variables discussed herein.

TABLE 1

| | |
|---|---|
| $d$ | non-contact proximity sensor depth |
| $d_{min}$ | minimum non-contact proximity sensor depth |
| $d_{max}$ | maximum non-contact proximity sensor depth |
| $r_v$ | virtual haptic fixture radius |
| $f_h$ | point spacing interval |
| $r_p$ | proxy contact radius |
| $\bar{\epsilon}$ | net tracking error |
| $\bar{\epsilon}_t$ | steady state tracking error |
| $\vec{v_p}$ | Instantaneous velocity of the proxy |
| $\tau$ | tracking latency |

An example grasping target is a convex geometrical surface without acute angles. During an exploration phase, the seashell (or other non-contact proximity) sensor explores with sensor direction near normal to a desired surface (assuming exploration starts with known areas of the object). Exploration and search for local features of the grasping target can be determined, and thus the master position commands are scaled down in the virtual environment. Consequently, a maximum robot end effector velocity can exceed a velocity of a HIP used for virtual rendering. The discussion below related to a two-dimensional (2D) environment can be extended to 3D.

Figure 2:
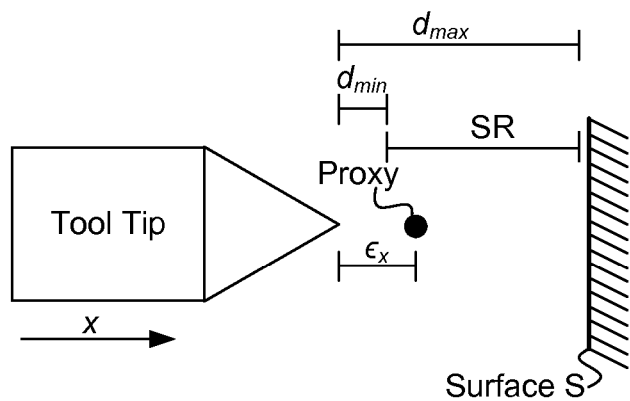
FIG. 2 depicts an example exploration scenario, in accordance with an example embodiment.

FIG. 2 depicts an example exploration scenario, in accordance with an example embodiment. In the scenario, a robot end-effector with a seashell sensor, shown in FIG. 2 as "Tool End", approaches a flat surface S in an x direction that is normal to surface S. In the scenario, surface S is not yet known or seen. The seashell sensor can follow the location of the proxy Proxy with tracking error $\epsilon_x$ in the x direction. A sensing range, shown as SR in FIG. 2 is defined by $d_{min}$ and $d_{max}$. Respective example values for $d_{min}$ and $d_{max}$ are 1 mm and 5 mm; other values are possible as well.

To establish limits on the tracking error based on sensing distance, consider the case in which instantaneous proxy velocity $\vec{v}_p$ is bounded by a maximum speed $v_{max}$, in a direction x normal to surface S and where tracking latency τ occurs between commanded movement and robot actuation. Then, a worst case position tracking error $\vec{\epsilon}$ can be determined using Equation (1):

$$\vec{\epsilon} = v_{max} \left[ \frac{\vec{v}_p}{|\vec{v}_p|} \right] \tau + \vec{\epsilon}_t \tag{1}$$

A purpose for a virtual haptic fixture, such as a forbidden region related to the object surface, is to prevent the proxy from penetrating the object surface. FIG. 2 indicate that if $\epsilon_x \geq d_{max}$, where $\epsilon_x$ is the net position tracking error in the positive x direction that is normal to surface S and $d_{max}$ is the maximum non-contact proximity sensor depth, the proxy can reach surface S before it is sensed. Therefore, Inequality (2) arises:

$$\epsilon_x < d_{max} \tag{2}$$

Bounds on a Radius of a Virtual Haptic Fixture

Once a surface is sensed, virtual haptic fixtures, such as forbidden region and guidance fixtures, can be used to control exploration in the virtual environment about a sensed point. As examples, a forbidden region fixture can be used to prevent collisions by providing feedback to the human operator to avoid a forbidden region established by the forbidden region fixture, and a guidance fixture can guide the human operator along a (collision-free) pathway established by the guidance fixture. Then, by controlling exploration of the human operator in the virtual environment, a remotely-controlled robot can be guided to avoid collisions in the actual, remote environment.

Establishing bounds on virtual haptic fixture radius $r_v$ requires further analysis. FIG. 3A illustrates a lower bound on $r_v$ to prevent collision by a robotic object's tool tip/end effector Tool Tip moving in an x direction perpendicular to an object having a surface S. In an initial consideration of motion only in the x direction with $\epsilon_x < 0$, assume that a sensor such as the non-contact proximity sensor has sensed point P1 on surface S as shown in FIG. 3A.

When Inequality (3) below is satisfied, tool-tip/end effector Tool Tip can be prevented from physically touching the surface in the remote location:

$$r_v > -\epsilon_x \tag{3}$$

Then, when $\epsilon_x > 0$, it follows that $r_v \geq 0$.

Figure 3B:
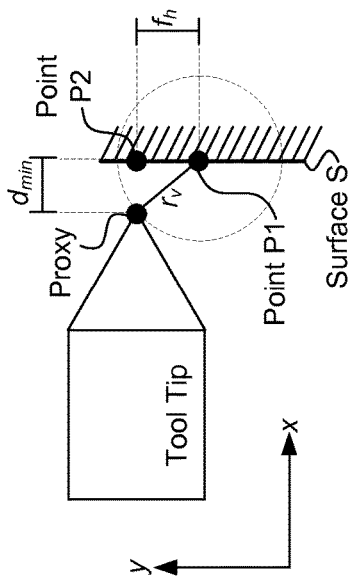
FIG. 3B illustrates another lower bound on a radius of a virtual haptic fixture, in accordance with an example embodiment.
Figure 3D:
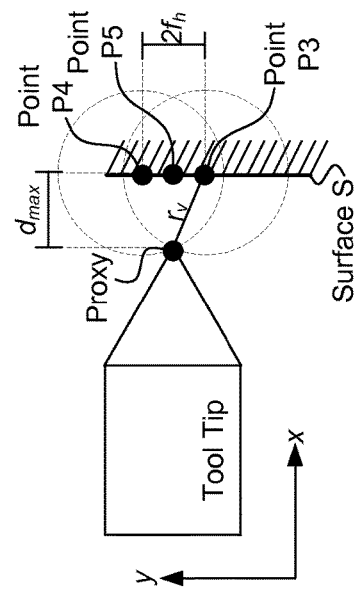
FIG. 3D illustrates an upper bound on a radius of a virtual haptic fixture that allows point spacing according to a spacing interval after dense exploration of a surface, in accordance with an example embodiment.
Figure 3A:
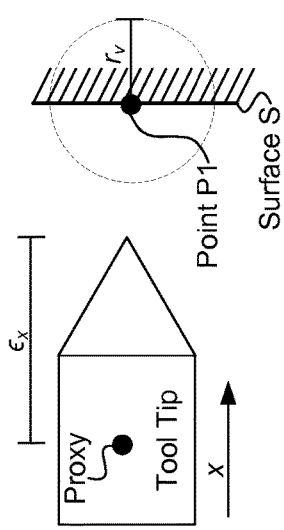
FIG. 3A illustrates a lower bound on a radius of a virtual haptic fixture, in accordance with an example embodiment.
Figure 3C:
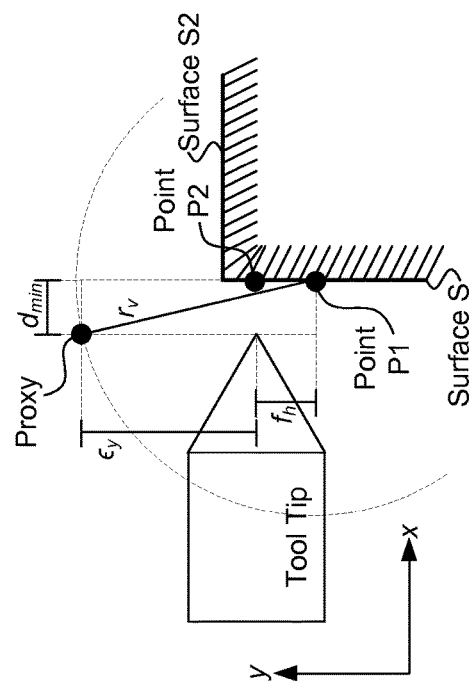
FIG. 3C illustrates conditions on related to spacing of points in a point cloud, in accordance with an example embodiment.

FIG. 3B illustrates a lower bound on $r_v$ to prevent collision while moving Tool Tip perpendicular to surface S, where the robotic device is within sensing range $[d_{min}, d_{max}]$ of surface S from original point P1 to sense another point P2 for the point cloud. Suppose that additional points than P1 on surface S are necessary to ensure that a point cloud accurately reflects the surface S. Also suppose that Tool Tip may move in a direction perpendicular to x. Without loss of generality, let that direction be y as shown in FIGS. 3B, 3C, and 3D. Then, a virtual haptic fixture can prevent the tool-tip from reaching the surface before a new point, such as point P2 shown in FIG. 3B, is sensed by the non-contact proximity sensor.

Let $\vec{\epsilon} = 0$ as shown in FIG. 3B. Then, a bound on $r_v$ can be described by Inequality (4) below:

$$r_v \geq \sqrt{d_{min}^2 + f_h^2} \tag{4}$$

with $d_{min}$ being the minimum non-contact proximity sensor depth.

Now consider both movement and error in a direction perpendicular to x. The concern in this situation is that Tool Tip comes into contact with a physical object in the remote location despite a proxy, such a Proxy shown in FIGS. 3A-3D, being constrained by one or more virtual haptic fixtures. But, Proxy and thus Tool Tip are free to move in the x direction.

FIG. 3C illustrates conditions on related to spacing of points in a point cloud, in accordance with an example embodiment. At least two factors must be considered for sensing additional points of a point cloud without contacting surface S. First, the virtual haptic fixture radius should prevent Proxy from further movement in the x direction so that Tool Tip does not come within distance $d_{min}$ of the surface. Second, Proxy should move in they direction enough so that the non-contact proximity sensor can detect another point that is at least a spacing interval $f_h$ away from the originally sensed point. These conditions are depicted in FIG. 3C before inserting point P2 into the point cloud.

Another lower bound on $r_v$ can be described by Inequality (5) below:

$$r_v \geq |\sqrt{d_{min}^2 + (\epsilon_y f_h)^2}| \tag{5}$$

By adding terms for tracking error in the x direction, Inequality (5) be extended to Inequality (6) below:

$$r_v \geq |\sqrt{(d_{min} - \epsilon_x)^2 + (\epsilon_y f_h)^2}| \tag{6}$$

Inequality (6) can be augmented by adding another distance term in order for the entire end effector to clear the physical object.

FIG. 3D illustrates an upper bound on $r_v$ that allows point spacing according to spacing interval $f_h$ after dense exploration of surface S, in accordance with an example embodiment. Suppose that two points P3 and P4, spaced $2f_h$ apart have already been sensed on the surface, as shown in FIG. 3D. Then, a point P5 between these two points can be sensed at a distance of $f_h$ as shown in FIG. 3D. From this, an upper bound on $r_v$ can be found using Inequality (7):

$$r_v \leq \sqrt{d_{max}^2 + f_h^2} \tag{7}$$

In some embodiments, a maximum spacing of sup $[0, 2f_h)$ can be used for sensing points for a point cloud.

Experimental Implementation and Results

The completion of a successful teleoperated grasp consists of two main components: gathering sufficient geometrical information of the grasp target, and the executed grasp itself. To test algorithms for gathering sufficient geometric information about the grasp target, a two-part experiment was performed. The two parts are (1) exploration of an occluded face of a flat cardboard box and (2) validation through exploration and grasp of transparent grasp target.

The test scenario of an opaque box surface is amenable to repeatable quantitative analysis of the herein-described algorithms because the unseen, occluded faces of a cardboard box simulate the unseen geometries of a transparent object. Also, faces of the cardboard box that are successfully measured by the RGB-D camera can provide a physical reference frame for repeatable exploration trajectories and a clear visualization of displacement during exploration.

Human operation experiments were consistently repeated and displacement is easily visualized with the opaque box. Example point spacing and virtual haptic fixture radius values can be determined as follows. A seashell sensor used in the experiments as a non-contact proximity sensor has a reliable sensing range between 1-5 mm and produces a monotonic signal for distances between 0-10 mm. To determine a virtual haptic fixture radius, max ($|\vec{\epsilon}|$) was used as a conservative upper bound on both $\epsilon_x$ and $\epsilon_y$. To reduce $|\vec{\epsilon}|$, user motions were scaled down and maximum HIP speed $v_{max}$ was reduced to 3 cm/sec. Steady state tracking error within the workspace was measured to be ≈2 mm within a settling time of 50 ms. An upper bound for $|\vec{\epsilon}|$ can be determined using the inequality below, which can be derived from the triangle inequality and Equation (1):

$$|\vec{\epsilon}| \leq v_{max}\tau + 2 \text{ mm}$$

In a particular experimental setup, $|\vec{\epsilon}| \leq 3.5$ mm, which satisfies Inequality (2).

A value of 70 mm (the width of a transparent bottle) was used as a lower bound on a surface size to be explored. To sample 8 points across a 70 mm surface, a spacing of $f_h$=10 mm can be used. This value of $f_h$ yields, from Inequality (7), an upper bound of $r_v \leq 125$ mm. Therefore, a value for virtual haptic fixture radius $r_v$ of 11 mm was selected. During teleoperated exploration, sensing may occur at angles not normal to the surface and most points will be registered when exploring an area which is not yet discovered. Thus, point spacing less than 10 mm for points in a point cloud is expected and desired.

Contact avoidance must also be ensured. To that end, depths sensed from the seashell sensor were recorded as new points whenever they were at least $f_h$=0.5 mm from any other sensed point. The 0.5 mm value for $f_h$ satisfies Inequality (6) as indicated below:

$$11 \text{ mm} = r_v \geq |\sqrt{(d_{min}-\epsilon_x)^2 + (\epsilon_y + f_h)^2}| = \sqrt{36.25} \text{ mm}.$$

Figure 4:
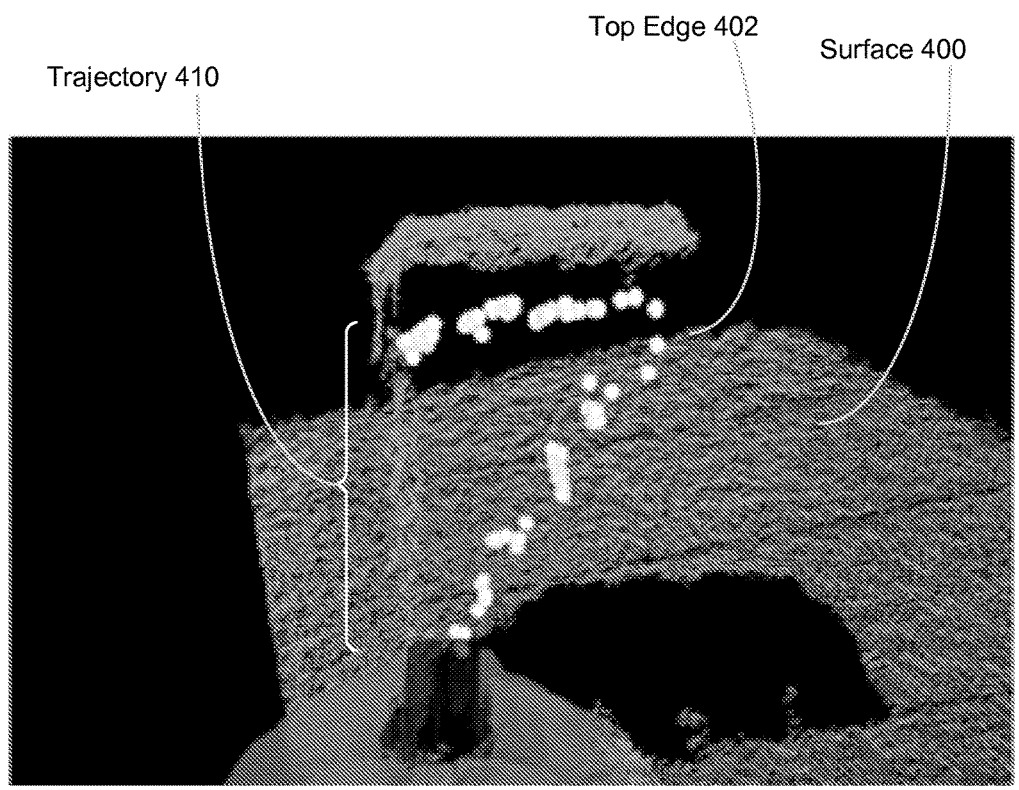
FIG. 4 shows a trajectory used to explore a surface, in accordance with an example embodiment.

FIG. 4 shows trajectory 410 used to explore surface 400, in accordance with an example embodiment. With point spacing and virtual haptic fixture radius values chosen, virtual haptic fixtures were used to explore a simple flat surface (the face of an opaque cardboard box) by taking a specific trajectory. In particular, the exploration was performed to follow trajectory 410, which is shown using white dots in FIG. 4, to travel over surface 400 representing a face of the opaque box. The human operator was asked to discover an unknown surface of the box while attempting to avoid contact by exploring along top edge 402 of surface 400, and then returning to a bottom corner of surface 400 (not shown in FIG. 4) across the diagonal of the box face.

During operation, the human operator received visual feedback in the form of an RGB image stream from a Kinect mounted atop the PR2 that included a rendering of features in the virtual environment (such as virtual haptic fixtures, proxy location, HIP location, surface normal, PR2 model and registered point cloud). When using haptic rendering, the user received force feedback via a haptic interface, such as a Geomagic@ Touch™ device, according to interactions with forbidden region virtual haptic fixtures.

Figures 5A, 5B, 5C, 5D:
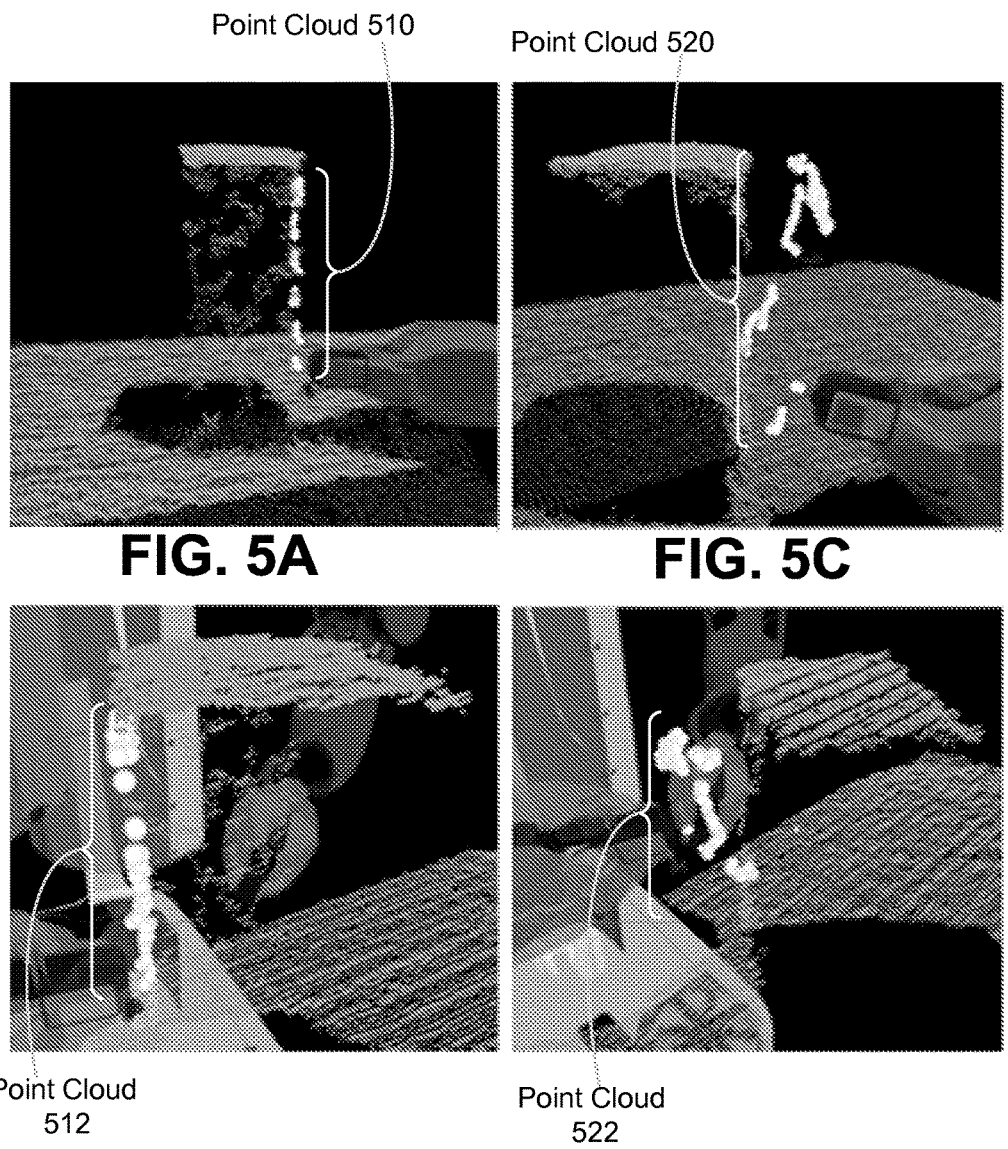
FIGS. 5A-5D are images of point clouds resulting from surface exploration, in accordance with example embodiments.

The operated exploration task was performed five times both with and without virtual haptic fixtures. During the trials, the points sensed by the seashell sensor were both rendered graphically and logged for post-trial quantitative analysis. At the end of each trial, a visual inspection of the point clouds was performed, FIGS. 5A-5D are images of point clouds resulting from surface exploration, in accordance with example embodiments. The visual results shown in FIGS. 5A-5D can provide a qualitative measure of performance. FIG. 5A uses white dots to illustrate seashell sensor point cloud 510 generated by a human operator performing a surface exploration using visual and haptic feedback, where the haptic feedback was provided by a haptic virtual haptic fixture. FIG. 5B shows point cloud 512, which is a close up of sensor point cloud 510. FIG. 5C uses white dots to illustrate seashell sensor point cloud 520 generated by a human operator performing a surface exploration using visual feedback only; i.e., without haptic feedback. FIG. 5D shows point cloud 522, which is a close up of seashell sensor point cloud 520.

In some scenarios, the sensed point cloud can resemble a flat planar surface, as the point cloud is sensed from a static cardboard box. With virtual haptic fixtures, the robot end effector can be prevented from colliding with the surface, as the human operator's hand can be pushed away from the sensed surface by use of a forbidden region fixture in the virtual environment. In the case of visual feedback only, displacement of the object and less structured points are expected due to the difficulty of operating the end effector in the sub-centimeter range, as can be seen in FIGS. 5C and 5D, especially in comparison to corresponding FIGS. 5A and 5B generated using both visual and haptic feedback.

A quantitative comparison was performed by analyzing the recorded sensed point cloud after the exploration task. In particular, a two dimensional plane was fit in a constrained least squares sense to each of the generated point clouds. The enforced constraint ensured that the plane fitting generated a plane perpendicular to the plane described by the robot base z axis (the explored surface of the cardboard box is approximately perpendicular to this plane).

Figure 6A:
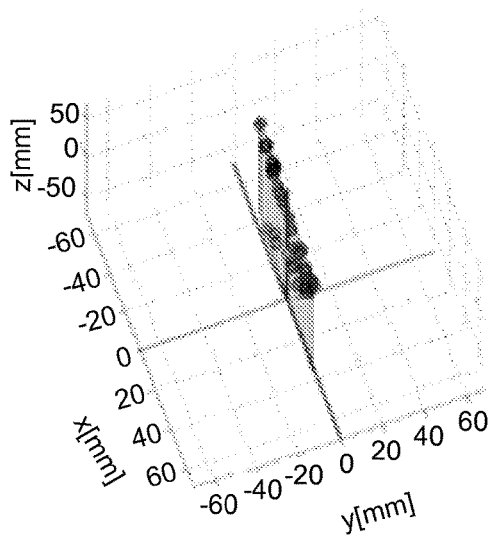
Figure 6B:
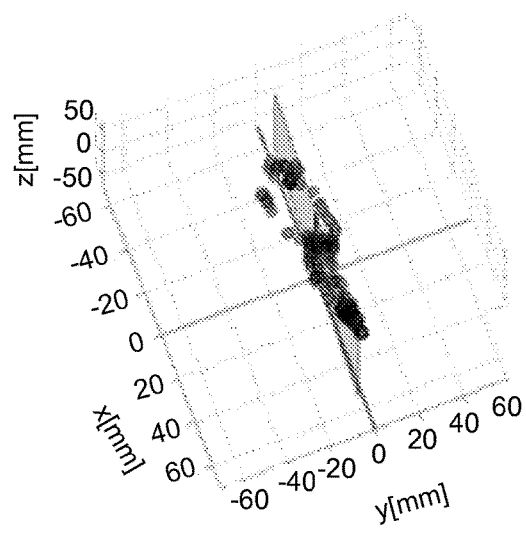
Figure 6C:
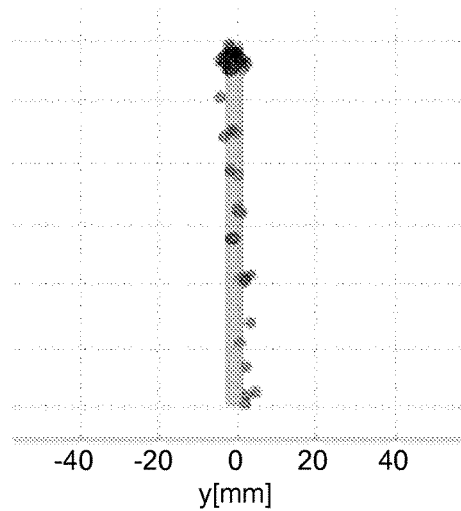
Figure 6D:
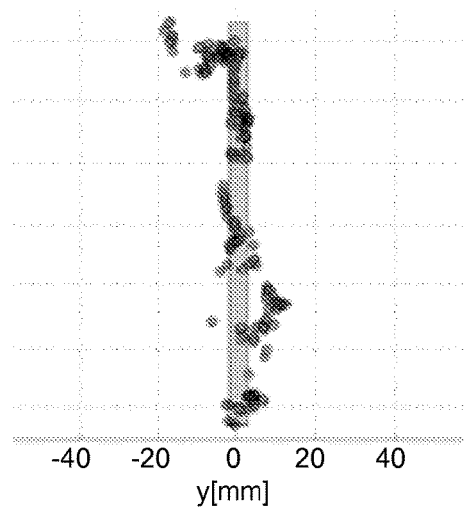

FIGS. 6A-6F show plane fitting results from surface exploration trials with points sensed with both visual and haptic feedback and those with visual feedback only, in accordance with an example embodiment. In particular, FIGS. 6A, 6C, and 6E show results for plane fitting with virtual haptic fixtures and with FIGS. 6B, 6D, and 6F showing plane fitting results for visual feedback only. A deviation from a corresponding fitted plane was calculated for each dataset. Additionally, a number of collisions, time to completion, and object displacement were measured for each test. Unless stated otherwise (i.e. preceded with "total" or "RMS", which is short for root mean square), the data of experimental results of the exploration tasks shown in Table 2 represent mean values across five trials.

TABLE 2

| Metric | Haptic + Visual Feedback | Visual Feedback Only |
| --- | --- | --- |
| Total Trials | 5 | 5 |
| Number of sensed points | 295 | 1217 |
| Task completion time (s) | 185.4 ± 27.7 | 108.6 ± 17.3 |
| Total collisions | 1 | 71 |
| Collisions | 0.2 ± 0.4 | 14.2 ± 1.6 |
| Displacement (mm) | N/A | 17.6 ± 7.1 |
| Deviation from plane (mm) | 1.468 ± 1.171 | 3.797 ± 3.033 |
| RMS deviation from plane (mm) | 1.878 | 4.860 |

The experimental results of Table 2 show virtual haptic fixtures around pre-touch sensed points can significantly reduce the number of collisions and object displacement, at the cost of less point density and longer completion time. This is an expected tradeoff, since the virtual haptic fixtures restrict operator motion (longer time), and limit the robot end effector motion near the surface (less points). This combination of techniques can be used in grasping tasks to improve operator performance, and allow for reaction to moving objects (e.g. to avoid unintended contact).

In addition to exploring the opaque box surface, the same methods were used to gather geometric information about a transparent bottle in a cluttered environment. The gathered information allowed for intuitive and successful completion of grasping tasks. The main difference between the experimental bottle and the experimental opaque box case was the lack of reference geometries for the bottle. Such reference geometries for faces of the opaque box were observed by the Kinect, but were not available for the transparent bottle.

Empty regions of the point cloud of the transparent bottle provided enough cues for initial approach without collision. Once a point on the transparent bottle was sensed by the seashell sensor, the exploration of the transparent bottle proceeded similarly to the exploration of the opaque box. Then, the bottle was grasped following sensing.

FIGS. 7A and 7B are images from an experiment sensing a transparent bottle surface for human-operated grasping by a robotic device, in accordance with an example embodiment. FIG. 7A is an image taken while exploring a transparent surface of the bottle used to find initial points 700, which are best seen as white dots in both FIGS. 7A and 7B. FIG. 7B is an image depicting initial points 700 and later sensed points 710 obtained after initial points 700. Both initial points 700 and later sensed points 710 aided the grasping task: finding initial points 700 on object 730 enabled approach of effector 720 toward object 730, and later sensed points 710 provide sufficient geometric information leading to a successful grasp of object 730.

Evaluation of Haptic Guidance Fixtures and 3D Visualization Methods for Robotic Manipulation Controlling a robotic device remotely combines the experience and awareness of a human being with the precision, repeatability and accuracy of machines by providing primary control of robotic motion to a human operator. A combination of haptic, visual, and perhaps auditory feedback provided by a virtual environment can assist the operator by overlaying sensory information over data captured from the remote scene. Along with providing haptic feedback about the virtual environment, visual feedback such as a collection of polygons, such as triangles, can represent objects in the virtual environment that can be operated upon using a haptic rendering device. In some cases, 3D mapping can be used to enhance visual feedback provided to the human operator about the remote environment. Additionally, the haptic feedback can be customized to suit one or more tasks controlled by the human operator and carried out by the robotic device.

Figure 8:
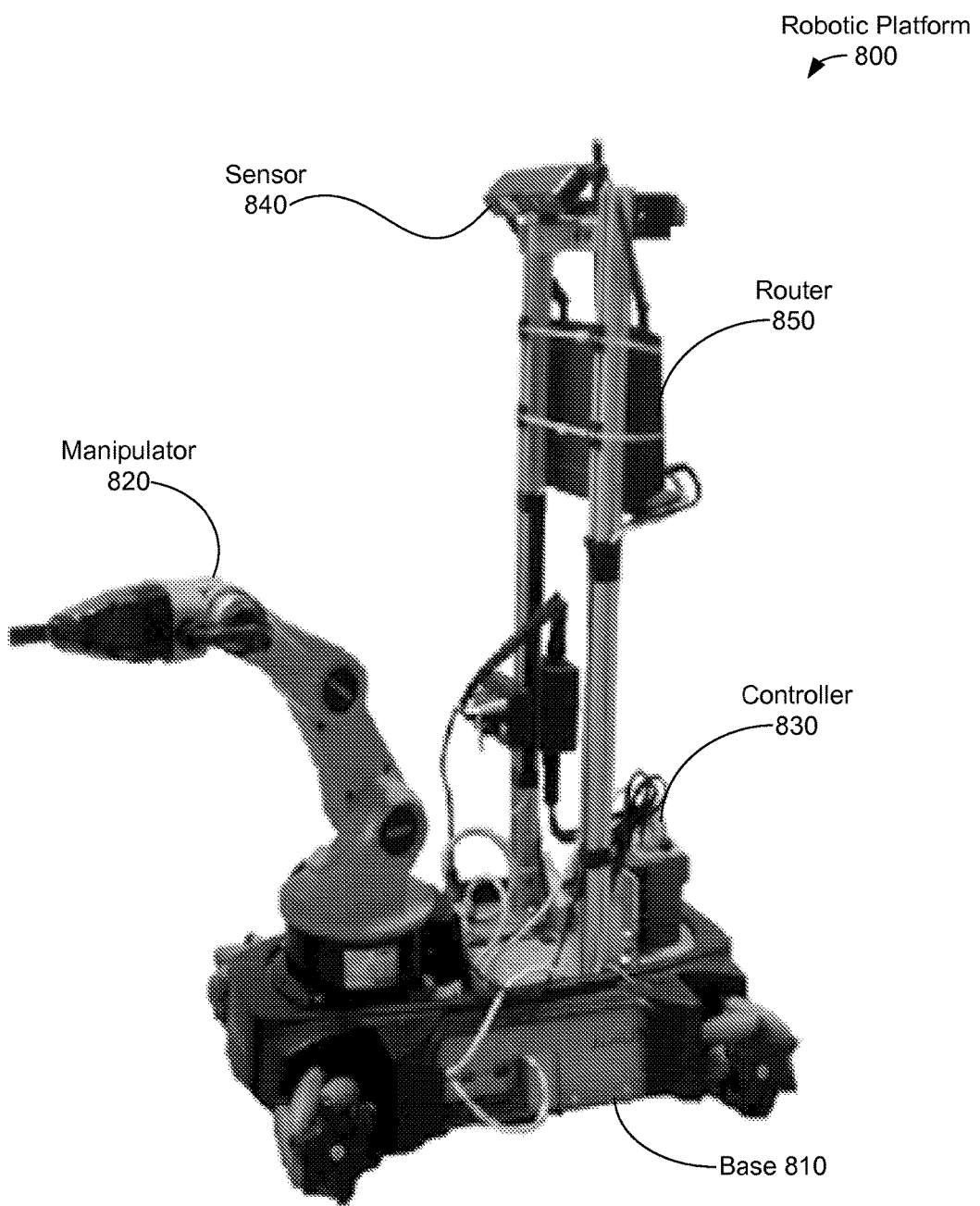
FIG. 8 shows a robotic platform that can be remotely controlled by a human operator, in accordance with an example embodiment.

FIG. 8 shows robotic platform 800 that can be remotely controlled by a human operator, in accordance with an example embodiment. Robotic platform 800 can include base 810, manipulator 820, controller 830, sensor 840, and router 850. In some embodiments, robotic platform 800 can include a KUKA youBot robot, base 810 can be an omnidirectional base configured to enable the robot to move in any direction; manipulator 820 can be a 5 degree-of-freedom (DOF) manipulator with a gripper; controller 830 can be a real-time controller, such as a National Instruments' Compact RIO real-time controller, sensor 840 can include an RGB-D camera, such as a Primesense Carmine RGB-D camera and perhaps other sensors such as one or more sensors mentioned below with respect to sensor 976b, and router 850 can be an Asus AC router. In some embodiments, sensor 840 can include RGB-D camera configured with an optical camera to capture image data and an infrared camera to capture depth data.

In some embodiments, robotic platform 800 can be controlled by a human operator utilizing a master console in a haptic rendering environment that provides a virtual environment representing a (remote) environment where the robot is located. For example, actuation of joints of robotic platform 800 can be controlled by the human operator at the master console. Also, specific commands and/or other data can be sent to/from platform 800 via router 850 to the master console.

Figure 9A:
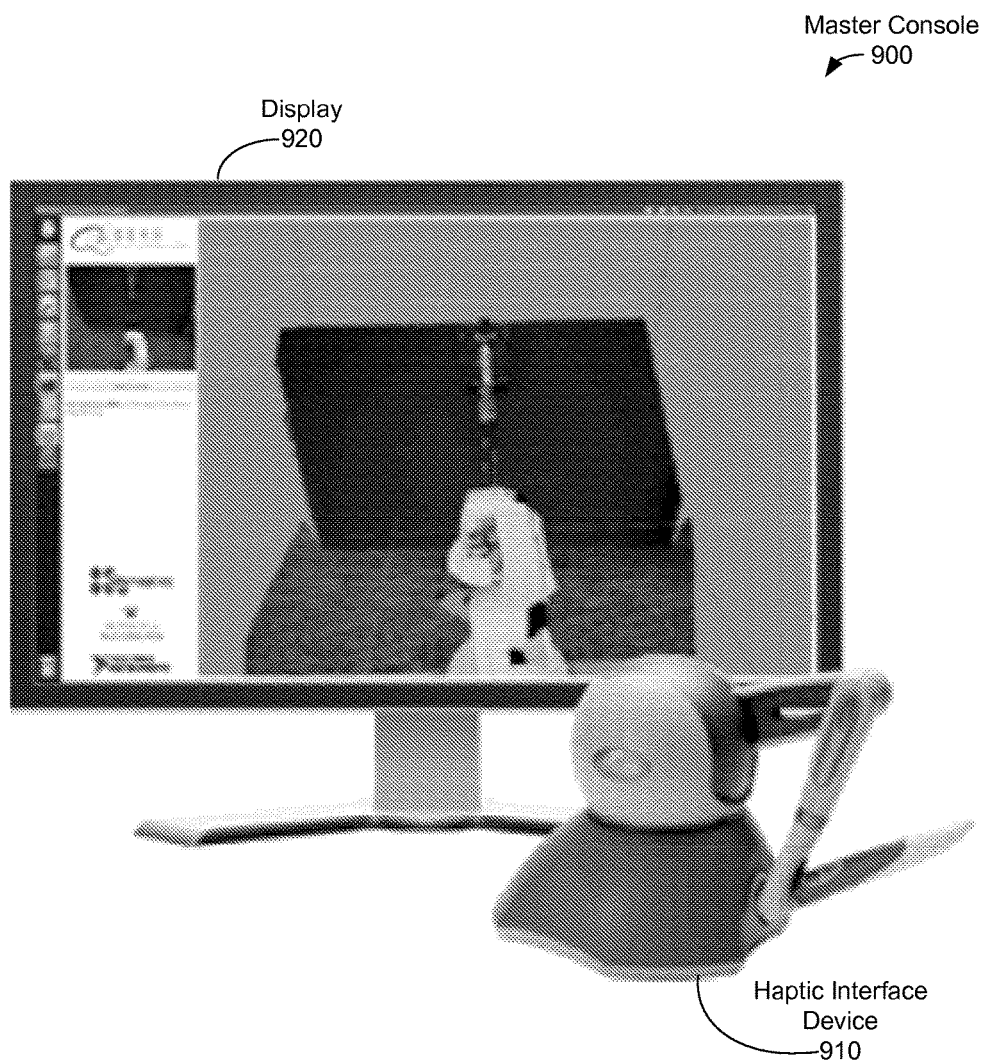
FIG. 9A depicts a master console, in accordance with an example embodiment.

FIG. 9A depicts master console 900, in accordance with an example embodiment. Master console 900 can include haptic interface 910 and display 920. Haptic interface 910 can be a controllable mechanism configured to receive indications of haptic feedback and provide the indicated haptic feedback based on the indications. Examples of haptic interface 910 include, but are not limited to, a PHANTOM Omni® Haptic Device from Sensable Inc., a delta.6 haptic interface from Force Dimension, haptic suits, haptic gloves, tactile displays, other haptic devices, other haptic interfaces, and devices configured at least in part to provide haptic feedback such as laptop computers, desktop computers, and mobile computing devices (e.g., tablets, smart phones). Examples of display 920 include, but are not limited to, one or more Liquid Crystal Display (LCD) monitors, touch screens, cathode ray tubes (CRTs), and other devices configured to display visual feedback.

At master console 900, the human operator can manipulate haptic device 910 to control a robotic platform, such as robotic platform 800. In some embodiments, haptic device 910 can send 3DOF position commands to the robotic platform to control end effector(s) of the robotic device and can receive 3DOF haptic force feedback commands from software providing the virtual environment; e.g., virtual haptic fixture software. In addition, master console 900 can use display 920 to provide visual feedback (e.g., monocular RGB/2D imagery, voxelized 3D-mapped imagery). In other embodiments, master console 900 can include other input/output devices; e.g., a computer mouse, a touch screen, a joystick/controller, a keyboard, etc.

Figure 9B:
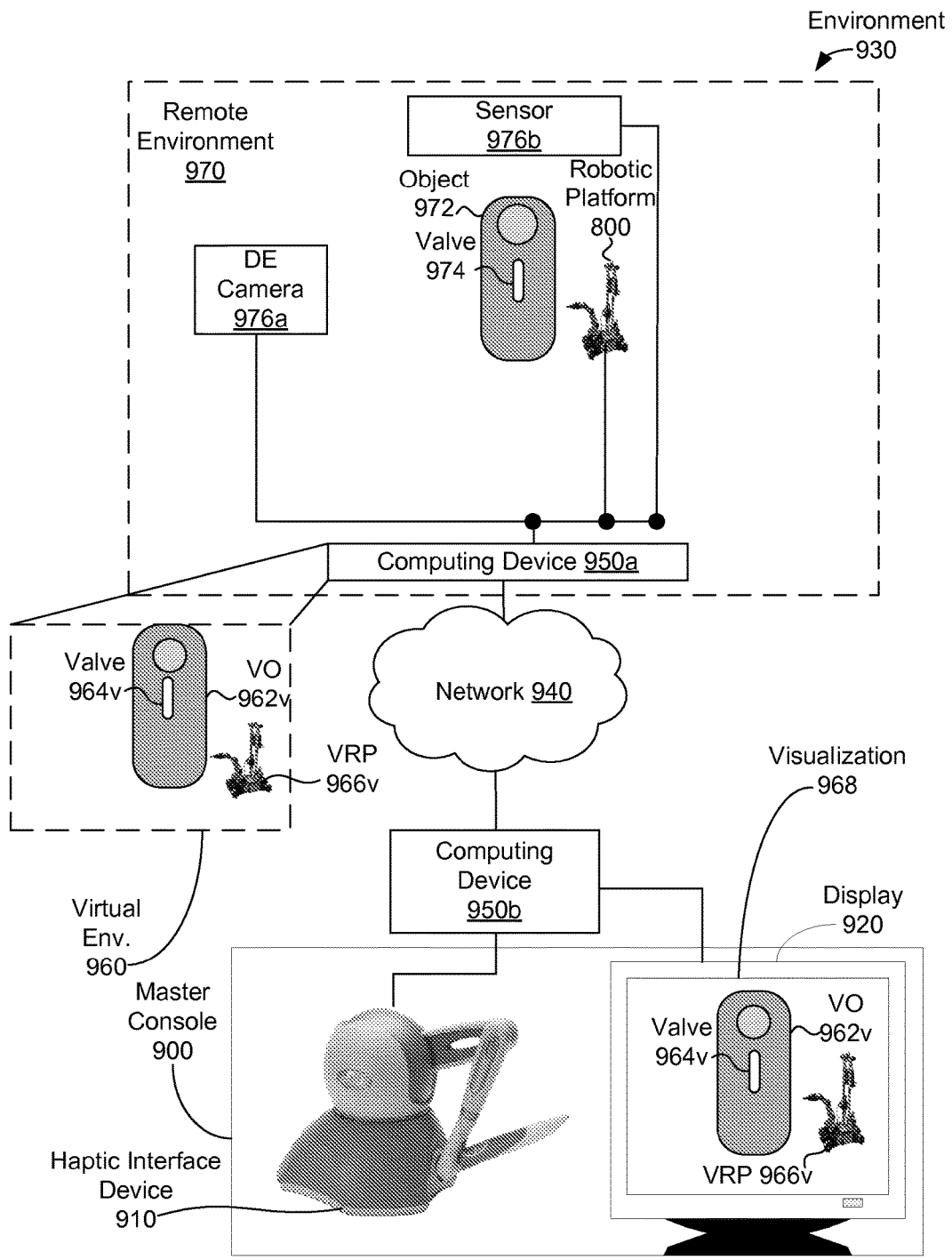
FIG. 9B is a diagram of a haptic rendering environment utilizing a robotic platform and a master console, in accordance with an example embodiment.

FIG. 9B is a diagram of haptic rendering environment 930 utilizing robotic platform 800 and master console 900, in accordance with an example embodiment. Environment 930 includes computing devices 950a, 950b connected via network 940. Computing device 950a is in remote environment 970 and is additionally connected to robotic device 800, RGB-D camera 976a, and sensor 976b. In some embodiments, robotic device 800 can include computing device 950a, depth-enabled camera 976a, and/or sensor 976b. For example, in particular embodiments, controller 830 of robotic device 800 can be configured to carry out the herein-described features of computing device 950a and/or sensor 840 of robotic device 800 can be configured to carry out the herein-described features of depth-enabled camera 976a, and/or sensor 976b.

In the example shown in FIG. 9B, RGB-D camera 976a is configured to capture depth data of remote environment 970, including but not limited to depth data related to robotic platform 800, object 972, and valve 974, and provide the captured depth data to computing device 950a via network 940. Sensor 976b can be or include one or more sensors, such as, but not limited to: active sensors (e.g., sensors that modify an environment), passive sensors (e.g., sensors that do not modify an environment), additional RGB-D cameras, video and/or still cameras, microphones, hydrophones, seashell sensors, proximity sensors, task/environment specific sensors, radiation sensors (e.g., radiation sensor 1932), infra-red sensors, infra-red cameras, X-ray sensors, temperature sensors, heat sensors, thermometers, vibration and/or motion sensors, pH sensors, chemical sensors, neural signal sensors, SONAR devices, RADAR devices, LIDAR devices, lasers, position sensors, electrical sensors/meters, strain gauges, and biological sensors. In some embodiments, computing device 950a can be connected to more or fewer depth-enabled cameras and/or sensors than shown in FIG. 9B.

Computing device 950b is additionally connected to master console 900, which includes haptic feedback device 910 and display 920 as mentioned above. Computing device 950b can use received depth data to generate virtual environment 960. The depth data can be, or can be transformed (e.g., by computing device 950a and/or 950b) into a collection of points, each point specified in a Cartesian coordinate system in three dimensions; e.g., as an (x, y, z) point in $\mathbb{R}^3$. Each point in the collection of points can represent one point in a point cloud. After generating the point cloud, computing device 950b can render virtual environment 960 as images and/or as a three dimensional visualization. FIG. 9B shows virtual environment 960 including virtual object (VO) 962v, virtual valve 964v, and a representative virtual robotic platform (VRP) 966v.

Computing device 950a and remote environment 970 can be physically distant from computing device 950b. In some scenarios, remote environment 970 can be physically near or in the same environment as an environment around computing device 950b. In particular, of these scenarios not shown in the Figures, one computing device can provide the herein-described functionality of both computing devices 950a and 950b.

Computing device 950a can generate force vectors related to robotic platform 800 and send indications of haptic feedback to computing device 950b. Upon reception of the indications of haptic feedback, computing device 950b can utilize haptic interface device 910 to generate the haptic feedback. Additionally, computing device 950a and/or 950b can generate visualization 968 with virtual object 962v, virtual valve 964v, and/or virtual robotic platform 966v. As also shown in FIG. 9B, visualization 968 can include an indication of virtual robotic platform 966v which can correspond to virtual robotic platform 966v in virtual environment 960 and/or robotic platform 800 in remote environment 970.

As haptic interface device 910 is moved, indication(s) of movement of haptic interface device 910 can be generated and sent from computing device 950b, such as to computing device 950a via network 940. Upon reception of the indication(s) of movement, computing device 950a can update a position of virtual robotic platform 966v. Also or instead, computing device 950a can send control signals to change movement and/or rotation; e.g., change speed, direction, acceleration, pitch, yaw, roll, or to stop to robotic platform 800. In other embodiments, virtual robotic platform 966v can represent a position of tool(s), sensor(s), device(s), and/or other platform(s) on robotic platform 800 rather than the platform itself, and by sending control signals to robotic platform 800, the corresponding tool(s), sensor(s), and/or other device(s) can be moved.

As depth data for remote environment 970 are captured, the captured depth data can correspond to images and points showing movement and/or rotation of robotic platform 800 and thus showing movement and/or rotation of virtual robotic platform 966v. In some embodiments, virtual robotic platform 966v can be moved within virtual environment 960 based on the indication(s) of movement/rotation instead of or as well as based on captured image and depth data.

In some scenarios, providing the human operator with depth information in the form of a real-time point cloud for certain navigation tasks can improve performance when compared to monocular RGB-streams. However, environmental factors can deteriorate the quality of feedback and increase confusion to a viewer of 3D objects. For example, environmental complexity and/or clutter can introduce holes in depth data. Depending on material and lighting properties, such as but not limited to transparent materials, undesirable lighting conditions, lighting/reflection angles, and/or light-absorbent materials, depth information may be noisy or arbitrary. Measurement distance and other variables can affect measurement noise and density as well.

In an experiment testing 3D-mapping techniques provided to human operators while remotely controlling robots performing fine manipulation tasks, a human operator can instruct a remote robot to turn a valve. While performing the task, the human operator can use a virtual environment depicting 3D objects in the remote environment.

Figure 10:
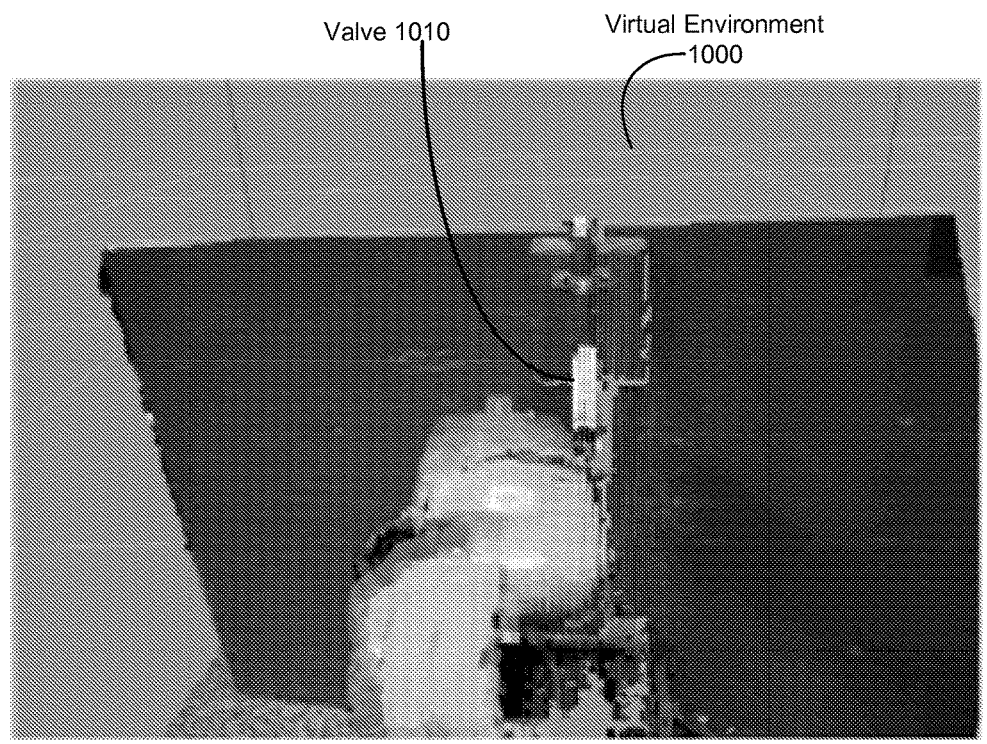
FIG. 10 shows virtual environment 1000, in accordance with an example embodiment.

FIG. 10 shows virtual environment 1000, in accordance with an example embodiment. Virtual environment 1000 includes a voxel-map representation of valve 1010. The voxel-map representation can provide visual 3D feedback about a remote environment to the human operator. To render 3D objects in the remote environment, such as valve 1010, a 3D mapping involving voxelized volumes within the remote environment can be updated with RGB-D sensor information based on a Bayesian statistical model to determine a binary occupancy state.

In cases where depth perception is difficult, avoiding contacts and tracking or maintaining a safe, desired trajectory can be assisted with virtual haptic fixtures, such as the guidance fixtures discussed above. For example, suppose a task involves having a robotic device and corresponding human operator follow a trajectory, but obstacles occluding or obstructing the trajectory are later identified. A modified trajectory then can be calculated to avoid the identified obstacles. One or more guidance fixtures used to provide feedback that keeps the human operator (and thus the robotic device) along the modified trajectory. Since the virtual environment and force feedback are calculated by software generating the virtual environment, a robot end effector can be instructed not to move or otherwise deviate from a planned trajectory while haptic feedback is being communicated to the human operator.

Some guidance fixtures deal can be associated with fixed, predefined paths. In the case of teleoperation in an unknown environment, while the task may be predefined, its ideal configuration in the remote location can be difficult to determine. In situations where enough information about the physical task space is available, it may be feasible, and even desirable, for the human operator to determine and place guidance fixtures to control a trajectory of a robotic device.

An increase in operator performance can arise after combining both visual and haptic feedback via a guidance fixture in a computer simulation. For example, task performance can be enhanced when the human operator could both see a desired trajectory and feel guidance forces provided by a guidance fixture. In some scenarios, the guidance fixture can be generated and placed by the user using a computer mouse on a virtual two-dimensional (2D) surface. In other examples, virtual haptic fixtures can be placed to follow trajectories in three-dimensional space.

Figure 11:
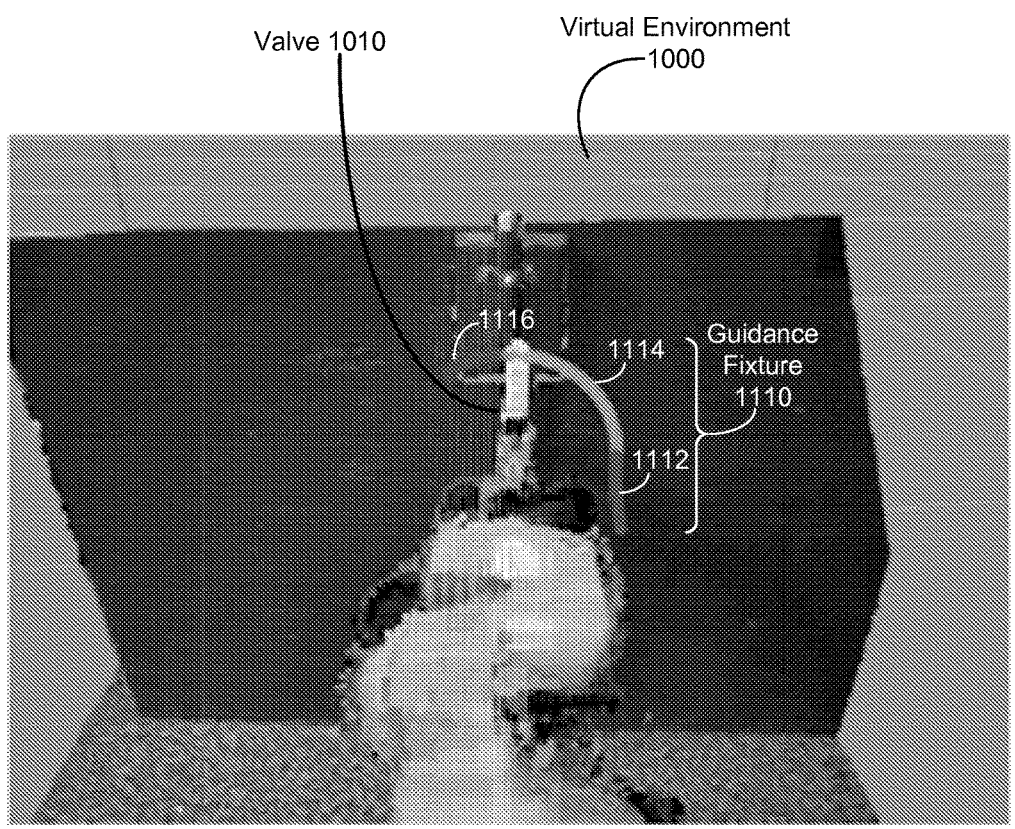
FIG. 11 depicts a virtual environment with a voxel-map representation of a valve and a guidance fixture, in accordance with an example embodiment.

Visual feedback can be provided by guidance fixtures. FIG. 11 depicts virtual environment 1100 with a voxel-map representation of valve 1010 along with guidance fixture 1110, in accordance with an example embodiment. In some cases, guidance fixture 1110 can be placed manually by human operator; while in other cases, a computing device providing virtual environment 1100 and/or some other computing device(s) can generate guidance fixture 1110. Guidance fixture 1110 includes three portions of a trajectory: entry/exit portion 1112, valve turning portion 1114, and entry/exit portion 1116. In other examples, a guidance fixture can have more, fewer, and/or different portions than portions 1112, 1114, and 1116 of guidance fixture 1010.

Example Experiment for Comparing Feedback Modes

To evaluate the effectiveness of various feedback modes provided to human operators and user-placed guidance fixtures, human operator performances for controlling a remote robot are compared while performing a valve turn task motivated by a disaster recovery scenario related to a gas leak. In the case of a gas leak, remote robotic operation can reduce risk to human responders. Moreover, a robotic device may be better designed to reach cluttered and constrained physical scenarios than a human being. The experiment is intended to evaluate two questions: (1) Do 3D-mapping techniques improve user performance? (2) Do manually-placed virtual haptic fixtures provide additional improvement over 3D-mapping in user performance?

Figure 12:
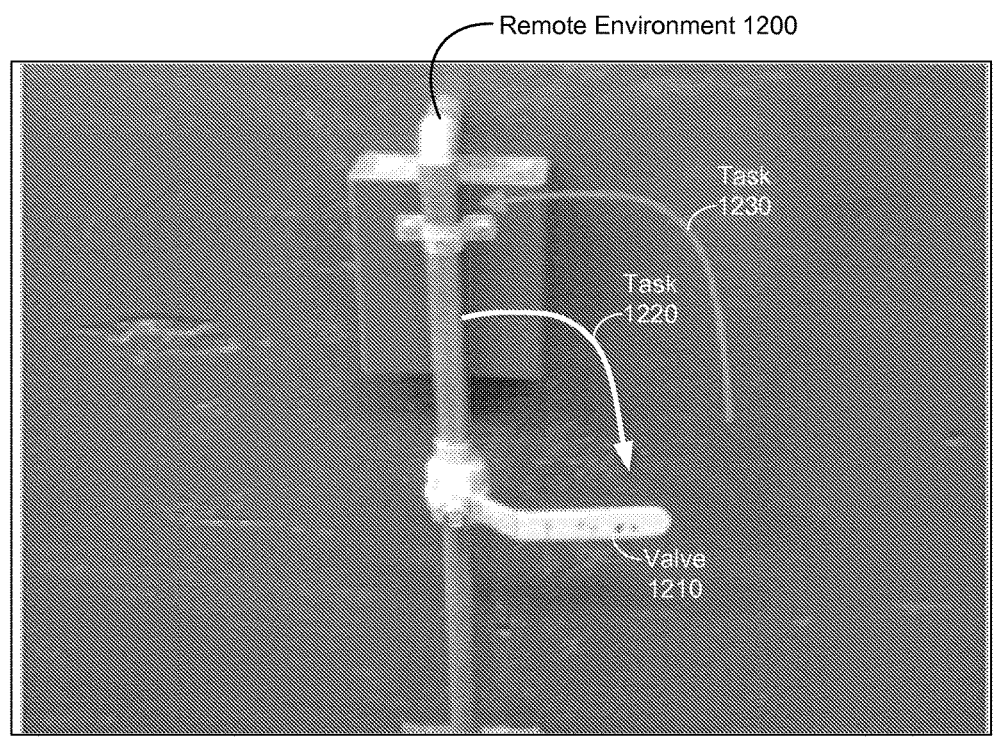
FIG. 12 shows a remote environment with a valve structure, in accordance with an example embodiment.

FIG. 12 shows remote environment 1200 having a valve structure that includes valve 1210, in accordance with an example embodiment. FIG. 12 also depicts two tasks 1220, 1230 performed during the experiment. Task 1220 is shown using a white arrow that indicates task 1220 involves turning valve 1210 from a 12 o'clock position to a 3 o'clock position, while task 1230 is shown using a grey arrow indicating task 1230 includes turning valve 1210 from the 3 o'clock position to the 12 o'clock position.

Performance of the valve turn task can be compared where the human operator interacts with the master console using one of the following different feedback modes:

Visual only, monocular RGB stream (mode R)
Visual only, 3D-mapping voxel method (mode V)
Visual and haptic guidance fixture (mode VF)

Mode R represents a baseline feedback mode that is currently employed to perform some teleoperated tasks. Mode V can provide a sense of depth to improve end effector localization and user spatial awareness, providing a mode for baselining 3D visual representation. In the experiment, mode V included a 3D voxel map of a volume enclosing a task space of a robot, and controls enabling the human operator to rotate and translate his or her view within the 3D representation.

Mode VR can provide a human operator with the option of haptic feedback in the form of a guidance fixture in addition to the 3D-mapping available in mode V. A properly-placed guidance fixture can prevent the human operator and the robot from deviating from a path known to successfully complete the valve turn task while avoiding undesired contact. In this experiment where the valve turn task is predetermined, the human operator can place a trajectory that consists of the proper arc and length to complete the valve turn. This trajectory can be visualized and rendered as a series of finely sampled, ordered points along an ideal valve-turning arc.

In this experiment, the human operator utilizing mode VR can manually set a virtual haptic fixture, such as shown in FIG. 11 as guidance fixture 1110, within the robot's workspace. To aid in placing the virtual haptic fixture, the human operator can be provided with a 3D-mapping representation to properly place the virtual haptic fixture, such as a small arc shape representing the 90° valve turn. Because the virtual environment is rendered as a 3D voxel grid, it is relatively simple for the operator to place a desired trajectory that passes through one or more objects in the environment, such as contacting the valve for turning.

The experiment involves use of the above-mentioned feedback modes for a human operator controlling a robotic platform, such as robotic platform 800 depicted in FIG. 8 and discussed above, to carry out the valve turn task using a master console, such as master console 900 depicted in FIGS. 9A and 9B and discussed above.

A graphical user interface (GUI) for master console 900 can render objects for a virtual environment. In some embodiments, the GUI can render objects using the OpenGL® software package and RViz components included with the "Groovy" release of the Robot Operating System (ROS).

The GUI can enable a user of master console 900; e.g., the human operator of robotic platform 800, to view a remote environment and/or a virtual environment using one of the above-mentioned visual feedback modes: mode R, mode V, or mode VF. While the GUI is in mode R, the user can be presented with streaming 2D RGB video feedback. In mode V, the GUI can provide the user with a voxelized volume of about one cubic meter (one meter for each side length) in front of a robotic platform, enclosing the manipulator's task space. The user can view an occupancy grid from various angles and positions using an input device, such as a computer mouse, associated with master console 900. In the mode VF, the GUI can provide the user with access to the visual feedback of mode V and can place a visualized path on the valve structure. Then, the user can place a virtual haptic fixture along the visualized path to provide haptic feedback. After the user has placed the virtual haptic fixture, directing the robot along a path passing through voxels occupying the placed virtual haptic fixture can result in a collision with those voxels and the objects they represent could be observed. For the valve turn experiment in particular, it was desired that the path for the valve turn pass through the voxels representing the handle of the valve.

Experimental Participants and Protocol

In this study, recruitment was performed on the University of Washington campus and subjects consisted solely of undergraduate and graduate students. In this experiment, a total of three test conditions exist: one for each of the three above-mentioned feedback modes. In this project, a between-user study was employed. 21 male subjects participated in this study (seven in each test group). Their age ranged from 18 to 35 years of age (mean age of the group for mode R: 25.143; for mode V: 23.000; for mode VF: 26.143). It should be noted that all participants were chosen to be male to avoid any effects due to possible differences between human males and females in spatial problem solving. In addition, each of the participants used computers at least 10 hours per week. In each group (seven participants total), six of the participants played less than two hours per week of video games, while exactly one participant played more than 10 hours per week (mean videogame usage per week, group for mode R: 2.214; group for mode V: 1.857; group for mode W: 2.000). Lastly, all participants had or were pursuing a university degree.

For this experiment, both objective and subjective metrics were employed for comparison. In particular, objective metrics related to performance of the valve task included:
time to complete the valve turn task (in seconds),
path length of the end effector (in millimeters),
number of undesired collisions, and
jerk of the end effector (in meters/second$^3$).

After the completion of the task, subjective measures were assessed via post-task questionnaires. The following two subjective categories describing user performance were measured:
Perceived workload
Situational awareness
Perceived workload was measured using the unweighted NASA Task Load Index (TLX), and situational awareness was gauged using the three-dimensional Situation Awareness Rating Technique (SART) scaled to be within (0, 120).

The experimental trials were conducted in an office and a hallway corridor outside the office. During a trial, a participant remotely operated from the master console within the office, while the remote environment was part of the hallway outside of view from the participant. The robotic platform and the valve structure were placed in the same location of the remote environment in each experimental trial; the robotic platform was placed orthogonally at a fixed distance from and facing the valve structure. Prior to the valve task, each user was allowed to see the valve and robot position, allowed to turn the valve manually to obtain a sense of the range of motion and torque needed to turn the valve, and assigned to a feedback mode.

After viewing the valve structure and the robotic platform, each participant underwent a training period which lasted for 20 minutes or when the user was satisfied, whichever happened first (in all cases in this study, the user was satisfied with the training prior to the 20 minutes). The training session occurred with the robotic platform in the office within view of the operator. In this way, the operator could observe motion of the robotic platform directly while manipulating the haptic device.

As a training task, the participant was asked to knock over a set of stacked boxes. During the training session, the participant was only allowed to remotely operate the robotic device via the GUI configured to operate using the participant's assigned feedback mode. Each mode R participant was presented with a 640×480 video stream of the robotic device in well-lit conditions. Mode V participants were each presented with a voxelized (3D) representation of the robotic devices. Each mode VF participant received the voxelized representation and also could place a guidance fixture along a path through the box to be knocked over.

During both the training session and the experiment, point data was acquired at 50 Hz and visual feedback was updated at 30 Hz, the data acquisition rate of the Primesense Carmine RGB-D camera. A haptic update rate was set at 1200 Hz to maintain realistic force feedback. Noise-isolating ear protection was worn during the experiment to prevent the participant from hearing collisions or actuations of robotic joints.

During an experimental trial, each subject was asked to perform ten tasks in the following order:
Task A five times and
Task B five times.
These tasks are depicted in FIG. 12 (discussed above).

In between task performances, the robot was homed to a fixed starting configuration. The participant was timed from movement from this home position until the valve was turned completely. Joint encoders of the robotic platform were read and recorded at 50 Hz. Mode W participants were instructed to place a guidance fixture during each performance of either task A or task B; that is, guidance fixtures were placed ten times per mode VF participant.

Experimental Results and Conclusions

Figure 13:
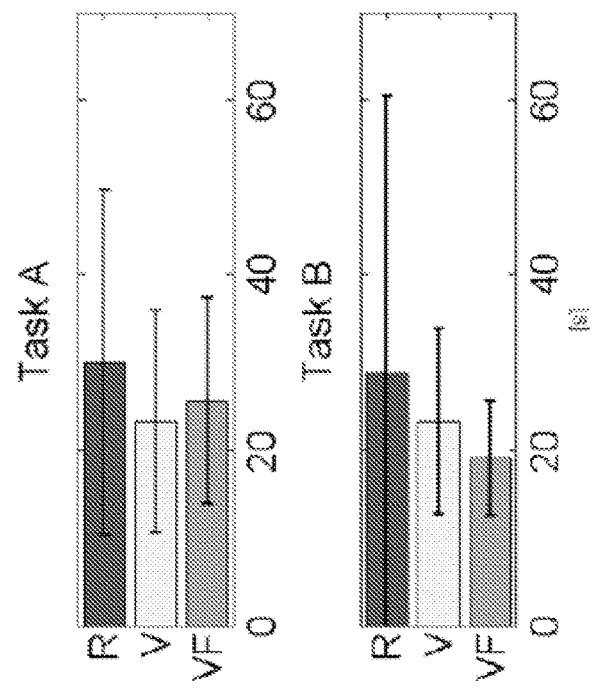
FIG. 13 shows two graphs of mean completion time data in seconds of an experimental task across three feedback modes, in accordance with an example embodiment.

FIG. 13 shows two graphs of mean completion time data in seconds for participants across the feedback modes R, V, and VF, in accordance with an example embodiment. FIG. 13 includes an upper graph for Task A data and a lower graph for Task B data. Table 3 provides numerical results that are depicted in the graphs of FIG. 13.

TABLE 3

|  | Mode R | Mode V | Mode VF |
| --- | --- | --- | --- |
| Mean Task A Completion Time (seconds) | 30.228 | 23.496 | 25.742 |
| Mean Task B Completion Time (seconds) | 28.918 | 23.439 | 19.352 |

Table 4 includes a statistical analysis of the mean completion times including statistical significance data. Asterisks (*) in Tables 4, 6, 8, 10, and 12 below denotes statistical significance.

TABLE 4

|  | R-V | R-VF | V-VF |
| --- | --- | --- | --- |
| Task A Time p-Value | 0.0916 | 0.2490 | 0.4410 |
| Task B Time p-Value | 0.3342 | 0.0843 | 0.0592 |

Figure 14:
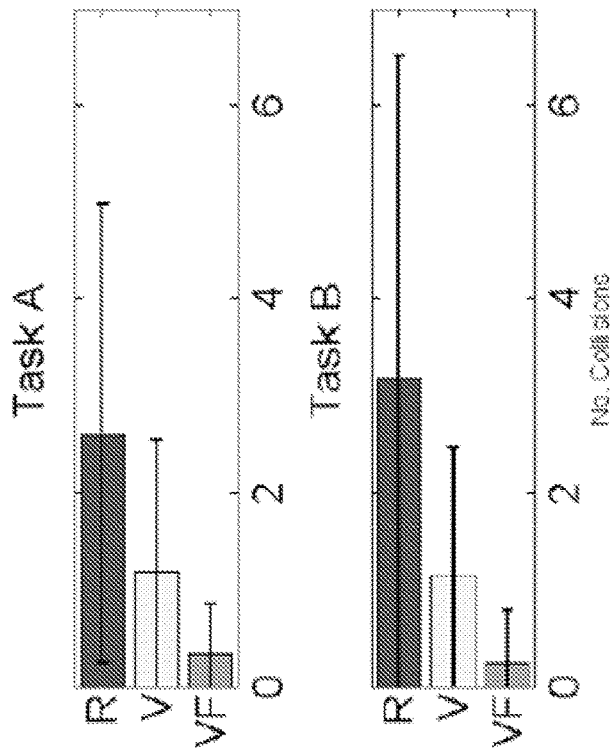
FIG. 14 shows two graphs of mean numbers of unwanted collisions of an experimental task across three feedback modes, in accordance with an example embodiment.

FIG. 14 shows two graphs of mean numbers of unwanted collisions for participants across the feedback modes R, V, and VF, in accordance with an example embodiment. In this context, an unwanted collision includes either a contact with an object other than the valve handle or a contact pushing the valve handle in the incorrect direction. FIG. 14 includes an upper graph for Task A data and a lower graph for Task B data.

Table 5 provides numerical results that are depicted in the graphs of FIG. 14 and Table 6 includes a statistical analysis of the numbers of unwanted collisions including statistical significance data.

TABLE 5

|  | Mode R | Mode V | Mode VF |
| --- | --- | --- | --- |
| Mean Task A Number of Collisions | 2.6929 | 1.200 | 0.349 |
| Mean Task B Number of Collisions | 3.200 | 1.171 | 0.257 |

TABLE 6

|  | R-V | R-VF | V-VF |
| --- | --- | --- | --- |
| Task A Collisions p-Value | 0.0029* | $4.628 \times 10^{-7}$* | $9.696 \times 10^{-4}$* |
| Task B Collisions p-Value | 0.0013* | $2.276 \times 10^{-6}$* | $3.340 \times 10^{-4}$* |

While no statistical significance was shown for the mean completion time across the three feedback modes as indicated in Table 4, statistical significance was shown for the number of collisions between all three of the feedback modes as indicated in Table 6.

Encoder values of the robotic platform's arm joints during the experiments were recorded at 50 Hz. From the encoder values and the arm geometries, forward kinematics were calculated to determine overall task path length. A graph of collected data from mean task path lengths across the three different feedback modes is shown in FIG. 15.

Figure 15:
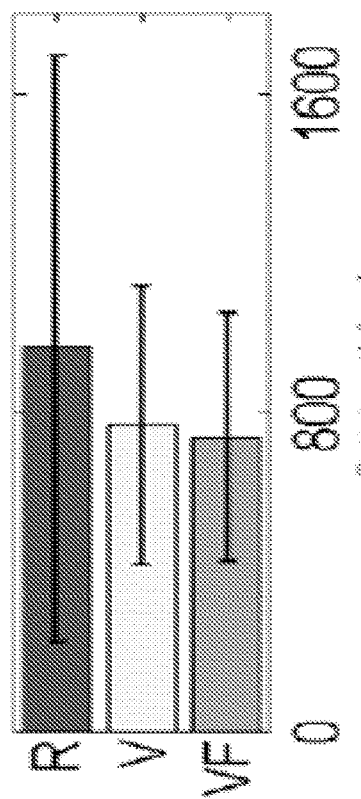
FIG. 15 shows a graph of collected data from mean task path lengths across three feedback modes, in accordance with an example embodiment.

Table 7 provides numerical results that are depicted in the graphs of FIG. 15 and Table 8 includes a statistical analysis of the numbers of unwanted collisions including statistical significance data.

TABLE 7

|  | Mode R | Mode V | Mode VF |
| --- | --- | --- | --- |
| Path Length (mm) | 964.68 | 771.81 | 742.06 |

TABLE 8

|  | R-V | R-VF | V-VF |
| --- | --- | --- | --- |
| Path Length p-Value | 0.0499* | 0.0212* | 0.5927 |

Table 8 indicates that statistical significance for mean path length was found between the 2D visual feedback mode (mode R) and the two 3D-mapping feedback modes (modes V and VF).

Differentials of sampled positions were used to approximate end effector jerk, which is an indication of path smoothness. A low-pass filter removed high-frequency components introduced through discrete differentiation. A graph of mean end effector jerk values across the three different feedback modes is displayed in FIG. 16.

Figure 16:
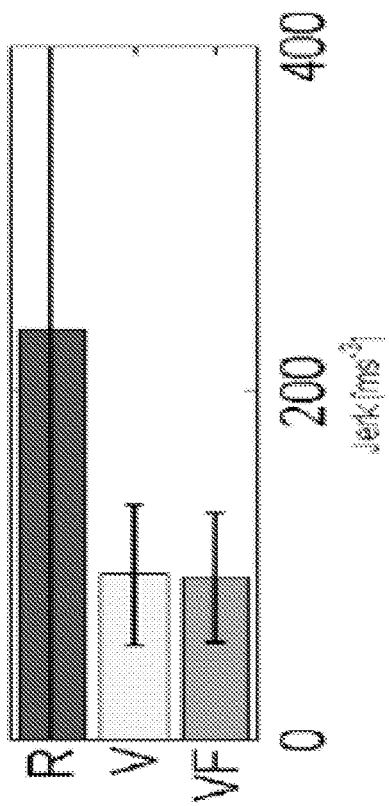
FIG. 16 displays a graph of mean jerk values across three feedback modes, in accordance with an example embodiment.

Table 9 provides numerical results that are depicted in the graphs of FIG. 16 and Table 10 includes a statistical analysis of the mean end effector jerk values including statistical significance data.

TABLE 9

|  | Mode R | Mode V | Mode VF |
| --- | --- | --- | --- |
| Mean End Effector Jerk (m/s$^3$) | 236.375 | 96.5122 | 94.0893 |

TABLE 10

|  | R-V | R-VF | V-VF |
| --- | --- | --- | --- |
| Mean End Effector Jerk p-Value | 0.0023* | 0.0020* | 0.7853 |

Table 10 indicates that statistical significance for mean end effector jerk values was found between the 2D visual feedback mode (mode R) and the two 3D-mapping feedback modes (modes V and VF).

Figure 17A:
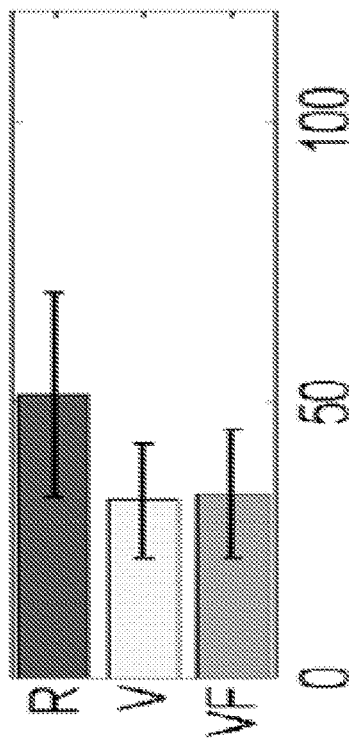
FIG. 17A graphs results from post-experiment questionnaires assessing task load during an experiment, in accordance with an example embodiment.
Figure 17B:
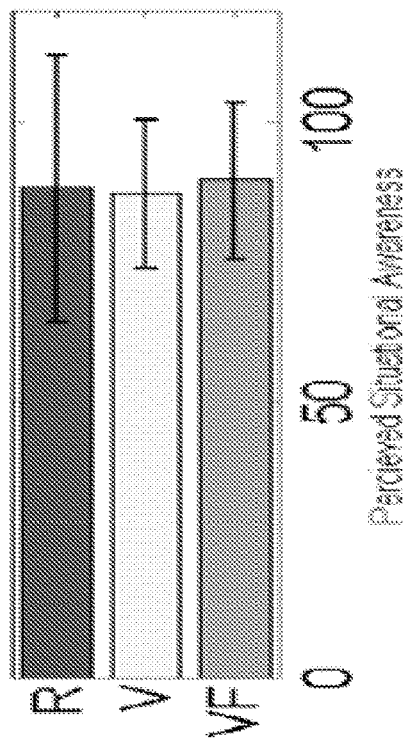
FIG. 17B graphs results from post-experiment questionnaires assessing situational awareness during an experiment, in accordance with an example embodiment.

FIG. 17A graphs results from the post-experiment questionnaires assessing task load during the experiment and FIG. 17B graphs results from the post-experiment questionnaires assessing situational awareness during the experiment, in accordance with example embodiments. Task load was assessed using the NASA Task Load Index (NASA TLX). The NASA TLX can provide a subjective workload assessment for a human-machine system, such as master console 900 and/or environment 930, by using a multi-dimensional rating procedure that derives an overall workload score based on a weighted average of ratings on six subscales. The subscales can include Mental Demands, Physical Demands, Temporal Demands, Own Performance, Effort and Frustration.

Situational awareness was gauged using the Situational Awareness Rating Technique (SART). SART is a post-trial subjective rating technique based on ten dimensions to measure a human operator's situational awareness. The ten dimensions can include: familiarity of the situation, focusing of attention, information quantity, information quality, instability of the situation, concentration of attention, complexity of the situation, variability of the situation, arousal, and spare mental capacity.

Table 11 provides numerical results that are depicted in the graphs of FIGS. 17A and 17B. Table 12 includes a statistical analysis of the TLX and SART values, including statistical significance data.

TABLE 11

|  | Mode R | Mode V | Mode VF |
| --- | --- | --- | --- |
| NASA TLX Values (out of 120) (graphed in FIG. 17A) | 51.071 | 32.214 | 33.429 |
| SART Values (out of 120) (graphed in FIG. 17B) | 88.071 | 87.000 | 89.500 |

TABLE 12

|  | R-V | R-VF | V-VF |
| --- | --- | --- | --- |
| NASA TLX p-Value | 0.0350* | 0.0515 | 0.8387 |
| SART p-Value | 0.9195 | 0.8943 | 0.7407 |

The SART p-values shown in Table 12 indicate that no statistical significance was found for post-experiment situational awareness between any of the feedback modes. However, the NASA TLX p-values indicate a statistical significance in perceived task load between mode R and mode V. Furthermore, it should be noted that a NASA TLX p-value of 0.0515 for perceived task load between mode R and mode VF is relatively close to significance.

In the above-mentioned experiment for comparing feedback modes, a human operator manually placed a virtual haptic fixture for a specific, known manipulation task: a valve turn. In addition, depth information can be represented as a voxel-occupancy grid that is updated via a heuristically determined Bayesian procedure. The results of the experiment demonstrate that 3D visual feedback provided by mode V helped reduce the number of collisions compared to the 2D visual feedback provided by mode R. The addition of the manually placed haptic guidance fixtures in mode W of the experiment decreased the number of unwanted collisions even more, as shown by the significance between collisions for modes V and VF. Path lengths are demonstrably shorter for modes V and VF when compared to mode R. Operators perceived significantly less task load in mode V compared to mode R, perhaps due to the lack of depth perception in mode R. The use of the guidance fixtures in mode VF did not significantly reduce perceived task load compared to R, but was near significance. This could potentially be explained by the additional task of placing the guidance fixture introduced in VF and the subsequent reduction of task load in mode VF once the guidance fixture was in place in comparison to unguided mode V.

Presenting a user with different feedback modes; e.g., modes R, V, and RV did not appear to affect metrics of completion time or perceived situational awareness in this experiment. The feedback modes may not have affected these metrics because of the inherent simplicity of the experimental task: a 90° valve turn. Such a relatively simple task may not benefit much from additional feedback modes in terms of completion time or reducing complexity of the situation.

No detrimental effects from using 3D-mapping methods in mode V over using monocular 2D visual streams in mode R were observed in the experiment using any of the metrics explored, indicating 3D mapping is likely to be better than a single 2D visual stream for even simple tasks. 3D-mapping methods used in mode V can decrease task load, number of collisions, mean jerk and path length when compared to mode R. The addition of the manually-placed haptic guidance fixtures in mode VF of the experiment improved the number of unwanted collisions when compared to mode V. In many real-world tasks, reducing unwanted collisions is critical (e.g. equipment maintenance, bomb disposal). As previously stated, the complexity of the task, or lack thereof, may have masked the potential improvements when using mode VF over V.

Example Multi-Sensor Robotic Platform Scenario

FIGS. 18A-18E depict scenario 1800 indicating the use of multiple sensors and virtual haptic fixtures to allow a human operator and a robot to complete a task, in accordance with an example embodiment. In some scenarios, such as scenario 1800, robotic devices include multiple sensors. These sensors can provide additional information about a task to be performed by the robotic device. In particular scenarios involving relatively-complex tasks, the robotic device cannot (readily) complete such relatively-complex tasks autonomously, even using additional data provided by the multiple sensors. However, data from the multiple sensors can reduce task complexity; for instance, by rejecting external disturbances, such that a joint effort by a human operator and the robotic platform can (readily) complete the relatively-complex task.

In scenario 1800, a robotic platform, shown in FIGS. 18A-18E as robot 1810, is operating in a remote environment while being equipped with five sensors: two RGB-D cameras, a LIDAR device, a SONAR device, and a non-contact proximity sensor. One of the RGB-D cameras, RGB-D1, is mounted on an upper portion of robot 1810 in the fashion of sensor 840 of robotic platform 800, and the other RGB-D camera, RGB-D2, is mounted on an arm/manipulator of robot 1810. Both cameras consume a relatively-small amount of power in operation during scenario 1800. The LIDAR device of scenario 1800 can be used to provide very good location, velocity, and acceleration information for objects near robot 1810, but does not work in all environments, such as foggy environment, environments with murky water. Also, the LIDAR device can require a relatively-large amount of power while in operation during scenario 1800. The RADAR and SONAR devices can be used to provide general location, velocity, and acceleration information, and each consumes a relatively-moderate amount of power while in operation during scenario 1800. Comparatively, the RADAR device is more effective in above-ground environments, while the SONAR device is more effective underwater. As discussed above, a seashell sensor acting as the non-contact proximity can provide depth information at very short ranges. In scenario 1800, the SONAR device interferes with the non-contact proximity sensor; that is, at most one of the SONAR device and the non-contact proximity sensor can be activated at one time.

Figure 18A:
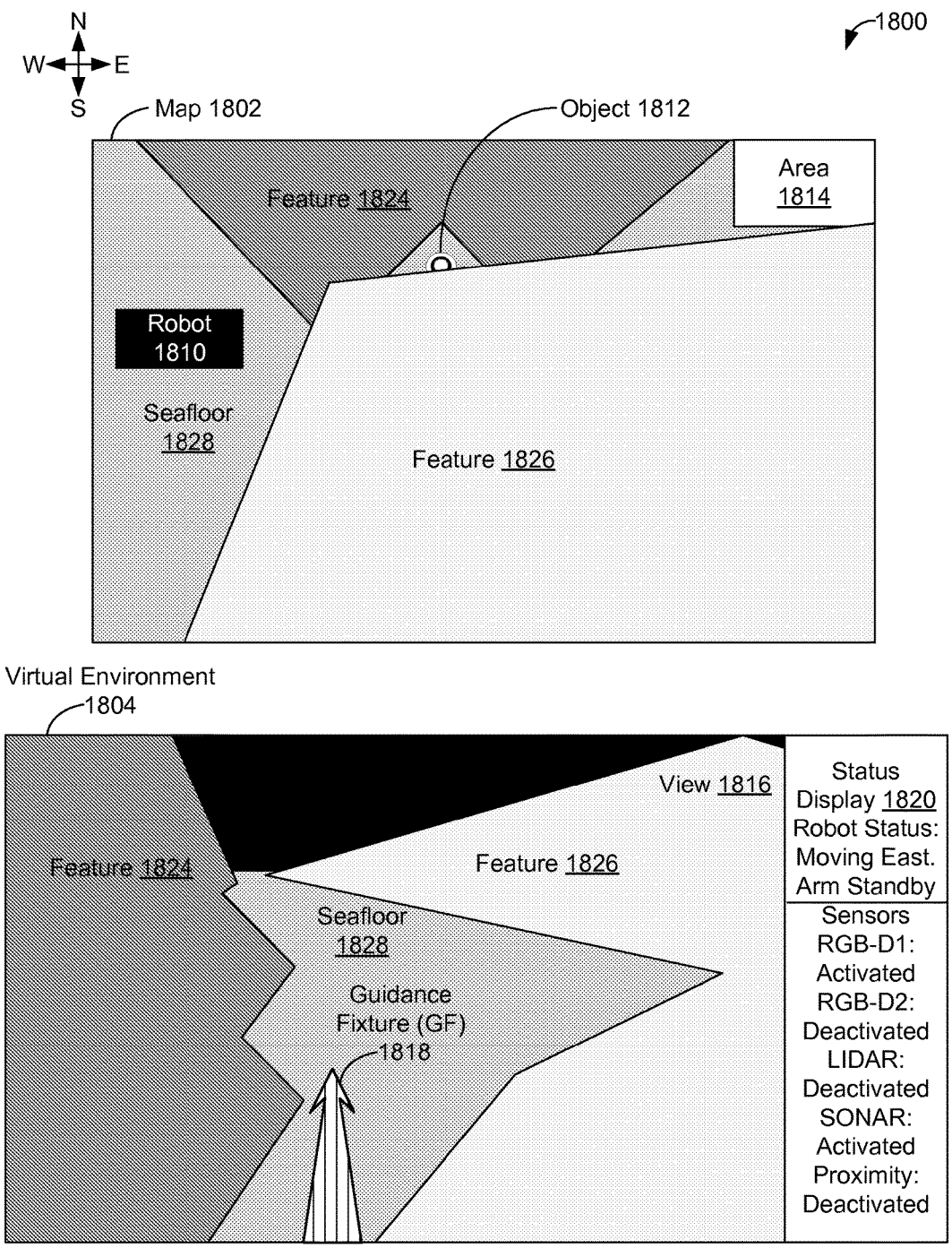
FIGS. 18A-18E depict a scenario indicating the use of multiple sensors and virtual haptic fixtures to allow a human operator and a robot to complete a task, in accordance with an example embodiment.

FIG. 18A shows map 1802 and virtual environment 1804 at the onset of scenario 1800. Map 1802 indicates initial positions of robot 1810, object 1812, and area 1814 within the remote environment, indicating that, at the start of scenario 1800, robot 1810 is southwest of object 1812, and that object 1812 is southwest of area 1814. In scenario 1800, the remote environment is an underwater environment; other similar scenarios can involve an above-ground remote environment. Map 1802 also indicates that object 1812 rests on seafloor 1828 between features 1824 and 1826. In this example, features 1824 and 1826 are undersea mountains, but in other underwater scenarios, more, fewer, and/or other features, such as sunken ships, reefs, or other underwater objects can be observed.

In scenario 1810, robot 1810 and its human operator are tasked to retrieve an object, shown in FIGS. 18A-18E as object 1812, and deliver the object to a predefined target area 1814. To carry out the task of scenario 1800, the human operator can use a master console with a display, such as display 920 of master console 900, to view information obtained from the remote environment that is represented in virtual environment 1804. The human operator can also use a haptic interface device of the master console, such as haptic interface device 910, to control the robot and carry out the task of scenario 1800 as well as receiving haptic, visual, and perhaps auditory feedback provided via virtual environment 1804.

Virtual environment 1804 includes view 1816 and status display 1820. In other embodiments, a display similar to or the same as map 1802 can be provided via virtual environment 1804.

FIG. 18A indicates that view 1816 includes a 2D image view taken by camera RGB-D1 of robot 1810 indicating terrain ahead of robot 1814 and guidance fixture (GF) 1818. In other scenarios, 3D imagery can be displayed in view 1816, such as discussed above; e.g., in the context of mode VF. Guidance fixture 1818 can be used by the human operator to guide robot 1810 to object 1814.

In scenario 1800, there are one or more computing devices aboard robot 1810 in the remote environment and one or more computing devices providing virtual environment 1804. The computing device(s) aboard robot 1810 and/or providing virtual environment 1804 includes hardware and/or software for virtual haptic fixtures, including guidance fixture 1818. Then, the computing device(s) aboard robot 1810 and/or providing virtual environment 1804 can be configured to control activation and deactivation of sensors of robot 1810 based on locations of robot 1810 with respect to object 1812, features such as features 1824, 1826, missing data from point clouds, and known interactions between sensors. For example, software for guidance fixture 1818, which is a feature of virtual environment 1804, can be configured to request activation and/or deactivation of one or more sensors on robot 1810. Also, the human operator can control the activation and deactivation of the sensors of robot 1810 via the master console.

In particular, at the onset of scenario 1800, software associated with guidance fixture 1818 is configured to request activation of camera RGB-D1 and the SONAR device as guidance fixture 1818 runs along relatively-level seafloor 1828 at a relatively safe distance from features 1824 and 1826, and so a default battery of sensors—camera RGB-D1 and the SONAR device of robot 1810—can be activated.

In some embodiments, the computing device(s) aboard robot 1810 and/or providing virtual environment 1804, such as the software for guidance fixture 1818, can receive depth data from a sensor, such as camera RGB-D1, and generate a point cloud with two or more points from the depth data. Then, the computing device(s) aboard robot 1810 and/or providing virtual environment 1804 can generate virtual environment 1804 to model the remote environment based on the point cloud. The computing device(s) aboard robot 1810 and/or providing virtual environment 1804 can determine whether the point cloud is sufficient to model the remote environment; for example, by determining if points within the point cloud are within a point spacing interval of each other as discussed above in the context of FIGS. 2-3D, based on a density of points within the point cloud being above a minimum density threshold, based on distances between objects (including part or all of robot 1810) in the remote environment, based on distances between virtual objects (including virtual haptic fixtures) in virtual environment 1804, and/or using some other techniques. Note that the distances between objects in the remote environment and the distances between virtual objects in the virtual environment can change, and so the computing device(s) aboard robot 1810 and/or providing virtual environment 1804 can determine whether the point cloud is sufficient to model the remote environment based on updated/new object distances between moving (virtual) objects.

After determining that the point cloud is not sufficient to model the remote environment, the computing device(s) aboard robot 1810 and/or providing virtual environment 1804 can turn on additional sensor(s) aboard robot 1810, such as the SONAR device, to obtain additional depth data, which can then be used to generate points that can merged into the point cloud. The point cloud, including the merged points, can be used to model the environment as virtual environment 1804. Once virtual environment 1804 is generated, displays of virtual environment 1804, such as view 1816, status display 1820, and perhaps other displays, can be generated using the computing device(s) aboard robot 1810 and/or providing virtual environment 1804 As such, at the onset of scenario 1800, robot 1810 has camera RGB-D1 and the SONAR device activated, while camera RGB-D2, the LIDAR device, and the non-contact proximity sensor are deactivated, as indicated by status display 1820. Status display 1820 also indicates that robot 1810 is moving northwest (NE), which is in a direction toward object 1812 and following the arrow of guidance fixture 1818, and that the arm/manipulator of robot 1810 is on standby.

Figure 18B:
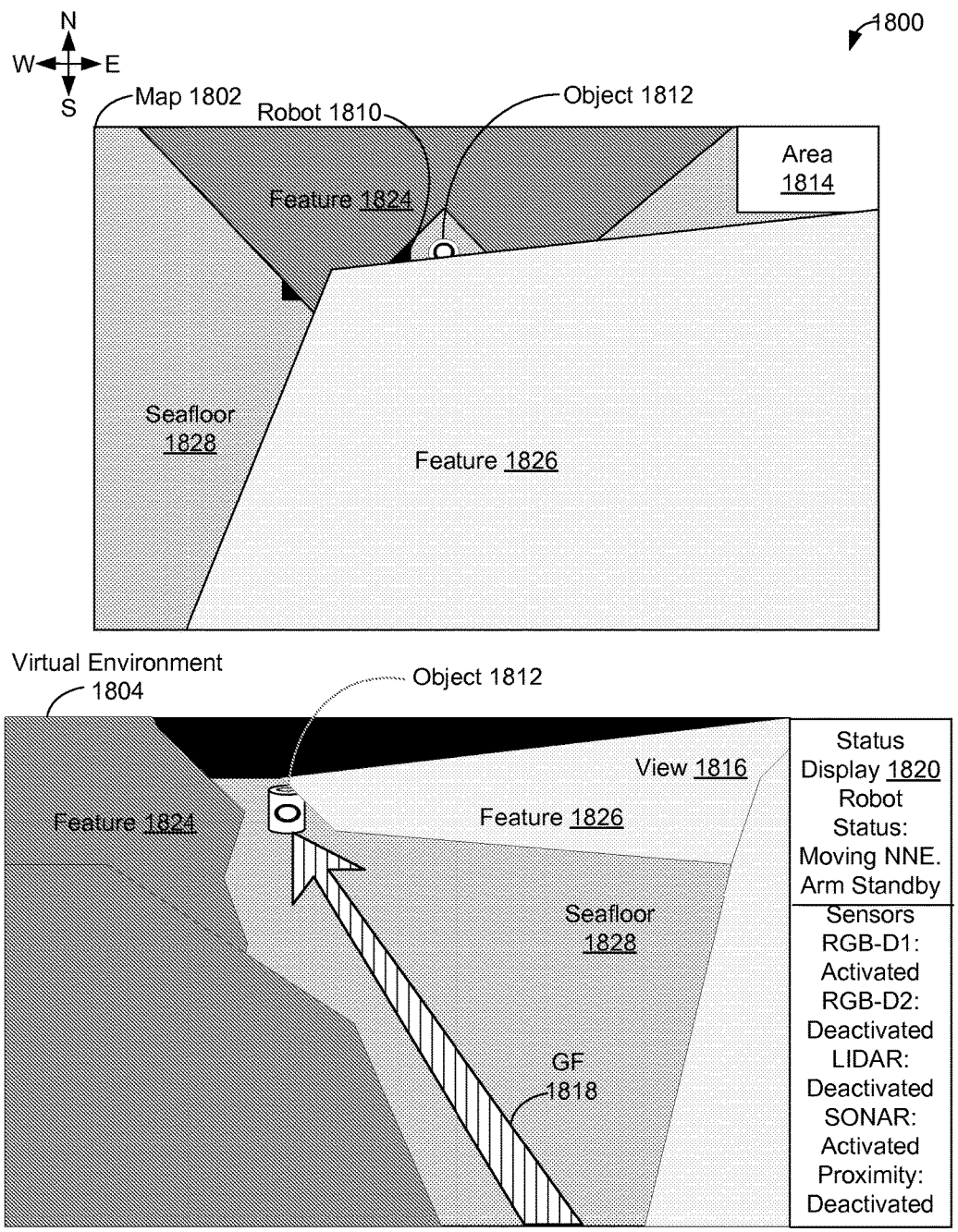

FIG. 18B shows that scenario 1800 continues with robot 1810 proceeding to within visual range of object 1812, as indicated by both map 1802 and virtual environment 1804. View 1816 of virtual environment 1804 shows that guidance fixture 1818 directs robot 1810 and the human operator directly to object 1818, which is partially obscured by feature 1826. Status display 1820 of virtual environment 1804 indicates that robot 1810 is moving north-northeast (NNE), has an arm/manipulator arm/manipulator that is on standby, and that camera RGB-D1 and the SONAR device remain activated, while camera RGB-D2, the LIDAR device, and the non-contact proximity sensor remain deactivated.

Figure 18C:
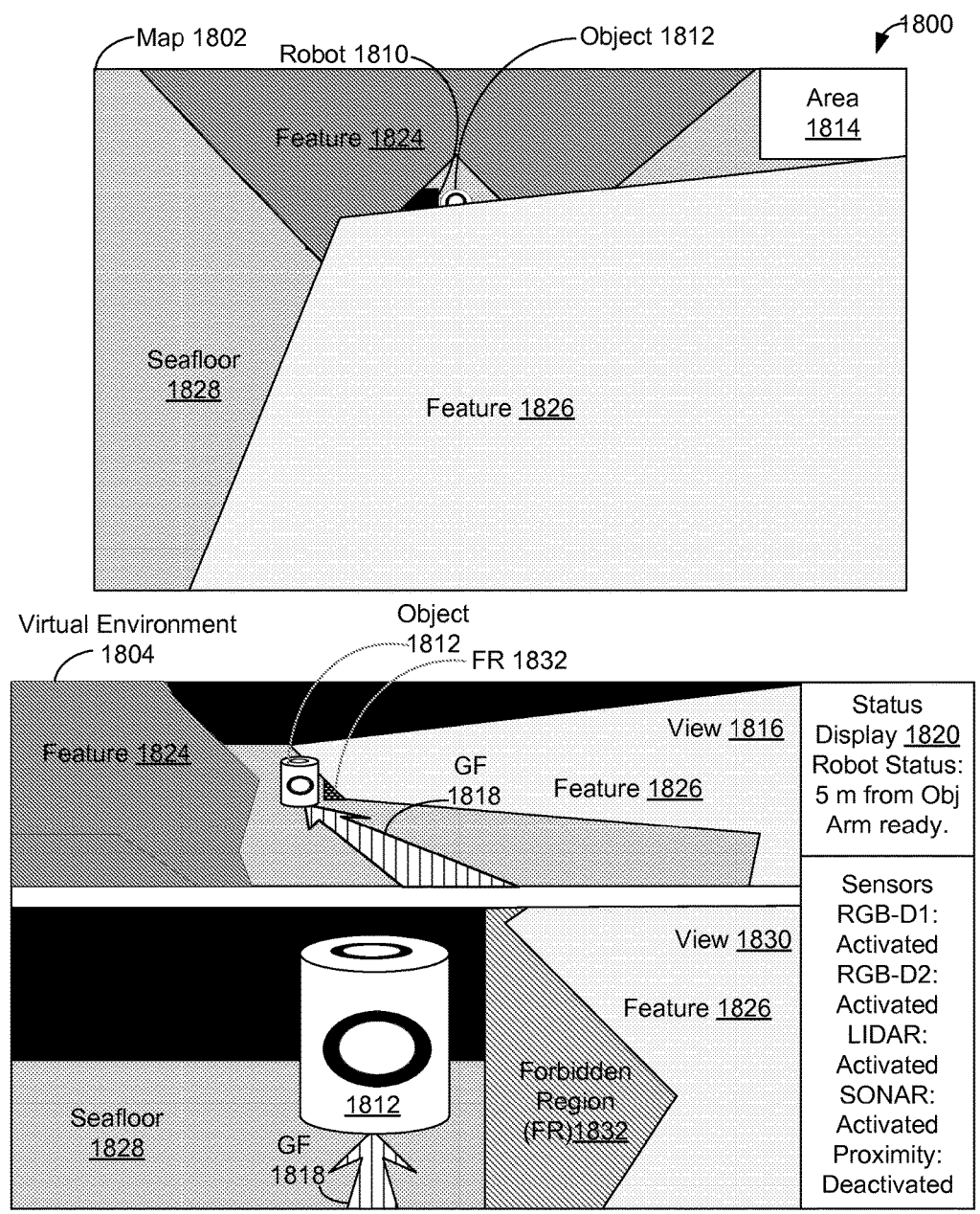

FIG. 18C shows that scenario 1800 continues with robot 1810 approaching to within 5 meters of object 1812, as indicated by status display 1820 of virtual environment 1804. Status display 1820 also indicates that the arm of robot 1810 is ready and that camera RGB-D2, which provides a view from the arm of robot 1810 is activated, as well as camera RGB-D1, the SONAR device, and the LIDAR device. In scenario 1800, guidance fixture 1818 is configured to activate the LIDAR device and maintain activation of camera RGB-D1 and the SONAR device when robot 1810 comes within 5 meters of object 1812.

Also in scenario 1800, the human operator of robot 1810 activated the arm of robot 1810 and associated camera RGB-D2. As both cameras RGB-D1 and RGB-D2 are activated, virtual environment 1804 can provide two views, one from each activated camera, to the human operator. View 1816, which is associated with camera RGB-D1, shows guidance fixture 1818 directing the human operator, and thus robot 1810, and toward object 1812 and forbidden region (FR) 1832, which directs the human operator, and thus robot 1810, away from feature 1826. View 1830, which is associated with camera RGB-D2 on the arm of robot 1810, also shows guidance fixture 1818 directing the human operator toward object 1812 and forbidden region 1832, which directs the human operator away from feature 1826.

View 1816 of virtual environment 1804 shows that guidance fixture 1818 directs robot 1810 and the human operator directly to object 1818, which is partially obscured by feature 1826. Status display 1820 of virtual environment 1804 indicates that robot 1810 is moving north-northeast (NNE), has an arm/manipulator arm/manipulator that is on standby, and that camera RGB-D1 and the SONAR device remain activated, while camera RGB-D2, the LIDAR device, and the non-contact proximity sensor remain deactivated.

Scenario 1800 continues with the human operator overriding the selection of guidance fixture 1818 to use camera RGB-D1 as being distracting while using the arm of robot 1810 to perform a sub-task of grasping object 1812; rather, the human operator relies on imagery from camera RGB-D2 alone. The human operator also uses another guidance fixture to guide movement of the arm while grasping object 1812.

While the grasping sub-task is being performed, the non-contact proximity sensor is activated. The computing device(s) aboard robot 1810 and/or the computing device(s) executing software providing virtual environment 1804 can determine that the currently-activated SONAR device interferes with the non-contact proximity sensor. Then, the computing device(s) can, after determining that the SONAR device interferes with the second sensor, deactivate the SONAR device, obtain depth data from the non-contact proximity sensor and other activated devices/sensors of robot 1810, and use the depth data to generate a depth cloud usable by virtual environment 1804.

Figure 18D:
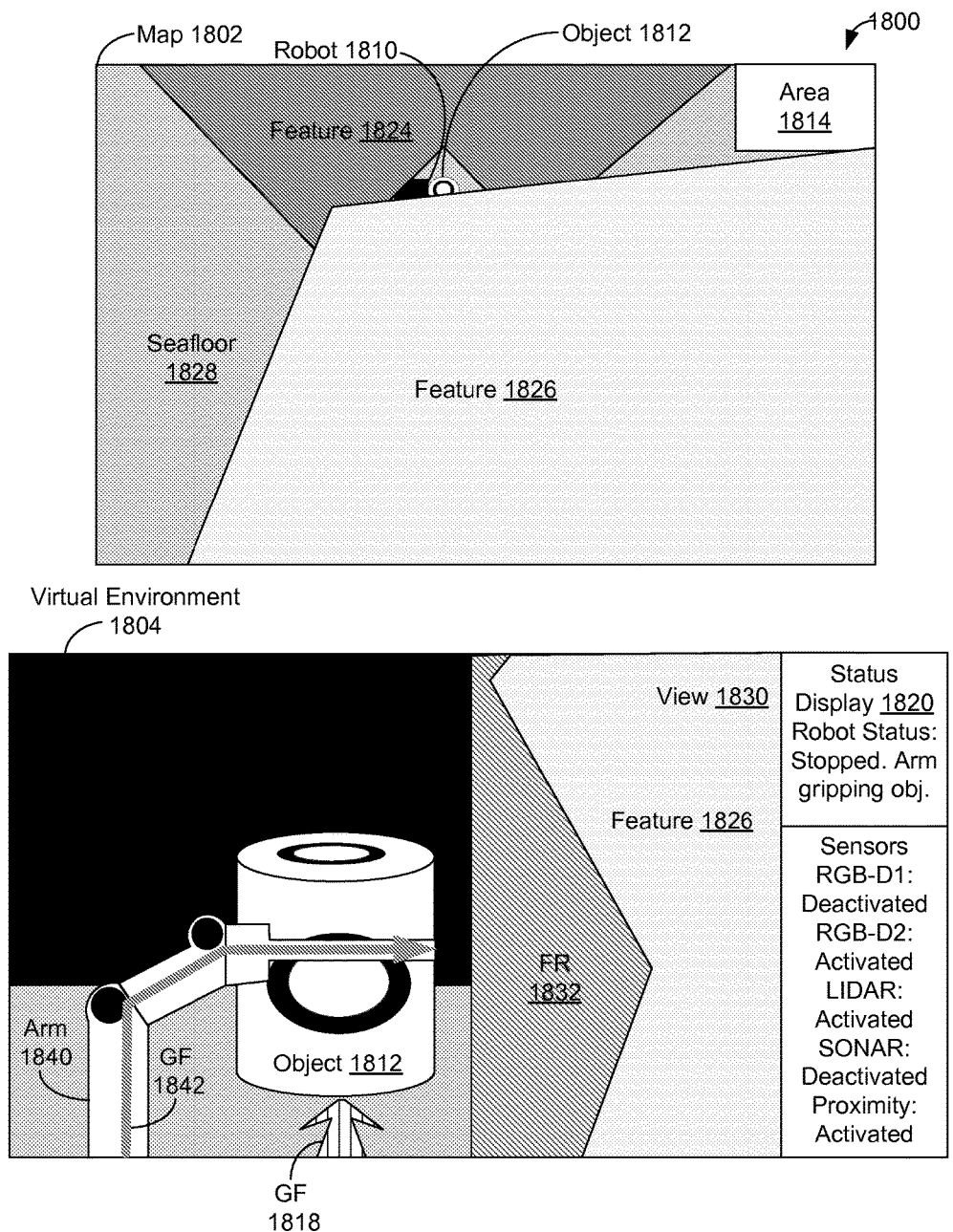

FIG. 18D shows arm 1840 of robot 1810 grasping object 1812, as indicated by virtual environment 1804 using both status display 1820 stating "Arm gripping obj" and images in view 1830 that generated using data from camera RGB-D2 associated with arm 1840. Status display 1820 also indicates that: robot 1810 has stopped during the grasping task; camera RGB-D2, the LIDAR device, and the non-contact proximity sensor are activated; and camera RGB-D1 and the SONAR device are deactivated. FIG. 18D shows that view 1830 includes an image of arm 1840 grasping object 1812 and shows guidance fixture 1818 pointing directly at object 1812. View 1830 also shows that arm 1840 followed a path provided by guidance fixture 1842 to grasp object 1812 and avoid forbidden region 1832 that adjoins fixture 1826.

After arm 1840 of robot 1810 grasps object 1812, scenario 1800 continues with activation of camera RGB-D1 and the SONAR device, and deactivation of camera RGB-D2, the LIDAR device, and the non-contact proximity sensor. Then, scenario 1800 progresses by robot 1810 taking object 1812 to area 1814.

Figure 18E:
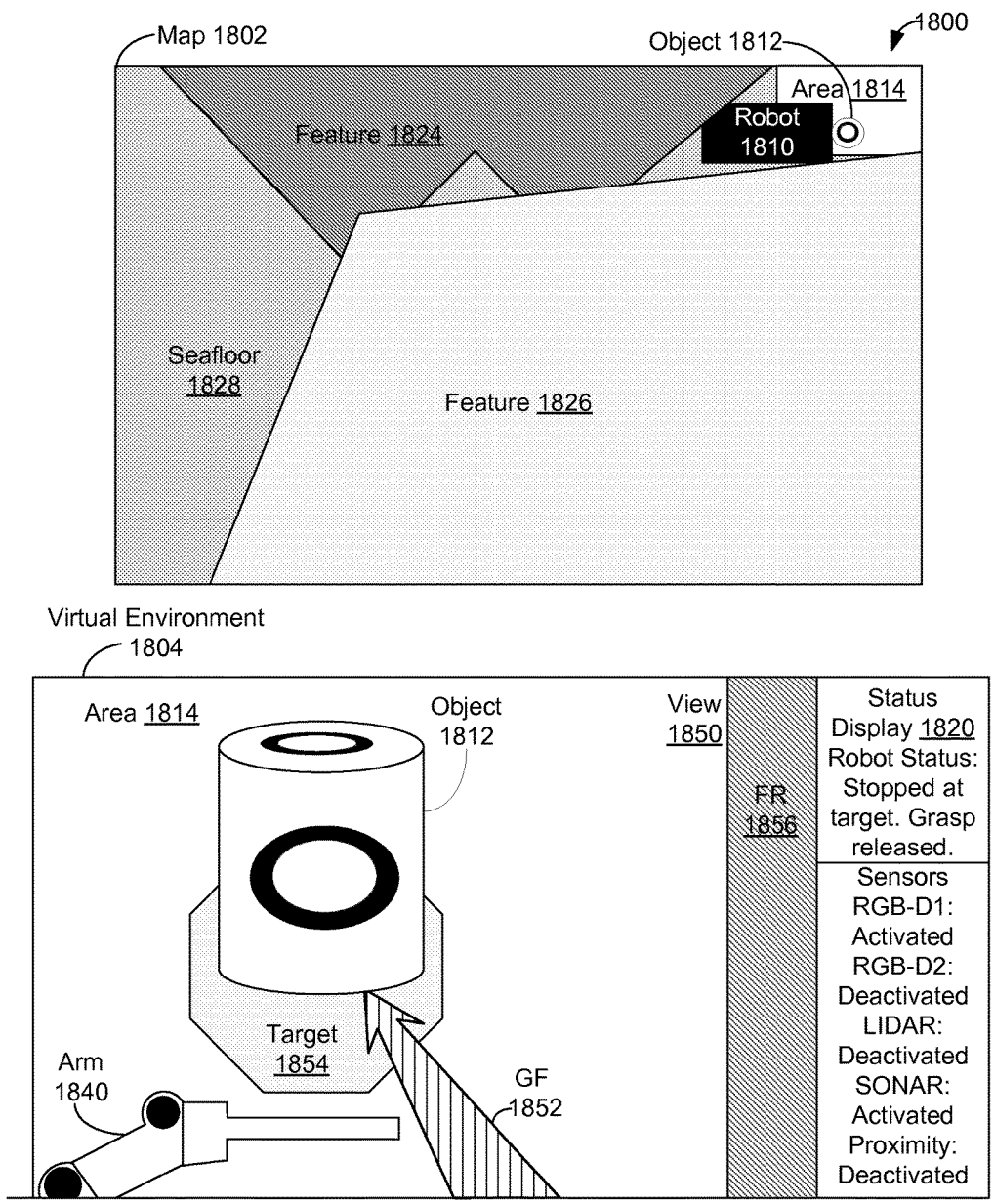

FIG. 18E shows that map 1802 indicates that robot 1810 and object 1812 have arrived at area 1814. FIG. 18E also shows view 1850 displayed by virtual environment 1804. View 1850 includes displays of guidance fixture 1852 and forbidden region 1856, both of which can provide haptic and visual feedback to help the human operator convey object 1812 to area 1814 on a relatively direct path and to minimize collisions along the way.

A computing device supporting the master console and/or another computing device can provide haptic feedback related to guidance fixture 1852, forbidden region 1856, and/or other virtual haptic fixtures. To carry out a task such as driving robot 1810 and/or grasping object 1818, the human operator can generate one or more commands to robot 1810 via the master console; e.g., the commands can be generated based on movement of and feedback provided by the haptic interface device.

View 1850 also includes 2D images from camera RGB-D1 indicating that robot 1810 has released object 1812, and object 1812 rests atop target 1854 within area 1814. View 1850 also shows that arm 1840 has moved away from object 1812. Status display 1820 of virtual environment 1804 indicates that robot 1810 is has stopped at target 1854, that a grasp of arm 1840 has been released, that camera RGB-D1 and the SONAR device remain activated, while camera RGB-D2, the LIDAR device, and the non-contact proximity sensor remain deactivated. The task of retrieving and delivering object 1812 to area 1814 was completed once robot 1810 released object 1812 at target 1854 of area 1814. Upon completion of the task, scenario 1800 can be completed.

Figure 19A:
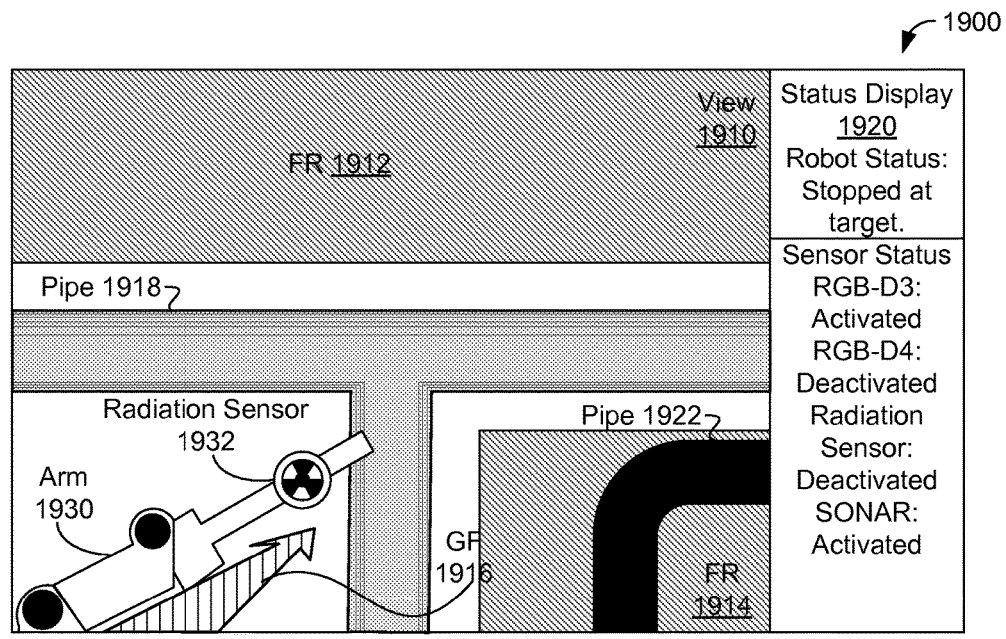
FIGS. 19A-19F depict another scenario indicating the use of multiple sensors and virtual haptic fixtures to allow a human operator and a robot to complete a task, in accordance with an example embodiment.
Figure 19B:
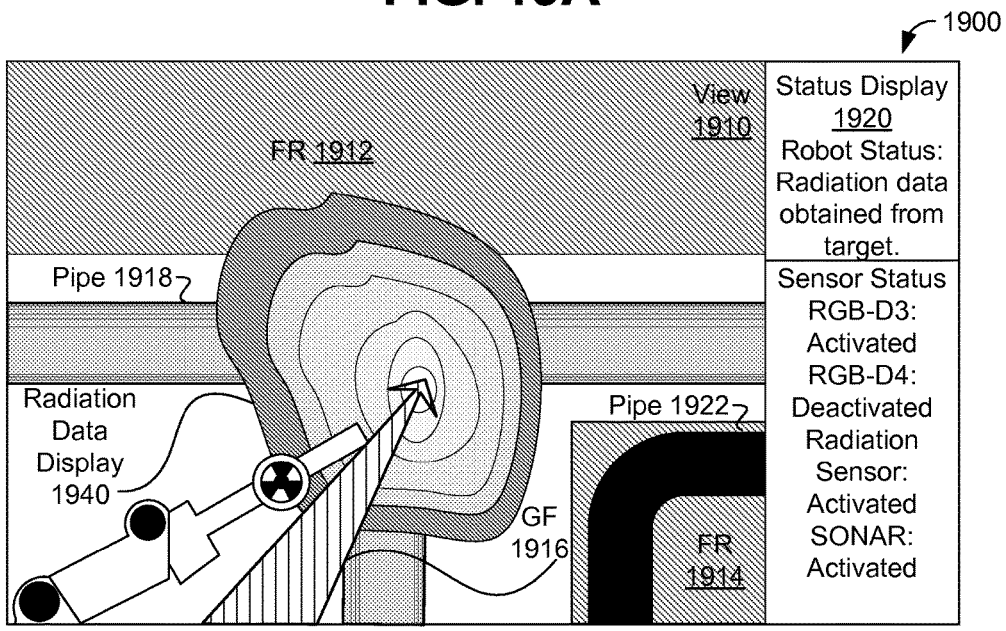

FIGS. 19A and 19B depict scenario 1900 indicating the use of multiple sensors and virtual haptic fixtures to allow a human operator and a robot to complete a task, in accordance with an example embodiment. Scenario 1900 takes place underwater, where a pipe of a sunken vessel, shown in FIGS. 19A and 19B as pipe 1918, may have sprung a leak. At the onset of scenario 1900, it is possible but not certain that pipe 1918 contains radioactive materials, such as a radioactive gas. The robotic platform and its human operator have been assigned to conduct an investigation of the status of pipe 1918. Then, if the investigation indicates that pipe 1918 does leak, the human operator and the robot will be assigned to fix pipe 1918.

At the onset of scenario 1900, a robotic platform, which is similar to robot 1810 described above, is operating in a remote environment while being equipped with arm 1930 and four sensors: two RGB-D cameras, a SONAR device, and radiation sensor 1932 configured for sensing radiation in the remote environment. For example, the radiation sensor can be configured to detect radioactive emissions, such as but not limited to beta particles and gamma rays. One of the RGB-D cameras, RGB-D3, is mounted on an upper portion of the robotic platform in the fashion of camera RGB-D1 of robot 1810 or sensor 840 of robotic platform 800, and the other RGB-D camera, RGB-D4, is mounted on arm 1930 of the robotic platform in a similar fashion to camera RGB-D2 of robot 1810. Both cameras consume a relatively-small amount of power in operation during scenario 1900. The SONAR device can be used to provide general location, velocity, and acceleration information, and consumes a relatively-moderate amount of power while in operation during scenario 1900.

FIG. 19A shows that, at the onset of scenario 1900, view 1910 shows the human operator of the robotic platform a virtual environment with forbidden region fixtures 1912 and 1914 directing the human operator and robotic platform from collisions with other portions of the vessel, including pipe 1922 protected by forbidden region fixture 1914. Guidance fixture 1916 directs the human operator to pipe 1918, as shown in view 1910. View 1910 also includes imagery from the remote environment generated from data provided by camera RGB-D3 augmented by data from the SONAR device of the robotic platform. FIG. 19A also includes status display 1920 which indicates that the robotic device is "[s]topped at [the] target"; i.e., pipe 1918, and that camera RGB-D3 and the SONAR device are activated, while camera RGB-D4 and the radiation sensor are deactivated.

Scenario 1900 continues with the human operator and the robotic device investigating pipe 1918. The imagery from camera RGB-D3 of pipe 1918 shown in FIG. 19A does not show an obvious defect in pipe 1918. To continue the investigation of pipe 1918, additional data is required. In scenario 1900, software providing the virtual environment for scenario 1900 and/or providing a virtual fixture, such as guidance fixture 1916, can send one or more commands to the robotic platform to activate the radiation sensor and collect radiation data while the robotic platform remains in front of pipe 1918. In other scenarios, the human operator can send the one or more commands for activating the radiation sensor and collecting radiation data to the robotic platform. The radiation data is then collected by the radiation sensor, communicated to the robotic platform, and then used in the virtual environment.

FIG. 19B shows view 1910 updated to include the data collected by the radiation sensor, and with status display 1920 indicating that "[r]adiation data [was] obtained" from pipe 1918 as well as the now-activated status of the radiation sensor. In particular, view 1910 has been updated to include radiation data display 1940, which shows radiation. Radiation data display 1940 using a heat-map type display to indicate radiation levels, where lighter colors indicate more radiation. That is, the white circular region shown in FIG. 19B as being near the center of radiation data display 1940 is a region with the most radiation as indicated by the collected radiation data, and the relatively-dark gray region shown at the outer edge of radiation data display 1940 is a region with the least radiation as indicated by the collected radiation data, perhaps being a region with the least amount of radiation above a threshold/background amount.

Along with view 1910, other aspects of the virtual environment have been updated based on the collected radiation data by the software providing the virtual environment for scenario 1900 and/or providing virtual haptic fixtures 1914 and 1916. FIG. 19B shows that guidance fixture 1916 has moved to direct the human operator to the white circular region near the center of radiation data display 1940 as a likely leak location. Also, guidance fixture 1914 has been reduced in size to provide additional room to maneuver the robotic platform, especially arm 1930, to investigate the now-located leak in pipe 1918.

After the investigation of pipe 1918 located the leak, scenario 1900 continues with plate 1950, shown in FIGS. 19C-19F, being welded on to pipe 1918 to fix the leak. To weld the leak, arm 1930 of the robotic platform has been modified to remove radiation sensors 1932 and to add welder 1952. Welder 1952 includes a welding torch and at least two sensors: a weld thermometer that can obtain temperature readings of objects, such as pipe 1918 and plate 1950, near the welding torch and an ultrasonic sensor that can be used to inspect any welds made using the welding torch of welder 1952.

Figure 19C:
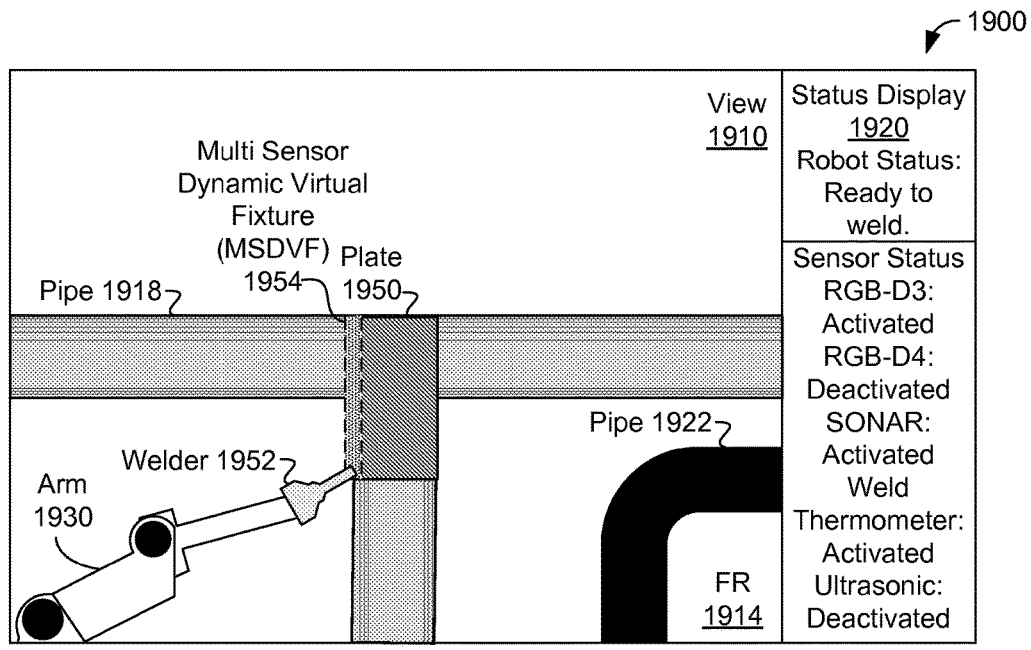

FIG. 19C shows view 1910 indicating that arm 1930 is configured with welder 1952. Welder 1952 is in position to begin performing a task that has two portions: a first portion for welding plate 1950 to pipe 1918 and then a second portion for checking the welding of plate 1950 in the remote environment. The task can be performed using the one or more commands that are generated based on haptic feedback provided for using at least multi-sensor dynamic virtual fixture (MSDVF) 1954 shown as part of view 1910 of a virtual environment.

An MSDVF can include multiple virtual-fixture regions, where the virtual-fixture regions can change/be updated based on data received from multiple sensors that are associated with the MSDVF. In some examples, each sensor can provide data that can be provide one or more of N dimensions of data. For examples, if the multiple sensors include an RGB-D camera, a thermometer, and a microphone, at least five dimensions of data can be provided by these three sensors: at least X, Y, Z spatial dimensions of data by the RGB-D camera, one or more dimensions related to temperature values provided by the thermometer, and one or more dimensions related to sounds capture by the microphone. These dimensions can depend on raw (original) data provided by the sensors, by data that has been processed after being provided by the sensors, and/or by data provided within various other contexts. Examples of processed data include, but are not limited to, images and/or sounds that have been processed and/or filtered using one or more respective image and/or sound processing techniques, data scaled and/or fitted within a range of data (e.g., sensor data providing per-second counts that are scaled based on a maximum per-second count value; temperature values fit within a 0°-100° C. range), averaged data, sampled data, and data accepted (rejected) upon being above or below one or more threshold values. Data provided within a context includes, but is not limited to, location and/or other data restricted to a context of a specific environment or part of the environment (e.g., building, room, object(s) in the environment), imagery, sounds, and/or other data captured from sensors observing a specific environment or part of the environment, data received for specific environment or part of the environment where additional data are available for fusion and/or comparison (e.g., stress-related data for members of a structure where the members have been modeled using finite element methods and/or other techniques), and/or data compared to model data (e.g., sound data received from an engine (or other object) compared to sounds received from a properly-functioning engine (or other object) and/or an improperly-functioning engine (or other object)).

Updating the MSDVF can include one or more of: modifying a geometry of the MSDVF based on the data received from the multiple sensors; e.g., changing a shape, size, and/or location of at least a portion of the MSDVF; changing at least a portion of the MSDVF from being a guidance fixture to a forbidden-region fixture based on the data received from the multiple sensors; and changing at least a portion of the MSDVF from being a forbidden-region fixture to a guidance fixture based on the data received from the multiple sensors. Other updates to at least a portion of an MSDVF are possible as well. The data received from multiple sensors can be data obtained before, during and/or after carrying out a portion of a task; then, a subsequent portion of the task can be performed of the task utilizing the updated MSDVF. The multiple sensors can include some or all of the sensors mentioned as sensor 976*b*.

Virtual fixtures, including MSDVFs, can be used to provide haptic feedback based on sensor data provided by one or more sensors. Multi-sensor dynamic virtual fixtures can also change and/or be updated based on the sensor data. For example, in some environments, imagery can be used to provide geometric information about objects in those environments. Later, some or all of those objects can have forces applied to them and various stresses in the objects can be measured; e.g., using strain gauges. The forces can be applied to the objects using a robotic platform guided by a human operator putting stress at locations indicated by virtual fixtures, including MSDVFs. Then, the imagery and data about the measured stresses can be combined to modify the MSDVFs; e.g., to change a path directed by an MSDVF to pick up the object, to change a location of an MSDVF to place the object, etc.

FIG. 19C also shows robot status display 1920 having a robot status of "Ready to weld", and a sensor status indicating that camera RGB-D3, SONAR device, and a weld thermometer are activated, while camera RGB-D4 and an ultrasonic sensor are deactivated. View 1910 also indicate that MSDVF 1954 is shown outlined with dashed lines and filled with black dots on a grey background, where a grey-and-black dotted portion of MSDVF 1954 in FIGS. 19C-19F indicates a portion of MSDVF 1954 that is a guidance feature.

Scenario 1900 continues with the robotic platform and its human operator carrying out the first portion of the task by welding plate 1950 onto pipe 1918. The weld of plate 1950 involves welding plate 1950 to pipe 1918, with the weld starting along a left-most side of an upper portion of a "T" shape formed by pipe 1918 and then continuing to reach an upper portion of the "T" shape of pipe 1918 along the line indicated by MSDVF 1954; that is, the weld is made in an upward direction as shown in FIG. 19C.

Figure 19D:
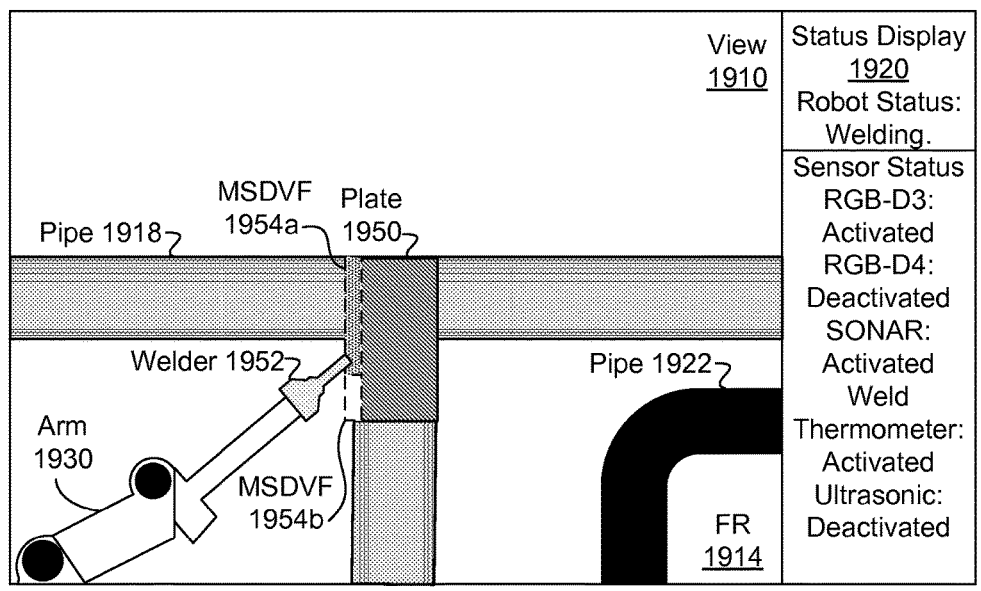

FIG. 19D shows that the weld of the first portion of the task is about one-quarter completed. During the welding process, the weld thermometer captures temperature data from near a point where the welding torch directly heats plate 1950. The captured temperature data, as well as data from camera RGB-D3 and the SONAR device of the robotic platform can be provided to the software providing the virtual environment for scenario 1900.

FIG. 19D shows that MSDVF 1954 has two portions: an upper portion MSDVF 1954*a* acting as a virtual guidance fixture to guide the remaining portion of the weld and a lower portion MSDVF 1954*b* shown in white to indicate that lower portion MSDVF 1954*b* is acting as a forbidden region guidance fixture. In scenario 1900, the captured temperature data indicates that an already-completed part of the weld has cooled below a threshold value. The temperature data can then be provided to the software providing the virtual environment for scenario 1900. This software can then update MSDVF 1954 to indicate that lower portion MSDVF 1954*b* of MSDVF 1954 is to act as a forbidden region—this update to MSDVF 1954 can make completion of the weld more efficient by preventing retracement of the already-completed portion of the weld.

Scenario 1900 continues with completion of the first portion of the task—welding plate 1950 to pipe 1918 and the subsequent beginning of the second portion of the task— checking the weld. To check the weld, the robotic device can activate the ultrasound sensor associated with welder 1952, and the human operator can control the robotic device to scan the weld with the ultrasound sensor.

Figure 19E:
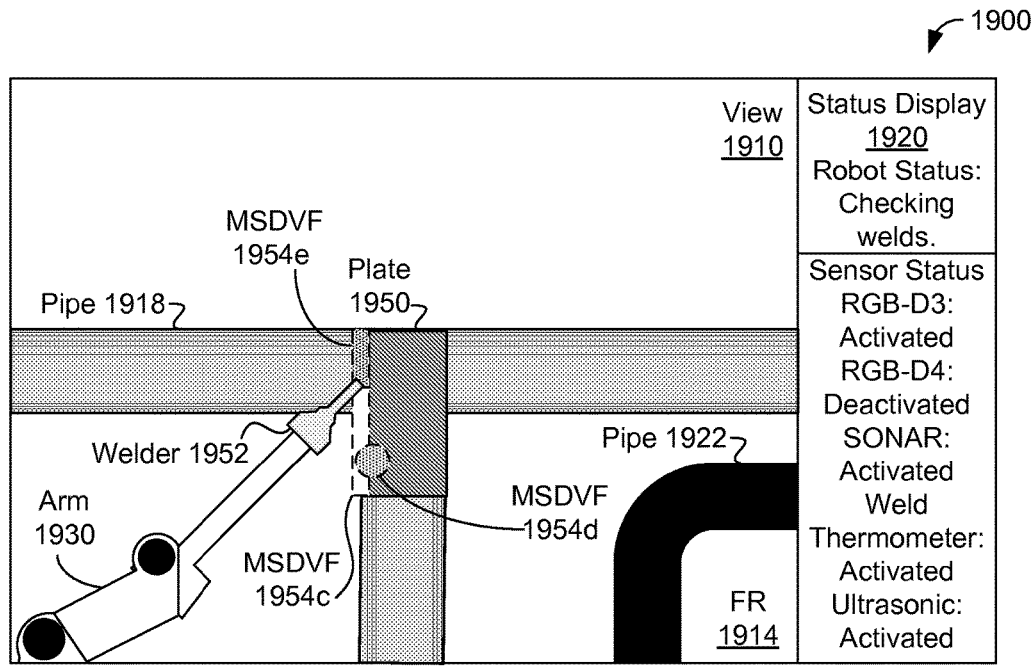

FIG. 19E shows use of MSDVF 1954 in checking the weld and tracking portions that need additional work. View 1910 of FIG. 19E shows welder 1952 approximately halfway through checking the weld with welder 1952 by scanning the extent of the weld with the ultrasound sensor. Robot status 1920 indicate that the robotic platform is "Checking welds" and that several sensors, including camera RGB-D3, the SONAR device, the weld thermometer, and the ultrasound sensor are activated, while camera RGB-D4 is deactivated. The activated sensors can provide data to the software providing the virtual environment for scenario 1900 and/or MSDVF 1954 so that MSDVF can change based on the provided sensor data.

MSDVF 1954 can provide visual, haptic, and perhaps auditory guidance to the human operator to keep scanning along the weld. FIG. 19E shows that, while approximately halfway through tracing the weld, MSDVF 1954 has three portions. A first portion MSDVF 1954c shown as a forbidden region indicating a portion of the weld already checked for defects and so should not be rescanned for efficiency's sake. A second portion MSDVF 1954d shown as a guidance fixture indicates a region of the weld scanned by the activated sensors and found to be defective; i.e., a portion of the weld that should be re-welded. That is, second portion MSDVF 1954d can be generated based on data from the activated sensors indicating that a portion of the weld associated with second portion MSDVF 1954d is found to be defective. Second portion MSDVF 1954d shows that geometry of MSDVF 1954 has been modified based on the data from the activated sensors, as MSDVF 1954d has a geometry of being circular in shape that differs from an original geometry MSDVF 1954 of being rectangular in shape. In other examples, MSDVF 1954 can be modified from the original geometry due to data from one or more sensors and/or contextual information, to change size(s), shape(s), location(s), and/or other geometrical aspects of the MSDVF.

A third portion MSDVF 1954e shown as a guidance fixture indicating a portion of the weld still to be checked for defects. First portion MSDVF 1954c and/or third portion MSDVF 1954e can be changed both on sensory data as well as contextual information, such as information about progress of welder 1952 while scanning the weld; that is, the guidance fixture/third portion MSDVF 1954e of MSDVF 1954 can change to forbidden region/first portion MSDVF 1954c as ultrasound sensor and welder 1952 progresses through checking the weld.

Figure 19F:
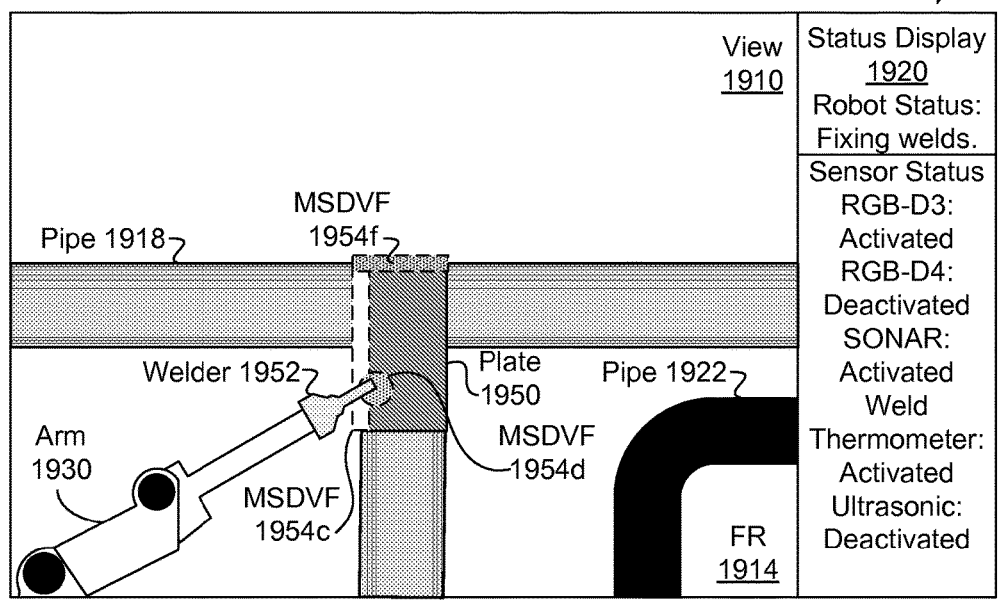

Scenario 1900 continues with completion of checking of the weld and subsequent repair of the defective portion of the weld found during weld checking, as shown in FIG. 19F. The human operator of the robotic platform can be guided to repair of the defective portion of the weld using the guidance fixture/second portion MSDVF 1954d of MSDVF 1954. Once guided to the correct position; i.e., a location in the remote environment corresponding to the location of MSDVF 1954d, the human operator can use welder 1952 to re-weld the defective portion of the weld and re-check the re-welded portion of the weld. In scenario 1900, after re-welding and re-checking, the weld is determined to be without defects.

FIG. 19F illustrates that, after repair of the defective portion of the weld indicated by second portion MSDVF 1954d of MSDVF, another weld can be made along a line indicated by guidance fixture portion MSDVF 1954f of MSDVF 1954 to better attach plate 1950 to pipe 1918. Portion MSDVF 1954f of MSDVF 1954 can be generated by contextual/planning information indicating that a weld along a line indicated by guidance fixture portion MSDVF 1954f is to be performed to better attach plate 1950 to pipe 1918. Once plate 1950 has been successfully welded to pipe 1918, scenario 1900 can be completed.

Other scenarios using haptic virtual fixtures with multiple inputs, including data from multiple sensors, are possible as well. For example, an MSDVF operating in an environment where data is provided by at least a microphone can detect sounds from an operating component, such as an engine, pump, or other operating machinery. The sounds can be analyzed to determine if the operating component is operating correctly or incorrectly. Then, based on the analyzed sounds, the MSDVF can be modified. For example, if the operating component is operating correctly, then the MSDVF can be modified to indicate that a portion of a task to investigate the operating component is completed. Or, if the operating component is operating incorrectly, then the MSDVF can be modified to indicate that a portion of a task to investigate one or more suspected defective sub-components of the operating component in more detail. Thus, the MSDVF can be used to make faster and more accurate repairs by adapting to data received from an environment.

The data can be from multiple sources that can include data from non-sensory/contextual sources. For example, data from a strain gauge measuring stresses on an object can be used in conjunction with analytical data from an analysis of the object, such as a data derived from a finite element model and/or other mathematical model(s) of the object, to determine how to best work with the object. That is, the strain gauge data in combination with the analytical data can be used to determine a path to move or otherwise manipulate the object without damaging the object, how much force can be applied to the object to manipulate the object, how much weight can be applied to the object (e.g., if other objects are placed atop the object), and to determine other aspects of the task and/or object. The non-sensory/contextual sources can include information about task(s) to be performed; e.g., a geometry of an MSDVF can include one or more portions, such as guidance fixture portions, along a pathway to move or otherwise manipulate the object. Many other examples of using sensory and/or non-sensory data to establish, change, and/or delete part or all of an MSDVF are possible as well.

An Example Computing Network

Figure 20A:
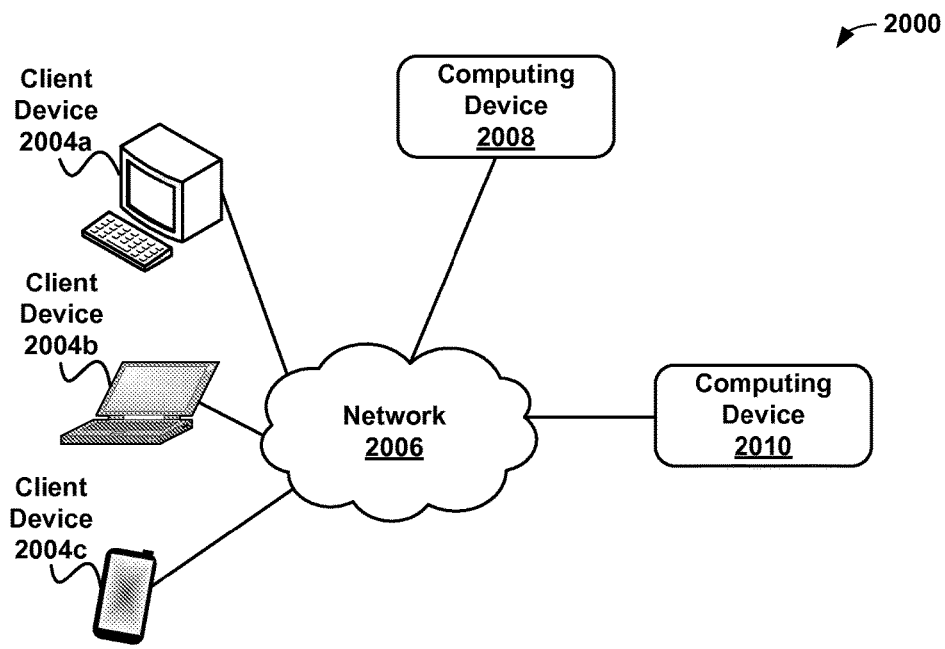
FIG. 20A is a block diagram of a computing environment, in accordance with an example embodiment.

FIG. 20A depicts a network 2000 in accordance with an example embodiment. In FIG. 20A, computing devices 2008 and 2010 are configured to communicate, via a network 2006, with client devices 2004a, 2004b, and 2004c. As shown in FIG. 20A, client devices can include a personal computer 2004a, a laptop computer 2004b, and a smartphone 2004c. More generally, client devices 2004a-2004c (or any additional client devices) can be any sort of computing device, such as a workstation, network terminal, desktop computer, laptop computer, wireless communication device (e.g., a cell phone or smart phone), and so on. In some embodiments, one or more of client devices 2004a-2004c can be configured to perform the tasks of a master console.

The network 2006 can correspond to a local area network, a wide area network, a corporate intranet, the public Internet, combinations thereof, or any other type of network(s) configured to provide communication between networked computing devices. Computing devices 2008 and 2010 can share content and/or provide content to client devices 2004a-2004c; i.e., act as content servers. As shown in FIG. 20A, computing devices 2008 and 2010 are not physically at the same location; for example, one or more of computing devices 2008 and 2010 can be in a remote location and/or be aboard a robotic platform. Alternatively, computing devices 2008 and 2010 can be co-located, and/or can be accessible via a network separate from network 2006. Although FIG. 20A shows three client devices and two computing devices, network 2006 can service more or fewer than three client devices and/or more or fewer than two computing devices.

Example Computing Device

Figure 20B:
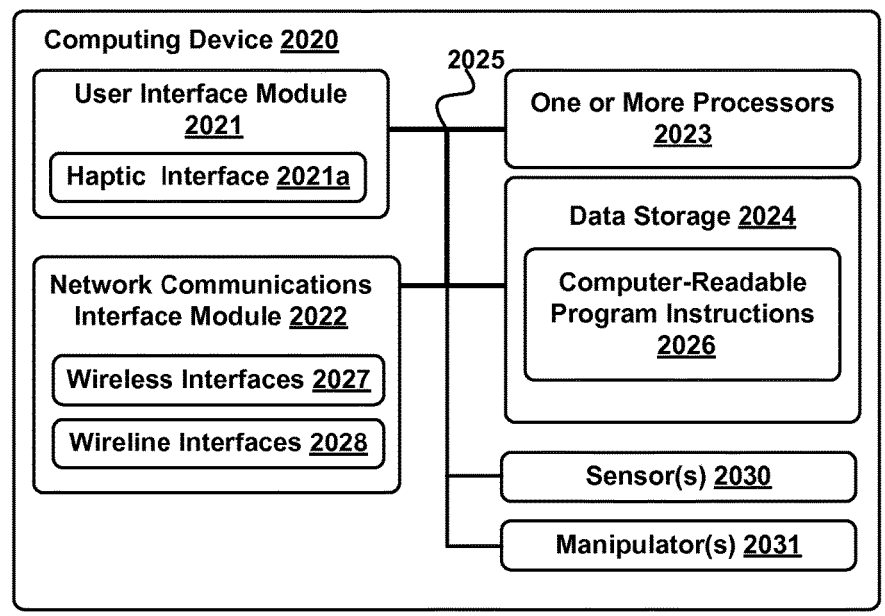
FIG. 20B is a block diagram of an example computing device, in accordance with an example embodiment.

FIG. 20B is a block diagram of an example computing device 2020 including user interface module 2021, network-communication interface module 2022, one or more processors 2023, and data storage 2024, in accordance with embodiments of the invention. In particular, computing device 2020 shown in FIG. 20A can be configured to perform one or more functions related to camera 120, sensors 130, 840, 976*b*, 1932, gripper 140, point clouds 510, 512, 520, 522, points 700, 710, effector 720, robotic platform 800, base 810, manipulator 820, controller 830, router 850, master console 810, haptic interface device 910, display 920, network 940, computing devices 950*a*, 950*b*, camera 976*a*, robot 1810 (including, but not limited to, functions related to arms 1840, and sensors mentioned in scenarios 1800) and/or to implement part or all of virtual environments 960, 1000, 1804, visualization 968, guidance fixtures 1110, 1818, 1840, 1852, 1916, tasks 1220, 1230, scenarios 1800, 1900, views 1816, 1830, 1910, status displays 1820, 1920, forbidden regions 1832, 1856, 1912, 1914, and/or method 2100. Computing device 2020 can include a user interface module 2021, a network-communication interface module 2022, one or more processors 2023, and data storage 2024, all of which may be linked together via a system bus, network, or other connection mechanism 2025.

Computing device 2020 can be a desktop computer, laptop or notebook computer, personal data assistant (PDA), mobile phone, embedded processor, or any similar device that is equipped with at least one processing unit capable of executing machine-language instructions that implement at least part of the herein-described techniques and methods, including but not limited to method 2100 described in more detail below with respect to FIG. 21.

User interface 2021 can receive input and/or provide output, perhaps to a user. User interface 2021 can be configured to send and/or receive data to and/or from user input from input device(s), such as a keyboard, a keypad, a touch screen, a computer mouse, a track ball, a joystick, and/or other similar devices configured to receive user input from a user of the computing device 2020. User interface 2021 can be configured to provide output to output display devices, such as. one or more cathode ray tubes (CRTs), liquid crystal displays (LCDs), light emitting diodes (LEDs), displays using digital light processing (DLP) technology, printers, light bulbs, and/or other similar devices capable of displaying graphical, textual, and/or numerical information to a user of computing device 2020. User interface module 2021 can also be configured to generate audible output(s), such as a speaker, speaker jack, audio output port, audio output device, earphones, and/or other similar devices configured to convey sound and/or audible information to a user of computing device 2020. As shown in FIG. 20B, user interface module 2021 can be configured with haptic interface 2021*a* that can receive inputs related to a virtual tool and/or a haptic interface point (HIP), a remote device configured to be controlled by haptic interface 2021*a*, and/or other inputs, and provide haptic outputs such as tactile feedback, vibrations, forces, motions, and/or other touch-related outputs.

Network-communication interface module 2022 can be configured to send and receive data over wireless interfaces 2027 and/or wired interfaces 2028 via a network, such as network 2006. Wired interface(s) 2028, if present, can comprise a wire, cable, fiber-optic link and/or similar physical connection to a data network, such as a wide area network (WAN), a local area network (LAN), one or more public data networks, such as the Internet, one or more private data networks, or any combination of such networks. Wireless interface(s) 2027 if present, can utilize an air interface, such as a ZigBee, Wi-Fi, and/or WiMAX interface to a data network, such as a WAN, a LAN, one or more public data networks (e.g., the Internet), one or more private data networks, or any combination of public and private data networks.

In some embodiments, network-communication interface module 2022 can be configured to provide reliable, secured, and/or authenticated communications. For each communication described herein, information for ensuring reliable communications (i.e., guaranteed message delivery) can be provided, perhaps as part of a message header and/or footer (e.g., packet/message sequencing information, encapsulation header(s) and/or footer(s), size/time information, and transmission verification information such as CRC and/or parity check values). Communications can be made secure (e.g., be encoded or encrypted) and/or decrypted/decoded using one or more cryptographic protocols and/or algorithms, such as, but not limited to, DES, AES, RSA, Diffie-Hellman, and/or DSA. Other cryptographic protocols and/or algorithms can be used as well as or in addition to those listed herein to secure (and then decrypt/decode) communications.

Processor(s) 2023 can include one or more central processing units, computer processors, mobile processors, digital signal processors (DSPs), GPUs, microprocessors, computer chips, and/or other processing units configured to execute machine-language instructions and process data. Processor(s) 2023 can be configured to execute computer-readable program instructions 2026 that are contained in data storage 2024 and/or other instructions as described herein.

Data storage 2024 can include one or more physical and/or non-transitory storage devices, such as read-only memory (ROM), random access memory (RAM), removable-disk-drive memory, hard-disk memory, magnetic-tape memory, flash memory, and/or other storage devices. Data storage 2024 can include one or more physical and/or non-transitory storage devices with at least enough combined storage capacity to contain computer-readable program instructions 2026 and any associated/related data structures.

Computer-readable program instructions 2026 and any data structures contained in data storage 2026 include computer-readable program instructions executable by processor(s) 2023 and any storage required, respectively, to perform at least part of herein-described methods, including but not limited to method 2100 described below with respect to FIG. 21. Computer-readable program instructions 2026 can include instructions that when executed by processor(s) 2023 to perform functions, including but not limited to herein-described functionality of software.

In some embodiments, computing device 2020 can include one or more sensors 2030. Sensor(s) 2030 can be configured to measure conditions in a (remote) environment about computing device 2030 and provide data about the measured conditions of the (remote) environment. In some examples, sensor(s) 2030 can include one or more of depth cameras. In other examples, sensor(s) 2030 can be one or more sensors discussed in the context of sensor 976b with regards to FIG. 9B. Other examples of sensor(s) 2030 are possible as well.

In some embodiments, computing device 2020 can include one or more manipulators 2031. Manipulator(s) 2031 can enable computing device 2020 to initiate movement. For example, manipulator(s) 2031 can include or be incorporated with robotic joints connecting robotic limbs to a robotic body, such as arm 1840 of robot 1810 and/or arm 1930 discussed above in the context of FIGS. 18A-19B. Further, the manipulator(s) 2031 can include respective robotic joints connecting respective portions of the robotic limbs (e.g., robotic knees and/or ankles for robotic legs; robotic elbows and/or wrists for robotic arms), as well as robotic hands for grasping, turning, and otherwise working with objects. In other examples, manipulator(s) 2031 can be configured as, attach to, and/or utilize one or more tools, such as, but not limited to, tongs, pliers, winches, wrenches, hammers, screwdrivers, knives, saws, drills, and/or lasers, by utilizing the robotic hands to control the tool(s) and/or as a replacement for robotic hands and/or limbs. In addition, manipulator(s) 2031 can include motors for moving the robotic joints and/or limbs. Other examples of manipulator(s) 2031 are possible as well.

Operational Methods

Figure 21:
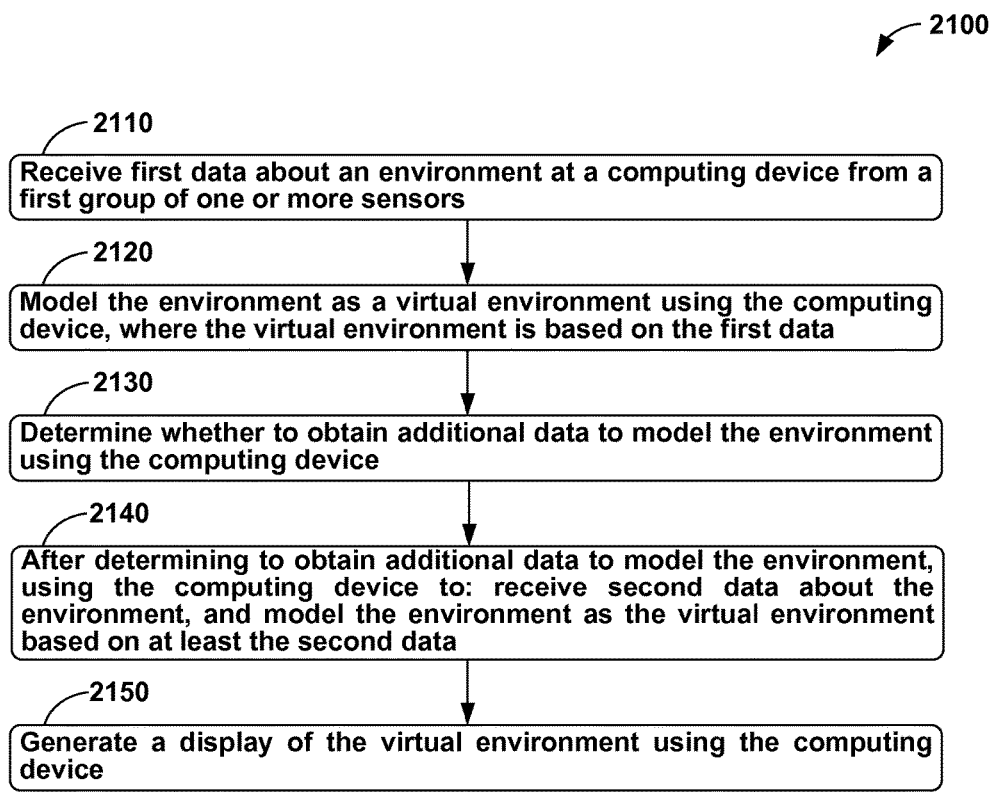
FIG. 21 is a flowchart of a method, in accordance with an example embodiment.

FIG. 21 is a flowchart depicting example functional blocks of an example method 2100. Method 2100 can be carried out by a computing device, such as computing device 2020. Method 2100 can begin at block 2110, where the computing device can receive first data about an environment from a first group of one or more sensors, such as discussed above with regards to at least FIGS. 1, 4-11, and 18A-18E.

At block 2120, the computing device can model the environment as a virtual environment, where the virtual environment is based on the first data, such as discussed above with regards to at least FIGS. 1, 4-7B, 9A-11, and 18A-19B.

At block 2130, the computing device can determine whether to obtain additional data to model the environment as the virtual environment, such as discussed above with regards to at least FIGS. 3A-7B and 18A-19B.

At block 2140, after determining to obtain additional data to model the environment, the computing device can be used to: receive second data about the environment, and model the environment as the virtual environment based on at least the second data, such as discussed above with regards to at least FIGS. 3A-3D, 7A, 7B, and 18A-19B.

In some embodiments, receiving the second data can include: determining whether a first sensor of the first group of one or more sensors interferes with a second sensor of the first group of one or more sensors; and after determining that the first sensor interferes with the second sensor: deactivating the first sensor and/or the second sensor; after deactivating the first sensor and/or the second sensor, obtaining the second data from activated sensors of the first group of one or more sensors, and generating the first plurality of points from the second depth data, such as discussed above with regards to at least FIGS. 18A-18E.

In yet other embodiments, determining second data about the environment can include: determining whether a particular sensor of the first group of one or more sensors is configured to provide at least part of the additional data, and after determining that the particular sensor is configured to provide the at least part of the additional data, obtaining at least part of the second data using the particular sensor, such as discussed above with regards to at least FIGS. 18A-19B. In particular of the these embodiments, determining whether the particular sensor of the first group of one or more sensors is configured to provide at least part of the additional data can include determining whether the particular sensor is configured to measure a particular property of the environment, such as discussed above with regards to at least FIGS. 19A and 19B. In other particular of the these embodiments, determining whether the particular sensor of the first group of one or more sensors is configured to provide at least part of the additional data can include determining whether the particular sensor is configured to provide at least part of the additional data based on a range of the particular sensor, such as discussed above with regards to at least FIGS. 18A-19B.

At block 2150, the computing device can generate a display of the virtual environment, such as discussed above with regards to at least FIGS. 1, 4-11, and 18A-19B. In some embodiments, method 2100 can also include: carrying out a task in the environment using one or more commands provided by the computing device, wherein the one or more commands are generated based on haptic feedback provided for at least one virtual haptic fixture in the virtual environment, such as discussed above with regards to at least FIGS. 4-5D, 7A, 7B, 9B-12, and 18A-19F.

In particular of these embodiments, the at least one virtual haptic feature can include a multi-sensor dynamic virtual fixture/MSDVF, such as discussed above with regards to at least FIGS. 19C-19F. In more particular of these embodiments, the task can include a first portion of the task and a second portion of the task; then, performing the task can include: performing the first portion of the task utilizing the MSDVF; at least after the first portion of the task was performed, obtaining first-portion data from a first plurality of sensors; updating the MSDVF based on the first-portion data; and after updating the MSDVF, performing the second portion of the task utilizing the updated MSDVF, such as discussed above with regards to at least FIGS. 19C-19F. In even more particular of these embodiments, updating the MSDVF can include one or more of: modifying a geometry of the MSDVF based on the first-portion data; changing at least a portion of the MSDVF from being a guidance fixture to a forbidden-region fixture based on the first-portion data; and changing at least a portion of the MSDVF from being a forbidden-region fixture to a guidance fixture based on the first-portion data, such as discussed above with regards to at least FIGS. 19C-19F.

In other embodiments, the first data can include first depth data, modeling the environment as the virtual environment using the computing device can include modeling the environment using a first plurality of points that are obtained from the first depth data, determining whether to obtain additional data to model the environment can include determining whether the first plurality of points is sufficient to model the environment, the second data can include second depth data, and modeling the environment as the virtual environment based on at least the second data can include modeling the environment using at least a second plurality of points that are obtained from the second depth data, such as discussed above with regards to at least FIGS. 3A-3D, 7A, 7B, and 18A-18E.

In some of these embodiments, requesting the second data can include: requesting the second depth data from a second group of one or more sensors, wherein the second group of one or more sensors differs from the first group of one or more sensors; generating an additional plurality of points from the second depth data; and merging the first plurality of points and the additional plurality of points into the second plurality of points, such as discussed above with regards to at least FIGS. 4-5D, 7A, 7B, and 18A-18E. In particular of these embodiments, the environment can include a first object and a second object; then, determining whether the first plurality of points is sufficient to model the environment can include: determining an object distance in the environment between the first object and the second object, and determining whether the first plurality of points is sufficient to model the environment based on the object distance, such as discussed above with regards to at least FIGS. 2-3D. In some of the particular of these embodiments, the first object is associated with a plurality of sensors, and wherein requesting second depth data from the second group of one or more sensors comprises selecting the second group of one or more sensors from the plurality of sensors based on the object distance, such as discussed above with regards to at least FIGS. 2-3D. In other of the particular of these embodiments, method 2100 can further include: determining that the first object moved in the environment with respect to the second object; determining a new object distance between the first object and the second object; and determining whether the second plurality of points is sufficient to model the environment based on the new object distance, such as discussed above with regards to at least FIGS. 2-3D. In even other of the particular of these embodiments, the first object comprises a robotic device controlled by the computing device, such as discussed above with regards to at least FIGS. 2-3D.

In still other of the particular of these embodiments, the virtual environment can include a first virtual object corresponding to the first object and a second virtual object corresponding to the second object. Then, determining whether the first plurality of points is sufficient to model the environment can include: determining a virtual-object distance in the virtual environment between the first virtual object and the second and determining whether the first plurality of points is sufficient to model the environment based on the virtual-object distance, such as discussed above with regards to at least FIGS. 2-3D and 18A-18E. In particular of the still other of the particular of these embodiments, the virtual object can include a virtual haptic fixture, such as discussed above with regards to at least FIGS. 18A-18E. In other particular of the still other of the particular of these embodiments, the first virtual object is associated with a plurality of sensors, and wherein requesting second depth data from the second group of one or more sensors comprises selecting the second group of one or more sensors from the plurality of sensors based on the virtual-object distance, such as discussed above with regards to at least FIGS. 18A-18E. In even other particular of the still other of the particular of these embodiments, method 2100 can include: determining that the first virtual object moved in the environment with respect to the second virtual object; determining a new virtual-object distance between the first virtual object and the second virtual object; and determining whether the second plurality of points is sufficient to model the environment based on the new virtual-object distance, such as discussed above with regards to at least FIGS. 18A-18E. In yet other particular of the still other of the particular of these embodiments, the first virtual object represents a robotic device controlled by the computing device, such as discussed above with regards to at least FIGS. 18A-18E.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include physical and/or non-transitory computer readable media such as computer-readable media that stores data for short periods of time like register memory, processor cache, and random access memory (RAM). The computer readable media may also include physical and/or non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

The terms physical and/or tangible computer-readable medium and physical and/or tangible computer-readable media refer to any physical and/or tangible medium that can be configured to store instructions for execution by a processor, processing unit and/or computing device. Such a medium or media can take many forms, including but not limited to, non-volatile media and volatile media. Non-volatile media includes, for example, read only memory (ROM), flash memory, magnetic-disk memory, optical-disk memory, removable-disk memory, magnetic-tape memory, hard drive devices, compact disc ROMs (CD-ROMs), direct video disc ROMs (DVD-ROMs), computer diskettes, and/or paper cards. Volatile media include dynamic memory, such as main memory, cache memory, and/or random access memory (RAM). Many other types of tangible computer-readable media are possible as well. As such, the herein-described data storage can comprise and/or be one or more physical and/or tangible computer-readable media.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
receiving first data about an environment at a computing device from a first group of one or more sensors, wherein the environment comprises a first object and a second object, wherein the first object comprises a robotic device, and wherein the first data comprises a plurality of data points related to the environment;
modeling the environment as a virtual environment using the computing device, wherein the virtual environment is based on the first data, and wherein the robotic device is controlled using the virtual environment of the computing device;
determining whether to obtain one or more additional data points for the plurality of data points to model the environment using the computing device by:
determining whether an object distance in the environment between the first object and the second object is within a predetermined distance, and
after determining that the object distance is within the predetermined distance, determining whether to obtain one or more additional data points for the plurality of data points to model a surface of the second object in the environment so that the first object avoids contacting the second object;
after determining to obtain additional data points for the plurality of data points to model the surface of the second object in the environment, using the computing device to:
receive second data about the environment, the second data comprising the one or more additional data points, and
model the environment as the virtual environment based on at least the second data; and
generating a display of the virtual environment using the computing device.

2. The method of claim 1, wherein receiving the second data about the environment comprises:
determining whether a first sensor of the first group of one or more sensors is configured to obtain at least one data point of the one or more additional data points; and
after determining that the first sensor is configured to provide at least one data point of the additional data points, obtaining at least part of the second data using the first sensor.

3. The method of claim 2, wherein determining whether the first sensor of the first group of one or more sensors is configured to obtain at least one data point of the one or more additional data points comprises determining whether the first sensor is configured to measure a particular property of the environment.

4. The method of claim 2, wherein determining whether the first sensor of the first group of one or more sensors is configured to obtain at least one data point of the one or more additional data points comprises determining whether the first sensor is configured to obtain the at least one data point of the one or more additional data points based on a range of the first sensor.

5. The method of claim 1, wherein receiving the second data comprises:
determining whether a first sensor of the first group of one or more sensors interferes with a second sensor of the first group of one or more sensors; and
after determining that the first sensor interferes with the second sensor:
deactivating the first sensor and/or the second sensor, and
after deactivating the first sensor and/or the second sensor, obtaining the second data from activated sensors of the first group of one or more sensors.

6. The method of claim 1, wherein the first data comprises first depth data,
wherein modeling the environment as the virtual environment comprises modeling the environment using a first plurality of points that are obtained from the first depth data,
wherein determining whether to obtain additional data to model the environment comprises determining whether the first plurality of points is sufficient to model the environment,
wherein the second data comprises second depth data, and
wherein modeling the environment as the virtual environment based on at least the second data comprises modeling the environment using at least a second plurality of points that are obtained from the second depth data.

7. The method of claim 6, wherein the plurality of data points comprises the first plurality of points, and wherein receiving the second data comprises:
requesting the second depth data from a second group of one or more sensors, wherein the second group of one or more sensors differs from the first group of one or more sensors;
generating the second plurality of points from the second depth data; and
merging the plurality of data points and the second plurality of points into the plurality of data points.

8. The method of claim 7, wherein the predetermined distance is based on a sensing distance that a first sensor of the second group of one or more sensors is configured to sense the surface of the object.

9. The method of claim 7, wherein requesting second depth data from the second group of one or more sensors comprises using the first sensor of the second group of one or more sensors to obtain the one or more additional data points.

10. The method of claim 7, further comprising:
after merging the plurality of data points with the second plurality of points, determining that the first object moved in the environment with respect to the second object;

determining whether a new object distance between the first object and the second object is within the predetermined distance; and after determining that the new object distance is within the predetermined distance, determining whether to obtain at least one additional data point for the plurality of data points to model the surface of the second object in the environment so that the first object avoids contacting the second object.

11. The method of claim 1, wherein the virtual environment comprises a first virtual object corresponding to the first object and a second virtual object corresponding to the second object, and wherein determining whether to obtain one or more additional data points of the plurality of data points to model the surface of the second object in the environment so that the first object avoids contacting the second object comprises:

determining a virtual-object distance in the virtual environment between the first virtual object and the second virtual object; and determining whether to obtain the one or more additional data points of the plurality of data points to model the surface of the second object based on the virtual-object distance.

12. The method of claim 11, wherein the first virtual object comprises a virtual haptic fixture.

13. The method of claim 11, wherein the first virtual object is associated with a plurality of sensors, and wherein receiving second data about the environment comprises selecting a group of one or more sensors from the plurality of sensors to obtain the second data based on the virtual-object distance.

14. The method of claim 11, further comprising:

determining that the first virtual object moved in the environment with respect to the second virtual object;

determining whether a new virtual-object distance between the first virtual object and the second virtual object is within the predetermined distance; and after determining that the new virtual-object distance is within the predetermined distance, determining whether to obtain at least one additional data point for the plurality of data points to model the surface of the second object in the environment so that the first object avoids contacting the second object.

15. The method of claim 11, wherein the first virtual object represents a robotic device controlled by the computing device.

16. The method of claim 1, further comprising:

performing a task in the environment using one or more commands provided by the computing device, wherein the one or more commands are generated based on haptic feedback provided for at least one virtual haptic fixture in the virtual environment.

17. The method of claim 16, wherein the at least one virtual haptic feature comprises a multi-sensor dynamic virtual fixture (MSDVF) that comprises at least one virtual fixture region that is updated using data obtained from a first plurality of sensors.

18. The method of claim 17, wherein the task comprises a first portion of the task and a second portion of the task, and wherein performing the task comprises:

performing the first portion of the task utilizing the MSDVF;

at least after the first portion of the task was performed, obtaining first-portion data from the first plurality of sensors;

updating the MSDVF based on the first-portion data; and after updating the MSDVF, performing the second portion of the task utilizing the updated MSDVF.

19. The method of claim 18, wherein updating the MSDVF comprises one or more of:

modifying a geometry of the MSDVF based on the first-portion data;

changing at least a portion of the MSDVF from being a guidance fixture to a forbidden-region fixture based on the first-portion data; and changing at least a portion of the MSDVF from being a forbidden-region fixture to a guidance fixture based on the first-portion data.

20. A computing device, comprising:

a processor; and data storage, storing instructions that, upon execution by the processor, cause the computing device to perform functions comprising:

receiving first data about an environment from a first group of one or more sensors, wherein the environment comprises a first object and a second object, wherein the first object comprises a robotic device, and wherein the first data comprises a plurality of data points related to the environment;

modeling the environment as a virtual environment based on the first data, wherein the virtual environment is based on the first data, and wherein the robotic device is controlled using the virtual environment of the computing device;

determining whether to obtain one or more additional data points for the plurality of data points to model the environment by:

determining whether an object distance in the environment between the first object and the second object is within a predetermined distance, and after determining that the object distance is within the predetermined distance, determining whether to obtain one or more additional data points for the plurality of data points to model a surface of the second object in the environment so that the first object avoids contacting the second object;

after determining to obtain additional data points for the plurality of data points to model the surface of the second object in the environment:

receiving second data about the environment, the second data comprising the one or more additional data points, and modeling the environment as the virtual environment based on at least the second data; and generating a display of the virtual environment.

21. The computing device of claim 20, wherein the first group of one or more sensors comprises at least one of: a red-green-blue-depth (RGB-D) camera, a video and/or still camera, a seashell sensor, a proximity sensor, a radiation sensor, an infra-red sensor, a thermometer, a pH sensor, a chemical sensor, a neural signal sensor, a SONAR device, a RADAR device, a LIDAR device, a laser, a position sensor, an electrical sensor, and a biological sensor.

22. An article of manufacture, comprising a tangible computer-readable storage medium storing instructions that, upon execution by a processor of the article of manufacture, cause the article of manufacture to perform functions comprising:

receiving first data about an environment from a first group of one or more sensors, wherein the environment comprises a first object and a second object, wherein the first object comprises a robotic device, and wherein the first data comprises a plurality of data points related to the environment;

modeling the environment as a virtual environment based on the first data, wherein the virtual environment is based on the first data, and wherein the robotic device is controlled using the virtual environment of the computing device;

determining whether to obtain one or more additional data points for the plurality of data points to model the environment by:

determining whether an object distance in the environment between the first object and the second object is within a predetermined distance, and after determining that the object distance is within the predetermined distance, determining whether to obtain one or more additional data points for the plurality of data points to model a surface of the second object in the environment so that the first object avoids contacting the second object;

after determining to obtain additional data points for the plurality of data points to model the surface of the second object in the environment:

receiving second data about the environment, the second data comprising the one or more additional data points, and modeling the environment as the virtual environment based on at least the second data; and generating a display of the virtual environment.

* * * * *